(12) United States Patent
Titonis et al.

(10) Patent No.: US 10,762,206 B2
(45) Date of Patent: Sep. 1, 2020

(54) AUTOMATED BEHAVIORAL AND STATIC ANALYSIS USING AN INSTRUMENTED SANDBOX AND MACHINE LEARNING CLASSIFICATION FOR MOBILE SECURITY

(71) Applicant: Veracode, Inc., Burlington, MA (US)

(72) Inventors: Theodora H. Titonis, Berkeley, CA (US); Nelson R. Manohar-Alers, Toledo, OH (US); Christopher J. Wysopal, Concord, MA (US)

(73) Assignee: Veracode, Inc., Burlington, MA (US)

( * ) Notice: Subject to any disclaimer, the term of this patent is extended or adjusted under 35 U.S.C. 154(b) by 362 days.

(21) Appl. No.: 15/596,461

(22) Filed: May 16, 2017

(65) Prior Publication Data

US 2018/0025157 A1    Jan. 25, 2018

Related U.S. Application Data

(62) Division of application No. 13/617,568, filed on Sep. 14, 2012, now Pat. No. 9,672,355.

(Continued)

(51) Int. Cl.
*G06F 21/56* (2013.01)
*G06N 20/00* (2019.01)
(Continued)

(52) U.S. Cl.
CPC ............ *G06F 21/56* (2013.01); *G06F 21/562* (2013.01); *G06F 21/566* (2013.01); *G06N 20/00* (2019.01);

(Continued)

(58) Field of Classification Search
CPC .......... G06F 21/56; G06F 21/562–566; H04W 12/1208; H04L 63/1433
See application file for complete search history.

(56) References Cited

U.S. PATENT DOCUMENTS

| 6,253,337 B1 * | 6/2001 | Maloney ............... G06F 21/552 713/188 |
| 7,779,472 B1 * | 8/2010 | Lou ....................... G06F 21/566 726/22 |

(Continued)

OTHER PUBLICATIONS

Bailey et al., Automated Classification and Analysis of Internet Malware, Springer-Verlag, 2007.*

(Continued)

*Primary Examiner* — Minh Dinh
(74) *Attorney, Agent, or Firm* — Gilliam IP PLLC

(57) ABSTRACT

A method comprises, based on receiving a request to analyze at least a first mobile application, scheduling the request for a first sandbox. The first mobile application is analyzed based on the request, wherein the analysis of the first mobile application comprises performing a behavioral analysis of the first mobile application within the first sandbox and performing a static analysis of the first mobile application. A first feature vector is generated based on data resulting from the analysis of the first mobile application. The first mobile application is determined to comprise malware based, at least in part, on comparing the first feature vector with at least a second feature vector, wherein the second feature vector was generated based on at least one of a static analysis and a behavioral analysis of malware.

20 Claims, 59 Drawing Sheets

Related U.S. Application Data

(60) Provisional application No. 61/535,804, filed on Sep. 16, 2011.

(51) Int. Cl.
    *H04W 12/12*     (2009.01)
    *H04L 29/06*     (2006.01)

(52) U.S. Cl.
    CPC ....... *H04W 12/12* (2013.01); *H04W 12/1208* (2019.01); *H04L 63/1433* (2013.01)

(56) References Cited

U.S. PATENT DOCUMENTS

| | | | |
|---|---|---|---|
| 9,298,921 B2* | 3/2016 | Tsviatkou | G06F 21/566 |
| 2007/0240218 A1* | 10/2007 | Tuvell | G06F 21/56 |
| | | | 726/24 |
| 2008/0209567 A1* | 8/2008 | Lockhart | G06F 11/3612 |
| | | | 726/25 |
| 2011/0047594 A1* | 2/2011 | Mahaffey | G06F 21/564 |
| | | | 726/1 |
| 2012/0260342 A1* | 10/2012 | Dube | G06F 21/564 |
| | | | 726/24 |
| 2012/0323829 A1* | 12/2012 | Stokes | G06F 21/563 |
| | | | 706/12 |

OTHER PUBLICATIONS

Davidson, Understanding K-Means Non-hierarchical Clustering, 2002.*

Rieck et al., Automatic Analysis of Malware Behavior using Machine Learning, 2009.*

Rieck et al, Learning and Classification of Malware Behavior, 2008.*

Willems et al., Toward Automated Dynamic Malware Analysis Using CWSandbox, IEEE, 2007.*

Ye et al., Automatic Malware Categorization Using Cluster Ensemble, 2010.*

* cited by examiner

| REQID 250 | MD5 830 | FILENAME 835 | PKGNAME 840 | APPDATA 40 |
|---|---|---|---|---|
| 104 | afefc2479fc34... | cellfire.apk | com.cellfire.android | 0x0234ec208a... |
| 105 | 75e843cs4b6... | antibody2.apk | com.antibody2.k_lite | 0x1fa102a32... |
| 106 | 2046fsa02281d... | todolist.apk | com.android.it.todolist | 0xff12aas342a... |

FIG. 8A

| REQID 250 | DISPATCHER 170,860 | SANDBOX 321,855 | TIMESTAMP 852 | DEVICE_OS |
|---|---|---|---|---|
| 104 | DIRAC.TTTECH | 5554 | Mon Aug 8 12:05:34 | DROID1SDK2.2 |
| 105 | DIRAC.TTTECH | 5556 | Mon Aug 8 12:05:55 | DROID1SDK2.2 |
| 106 | HAHN.TTTECH | 5560 | Mon Aug 8 12:07:01 | DROID2SDK2.3 |

FIG. 8B

| REQID (250) | LOGTYPE (860) | LOGDATA (410) | TIMESTAMP (877) |
|---|---|---|---|
| 124 | NETWORKTRACE | 0x34ffa236d244a... | Mon Aug 8 12:15:34 |
| 125 | SYSTEMCALLS | memwrite(), ioctl(1), memread... | Mon Aug 8 12:16:45 |
| 126 | GUISIMULATION | WindowClick(), SendKey(), CloseWindow()... | Mon Aug 8 12:17:21 |

| REQID (250) | SCANNER (895) | INFECTED (896) | DESCRIPTION (897) | TIMESTAMP (898) |
|---|---|---|---|---|
| 124 | A | True | Trojan, SMS Dialer,... | Tue Aug 9, 13:02:3 |
| 124 | B | True | Dialer | Tue Aug 9, 13:02:3 |
| 125 | A | False | Nothing Found | Tue Aug 9, 14:02:5 |

| REQID | SCANNER | CLUSTERING_LABEL | CENTROID | ANOMALY | TIMESTAMP |
|---|---|---|---|---|---|
| 1204 | --- | REP_APP1 | NO | NO | Mon Aug 8 12:15:34 |
| 1205 | --- | REP_APP3 | YES | NO | Mon Aug 8 12:15:45 |
| 1206 | --- | NONE | NA | YES | Mon Aug 8 12:17:21 |

FIG.17

CLUSTERS

| REQID | SIZE | CREATED_ON | MEMBERSHIP | CENTROID | LAST_MODIFIED |
|---|---|---|---|---|---|
| WINTERGAMES. APK | | Sun Aug 7 01:00:12 | NO | NO | Mon Aug 8 12:15:34 |
| YOUTUBE.APK | ..... | Sun Aug 7 01:00:12 | YES | NO | Mon Aug 8 12:15:45 |
| TANKHERE. APK | ....... | Sun Aug 7 01:00:34 | N | YES | Sun Aug 7 01:00:34 |

```
3400
        3405            3410           3415
3420
      RULE  WHAT=( r'/flurry/android', 'onEvent/logEvent', 'FlurryAgent' ),
3430
            URL='MARVIN: http://www.marvinsafe.com,
            http://support.flurry.com/sdkdocs/android/classcom_1_1flurry_1_1androi
3440
            DESCRIPTION=(YOUR_PRIVACY)  - Signature to activate fine-gra
3450  third party?',
3460        RISK=10,
            PNG=mode(True,None) EOR 3441        3442
```

FIG. 30

AUTOMATED BEHAVIORAL AND STATIC ANALYSIS USING AN INSTRUMENTED SANDBOX AND MACHINE LEARNING CLASSIFICATION FOR MOBILE SECURITY

CROSS-REFERENCE TO RELATED APPLICATIONS

This application is a division of U.S. patent application Ser. No. 13/617,568 filed on Sep. 14, 2012, which claims priority to and the benefits of U.S. provisional patent application Ser. No. 61/535,804, filed on Sep. 16, 2011, the entire disclosure of each of which is incorporated herein by reference.

FIELD

The present system and method related generally to security for mobile devices and, more particularly, to automated application analysis using an instrumented sandbox and machine learning classification to assess mobile application security.

BACKGROUND

Malware, or malicious software, is software designed to infiltrate or damage a computer system. Examples of malware include computer viruses, worms, trojan horses, spyware, dishonest adware, scareware, crimeware and rootkits. Forms of attack can include attempts to read, alter, or destroy data or to compromise the computer's operating system to take control of the machine. The primary motivation for the development and use of malware is financial gain.

In order to achieve the greatest impact, malware is typically created to target the devices and operating systems that have the greatest market share. As the number of mobile devices increases worldwide, there has been a dramatic increase in the number of malware variants that target these devices. Enterprise and consumer mobile devices are exposed to a record number of security threats, including a 400 percent increase in Android malware from June 2010 to January 2011 (Malicious Mobile Threats Report 2010/2011, Juniper Networks Global Threat Center).

In addition to standard attack vectors that pose a threat to traditional computer security, mobile devices are vulnerable to a wide variety of new exploits that hijack the microphone, camera and GPS as well. If malware has root access on a mobile device chances are it has access to email, banking credentials, contacts, and even the user's physical location.

Present anti-malware software for mobile devices relies on an architecture traditionally used by personal computers. This method uses signatures generated from rudimentary heuristic analysis to identify and defend against attacks. Mobile devices cannot support the CPU and memory intensive process of querying against tens of millions of malware signatures. Signature based anti-malware systems are essentially ineffective in detecting zero-day, or previously unknown, variants. Malware cannot be detected unless samples have already been obtained, a fine-grained manual analysis has been performed by a trained specialist, signatures have been generated, and updates have been distributed to the users. This process can take anywhere from hours to days, with some vulnerabilities remaining un-patched for years.

Due to the volume and increasing sophistication of malware, analysts must be prioritized based on the prevalence of the infection, the rate at which it spreads, the security impact, and the effort required to remove it. Malware analysts are trained to follow a three-step technique, which includes surface analysis, runtime analysis, and static analysis. This process begins with the most straightforward and least resource-intensive analysis and progresses to techniques requiring the most time and skill. Static analysis is the most effective technique for determining what the malware actually does, but this level of analysis is typically reserved for the highest priority malware because it is very expensive in terms of effort and resources.

The use of obfuscation techniques such as binary packers, encryption, and self-modifying code by malware writers renders static analysis seemingly impossible. When conducting a static analysis, the malware analyst relies on their individual experience. Based on this knowledge, they categorize samples into families so that new variants can be compared to malware that they have seen before. There is a shortage of malware analysts with this ability. Even at the US Computer Emergency Readiness Team, US-CERT, a trusted leader in cyber security, there are only a few people capable of doing this level of work (Building a Malware Analysis Capability, CERT, Jul. 12, 2011 Gennari et al.).

Malicious applications continue to be found on third-party websites and application stores. Many third-party sites host applications without due diligence. Google, Apple and Amazon application stores are employing a predominantly manual vetting process that is both ineffective and inefficient. An alarming number of malicious applications continue to be found in both the Google Marketplace and the Amazon Appstore. Malicious applications have become a persistent problem for Google, which has had to scrub the market several times. Due to alerts sent from a third-party, they pulled more then 50 applications in March 2011, 3-dozen in May and 10 more malicious applications in June.

The manual process of vetting applications is alienating legitimate developers who are becoming frustrated by how long it takes to have their application approved and released into the application stores. Additionally, developers are unable to perform proper regression, stability, performance, and security testing for quality assurance prior to submitting their application for distribution because few test environments exist for mobile operating systems.

Mobile carriers are in a seemingly endless battle against malware for network resources, operator revenues, and subscriber trust. They are charged with protecting consumer security while defending their core network assets from bandwidth consuming malware. Carriers face revenue losses attributed to malware including those that send unwanted or premium SMS messages, are used for denial of service attacks, or harm their customer's mobile devices resulting in subscriber termination.

Consumers are largely unaware of malicious or anomalous mobile applications, or applications, that are installed on their mobile devices. In order to protect themselves they are advised to research the publisher of an application, check application permissions, and to not install applications from third-party websites or application stores. The majority of consumers will grant applications permissions without consideration, and will not take the time to research the source.

Companies and government agencies often allow employees to use their own mobile device for work, increasing the threat that malware will make its way onto the enterprise network. The enterprise software programs traditionally reserved for the PC are now being released as applications that allow access to proprietary and financial information from both personal and company issued mobile devices. IT departments are at a significant disadvantage as the proliferation of mobile devices in the enterprise challenges the predominant security strategy of hardening the perimeter and controlling access to the internal network.

SUMMARY

According to one embodiment, the present system supports reusable middleware, referred to as a Cloud Service, and extensible end-points, referred to as the Subscriber App and Sandbox. The end-points of the present system are designed as plug-in components intended to target the platform domain operating system and are not limited to mobile devices. From the viewpoint of the Cloud Service, the Subscriber App and Sandbox, including an AV Server, end-points are suppliers of binary code and a corresponding numerical feature vector for said binary code, respectively. The Cloud Service includes a Web Server, Controller, Dispatcher, Database, Dashboard, Clustering and Visualization components.

The present system provides an automated means to identify malicious applications. Thousands of malware, a number always increasing, are found in the wild that make their way from thousands of points of origin to millions of users. A malware analyst is notified of the questionable application when enough users complain, or alternatively if a malware analyst is scouting the market sites by hand or through some primitive automation. If the malware analyst dissects the application properly, it may find the static code signature, system calls, or even the network behavior, that prompted the users to complain. This manual process is not presently scalable.

The present system reduces the unfiltered pipeline of malware applications in the wild to a trickle of sources, which is further reduced through visualization and connectivity plotting. Anomalous applications are now identified early in the distribution process, as opposed to waiting for users to complain after wide distribution when the damage is already done.

The present system provides the ability to analyze, identify, compare and archive potential malware quickly, efficiently, and in volume. The end-to-end process automation enables malware analysts, application store providers, application developers, mobile carriers, consumers, and enterprises to identify malicious actions and quickly classify threat behavior in a consistent manner. This automated process alleviates unnecessary demands on valuable resources. The instrumented sandbox provides an intelligent GUI traversal mechanism that simulates how a user can interact with an application. The system replaces what has hitherto been a manual process requiring a number of disparate applications.

Output logs from the behavioral analysis provide an analyst with fine-grained detail of the malware's actions, including but not limited to, a summary of the analysis, results of third-party antivirus scans, full sandbox simulation logs, screen shots, summary and detail of GUI traversal coverage, summary and detail of network activity, summary and detail of network IP reach observed during the sandbox simulation, summary and detailed annotated analysis for high-level logs such as activity manager and event logs, summary and detail of execution traversal of the user interface, summary and detailed annotated analysis for low-level operating system call logs, summary and annotated analysis over an integrated timeline across such logs, summary and detail of file system integrity analysis, summary and detail of identified network transferred file objects including antivirus scan results, summary and detail of browser activity, behavioral chronologies and statistical profiles extracted from operating system calls, application-level library calls as well as file system operations, CPU and/or memory profiles, summary and detail of intrusion detection alerts, summary and detail of ad-server imposed network traffic load, and summary and detail of network reach into malicious sites of the application during execution.

According to one embodiment, static analysis is automated through a process of decompiling the application and extracting a rudimentary form of the original source code. Basic software functionality is recorded while remaining agnostic to the underlying code specifics. These basic software functions include, but are not limited to, public final methods, base API calls, direct method invocations, string constants and interface API invocations for HTTP, SMS, URL, network, GPS and telephony. It is also an aspect of the present invention that the invention provides means for inferential risk assessment of the capabilities of the application binary while remaining agnostic to data and control flow on the binary. By implementing an capabilities-level policy, risky application binaries can be identified and prevented from entering the enterprise network and/or installation on employee mobile devices. Advanced static analysis, which includes the creation of complete control flow and data flow graphs, can be optionally be performed to determine more accurate behavior of the application binary. A complete data flow graph can determine if risky behaviors, such a sensitive data exfiltration, actually occur with static analysis alone. A complete data flow graph can determine if sensitive data is actually exfiltrated from the device. Rudimentary static analysis without complete data flow may be able to determine that personal information is accessed and that the application transfers data off the device over a network but it cannot determine that the personal information is the data that is transferred off the device. Static analysis with complete data flow can determine if sensitive data is being transmitted off the device using insecure communication techniques.

Herein, we refer to the combined collection of the above-mentioned behavioral as well as static analyses as the analysis-suite.

Presently, significant human effort is required to identify threats, extract characteristics from the threats, and encode the characteristics into software to detect the threats. According to one embodiment of the present system, this labor-intensive process is automated through the use of machine learning and data mining techniques. These techniques replace the equivalent of hundreds of thousands of hours of specialist fine-grained analysis. The process consists of a set of algorithms, computer programs that perform tasks based on input data that learns over time as the system is fed more data, or training samples. At the end of this learning period, which is actually a very small amount of time, the result is a computer model that is equivalent, and most of the time better, than a human trained to perform the task of identifying malware on a mobile device.

For classification purposes, applications, those with known malware and benign, are executed in the sandbox that outputs the behavior and static analysis reports. Features are then extracted from these reports. An example of a feature includes, but is not limited to, the program attempting to access a URL or IP address, how many changes is it making to the operating system initialization files, etc. These actions are converted into a dataset that is fed into a classification method such as, but not limited to, logistic regression or a support vector machine.

The present system trains classification methods and systems to recognize malware in the same way an email client can recognize spam without a human actually looking at it.

With the present system, a malicious application is prevented from reaching consumers by hooking into the application distribution network, expediting the application analysis queue, and by the automatic labeling of anomalous applications early in the distribution process. Google, Amazon, Apple, and other application stores using the present system can assure their customers that the applications in their application stores do not pose any danger. In addition to finding stealthy and zero-day malware, the application store providers can also employ a review process to find applications that crash, or other undesirable actions due to sheer developer incompetence.

One efficient way for developers to stay ahead of security vulnerabilities is to build applications securely, from the ground up. The present system provides an automated means of performing vulnerability testing throughout the application development lifecycle. It offers a comprehensive and timesaving solution for application developers, build managers, quality assurance (QA) teams, penetration testers, and security auditors. Developers may unintentionally introduce malware or unwanted risky behavior into their applications when they utilize binary libraries of code created by another party. Shared binary code is often used to implement functionality such as multiplatform support or the required functionality of an advertising network. This shared binary code can be analyzed during the development process using static and behavioral analysis to that the application doesn't inherit malware or unwanted risky behavior from shared code.

With the present system, mobile carriers can detect and eliminate malware on their network before it spreads. They can offer their subscribers a secure and responsive mobile experience by eliminating bandwidth-consuming malware from their network. Mobile carriers have comprehensive situational awareness and a corresponding archive of malware detected including point of origin and time-based distribution channel. Additionally, mobile carriers can extend the present system to offer new avenues for revenue generation through corporate controls and tailored clean-pipe offerings.

The present system delivers proactive and comprehensive protection from malware without relying upon signature updates. The present invention also provides means to assess the footprint performance of an application binary (such as but not limited to risk assessment, net work reach, CPU performance, memory requirements, and bandwidth usage) on the mobile device. The present invention also provides means to flag and deter use of such flagged application binaries in consumer's mobile devices.

The present invention provides means to detect leakage of planted sensitive information during the execution of the application binary within a sandbox. The consumer is assured that their location, contacts, web searches, music, photos, email, text messages, phone calls, and login credentials are secure from malicious applications on their mobile device.

The present invention provides means for leveraging previous analyses and identifying an application binary with anomalous static and/or behavioral features within a particular facet of the analysis suite. To this end, for a given application binary, the invention compares a profile derived from one or more facets of the analysis suite against an aggregate-based/overall profile (e.g., across some large subset of application binaries selected based on some criteria such as time range or malware classification) in order to identify anomalies within said facet of the application suit. For example, this allows to identify bandwidth-consuming application binaries that are not necessarily deemed to be malware.

A reader versed in the arts may appreciate that a small number of application binaries may not be sufficiently exercised by the GUI automata (e.g., due to username/password prompts, bugs, and/or environment setup requirements). The present invention provides means to autonomously flag and queue these application binaries for subsequent human-assisted user interface interaction. The present invention specifies the use of a compatible but off-line sandbox environment leading to the generation of a compatible analysis suite. In accordance to the above-mentioned aspect of the invention described on [00028], application binaries that anomalously under-perform with respect to the aggregate-based/overall profile for the GUI traversal facet of the analysis suite are flagged for manual operator inspection.

Mobile security situational awareness for the enterprise is achieved through the perception of malware within a device or network, the comprehension of malware type, and the projection of malware status in the future. The present system provides end-point security and can help IT departments enforce compliance with security policies by ensuring that only compliant devices with non-malicious applications can access business networks and email servers. By implementing an application-level policy, threats can be identified and removed on employee mobile devices as soon as they appear before they reach the enterprise.

These and other features, aspects, and advantages of the present system will become better understood with reference to the following descriptions and claims. This summary is as an introduction of concepts. It is not intended to identify key features nor should it be used to limit the scope of the claim.

BRIEF DESCRIPTION OF THE FIGURES

The accompanying drawings, which are included as part of the present specification, illustrate the presently preferred embodiment and, together with the general description given above and the detailed description of the preferred embodiment given below, serve to explain and teach the principles of the present system.

FIG. 8A illustrates an exemplary applications database table for use with the present system, according to one embodiment.

FIG. 8B illustrates an exemplary controller map database table for use with the present system, according to one embodiment.

FIG. 8C illustrates an exemplary logs database table for use with the present system, according to one embodiment.

FIG. 8D illustrates an exemplary AV scans database table for use with the present system, according to one embodiment.

FIG. 12 illustrates an exemplary generation of numerical features from a network Log File according to one embodiment of the present system.

FIG. 17 illustrates an exemplary feature vector database table according to one embodiment of the present system.

FIG. 18A illustrates an exemplary Clusters Table which is used to store each cluster indexed by cluster name according to one embodiment of the present system.

FIG. 30 illustrates an exemplary risk assessment rule and its constituent components.

Figure 1:
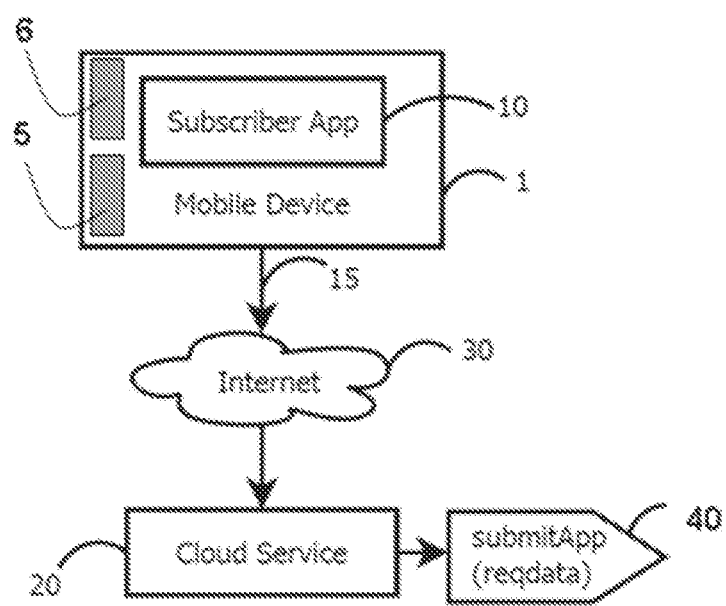
FIG. 1 illustrates an exemplary mobile device connecting to a cloud service for use with the present system, according to an embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

Prior art systems provide two methods for scanning for the presence of malware on a Mobile Device. In the first option, an AV scanner can be installed on the Mobile Device to perform static analysis of applications also residing on the device. However, while AV scanners are typically resource intensive, in contrast, Mobile Devices are not. For this reason, some AV scanner Providers may choose to provide with simple lookup tables seeking to map a unique attribute of an application (e.g., MD5, SHA1) into a pre-computed infection analysis, where the presence of said analysis on said lookup table indicates a known and previously identified malware Application. However, detection on an infected Application is contingent on two factors, the version of the lookup table, and the population of an infection analysis for said Application into the lookup table.

In a second option, the Mobile Device (via AV scanner or via a website) can submit one or more of its Application to remote, web-based, static analysis. However, static analysis is insensitive to new malware not already analyzed by hand and more importantly, important aspects of an Application anomalous and malicious behavior may surface themselves during execution and such knowledge is not being leveraged.

Most importantly, in either case, the aggregate knowledge of millions of such analyses is not being analyzed to discover or investigate anomalous patterns that can emerge from the analysis of aggregated analyses.

The present system includes a computer-networked system that allows mobile subscribers, and others, to submit mobile Apps to be analyzed for anomalous and malicious behavior using data acquired during the execution of the Application within a highly instrumented and controlled environment for which the analysis relies on per-execution as well as comparative aggregate data acquired across many such executions from one or more subscribers.

FIG. 1 illustrates an exemplary Mobile Device (1) containing the Subscriber App (10) allowing connection (15) to our Cloud Service (20) via the Internet (30) to submit (40) some co-resident App (e.g., 5, 6) for analysis.

For Mobile Devices (e.g., 1), an App can be found in one of two states: packaged (i.e., in an aggregated format ready for distribution to Mobile Devices) and unpackaged (i.e., installed into a Mobile Device (1). The Subscriber App (10) can submit any installed App (e.g., 5) found on the device. Moreover, the system provides two alternative means for the submission of packaged Apps to the Cloud Service (20). First, an Upload Web Page provides means to submit an App from any type of computer (e.g., PC) having access to the packaged App (intended for Mobile Devices). Second, a Cloud Service's API (see FIG. 1A), allows batched submission on one or more packaged Apps (stored in any type of computer) to the Cloud Service (20).

Figure 1A:
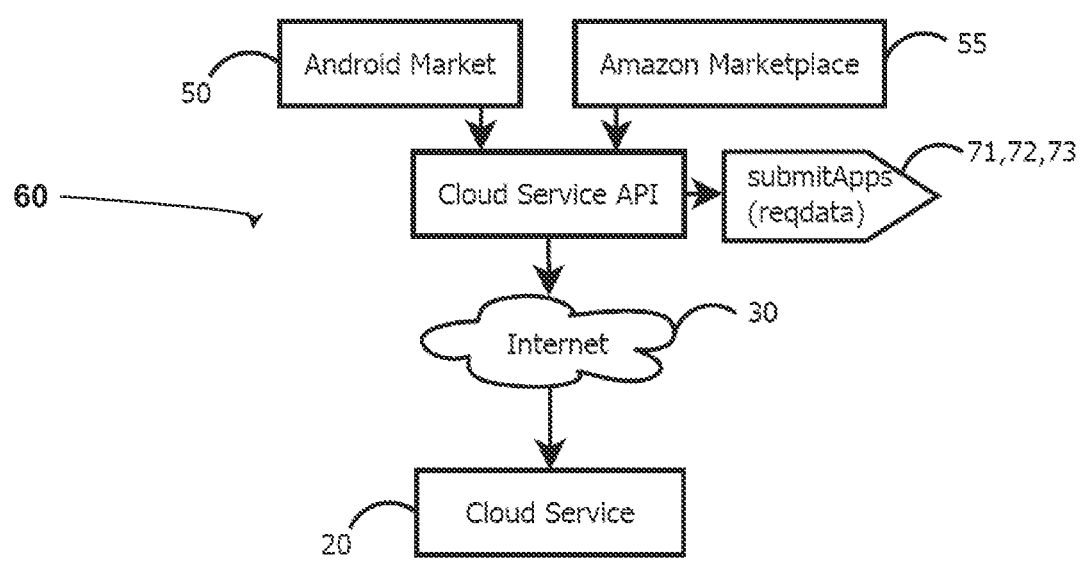
FIG. 1A illustrates an exemplary mobile application market provider site connecting to the cloud service according to one embodiment of the present system.

FIG. 1A illustrates exemplary Mobile App Stores (such as the Android Market (50), or Amazon Market (55)) making use of said Cloud Service's API (60) to connect to our Cloud Service (20) via the Internet (30) in order to batch submit (e.g., 71 (shown), 72, 73, etc.) multiple Apps (e.g., 6, 7, 8) for malware analysis. In the present invention, each App Store is associated with some unique app-store key (part of the reqdata field found in each submission). An App Store key represents an unique character sequence predefined to map at the Cloud Service to a known Submission Source (e.g., the Amazon Market, a mobile carrier, an enterprise, general public) and associated with Cloud Service account. Every submission made is associated with an App St ore key. The Cloud Service tracks the association of each submission to its particular App Store key. Submissions Sources can then use their corresponding App Store key to retrieve the status of one (or more) submissions made with the same App Store key for any arbitrary time range. A Submission Source is also provided with aggregate-based analytic report s that provide summary data extracted from sub sets of submissions associated with App Store keys. For flexibility, a Submission Source may be associated to multiple App Store keys. For example, an App Store may have quarterly submission campaigns, each performed with a different App Store key.

Figure 1B:
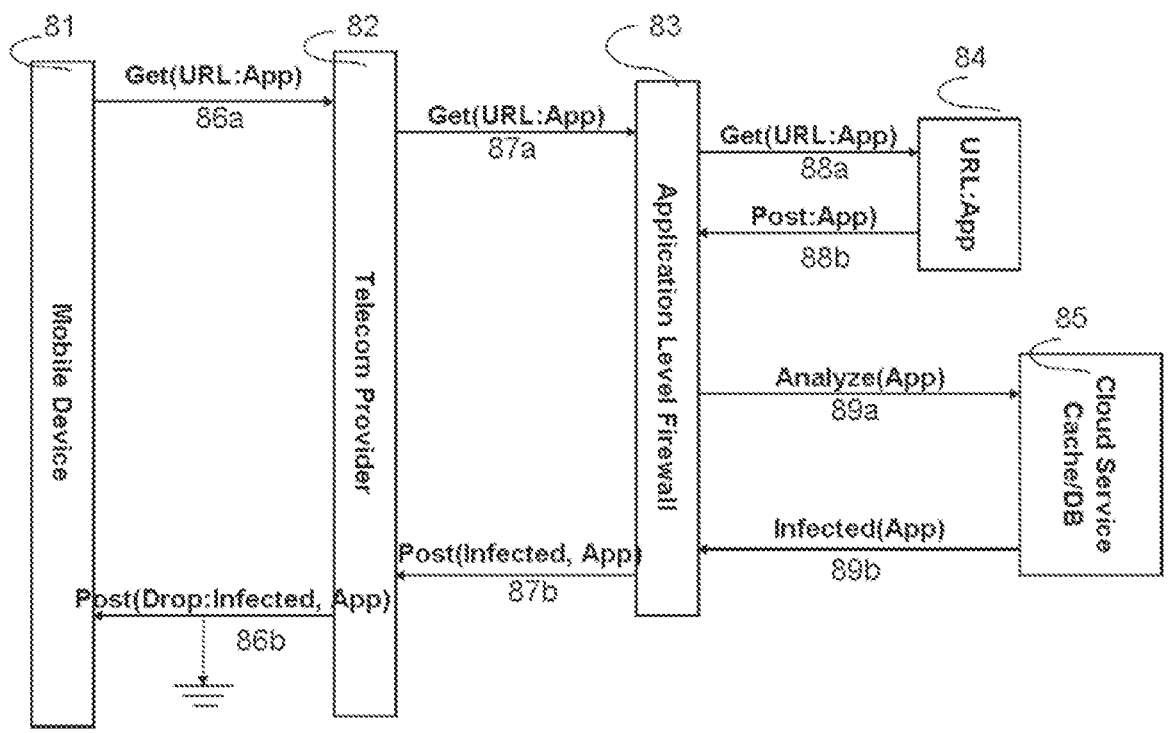
FIG. 1B illustrates an exemplary mobile application Mobile Carriers site connecting to a cloud service according to one embodiment of the present system.

As also shown in FIG. 1B, the present system can be used by an entity (such as a Mobile Carriers (82) supporting Mobile Devices (e.g., 81) or a Enterprise supporting Users with Mobile Devices) to complement an Application-level Firewall proxy (83) by providing filtering of malware Apps via Cloud Service (85) scanning of Apps being downloaded, this being accomplished regardless of their origin and/or pedigree of the App's market or downloading website (84). For example, a download of an App (86a) is submitted via the Mobile Carrier's connection (e.g., Mobile Device's GSM connection) and recognized (87a) as a download by an Application-level Firewall (83), which substitutes the normal reply (88a, 88b) with an augmented sequence comprised of the steps of retrieving the App (88a, 88b) and then checking (89a) the Cloud Service (85) for the status of the App. The Cloud Service (85) replies with the known status of the App, in this case shown to be infected (89b). The Application-Level Firewall (83) relays (87b) this information to the Mobile Carriers (82) which may decide to stop the download or alternatively, post a notification (86b) that an infected App is being downloaded and allow the User to decide which action to take. In some embodiments, a mobile device management (MDM) device may act as a submitter. The MDM can recognize that the Cloud Service has no information on a particular application and extract the application or determine application metadata and send it to the Cloud Service.

In some cases, the applications themselves may not be available or allowed to be submitted to the Cloud Service for analysis. In such cases, application metadata that describes the applications such as hash, name, developer, version, creation date, and size can be submitted to the Cloud Service as a proxy for the application. The Cloud Service can then acquire the application from an App Store for analysis. This approach does not require a customer to submit their copy of the application, which may be prohibited due to privacy policies or other legal agreements.

Figure 1C:
FIG. 1C illustrates an exemplary subscriber application interface for use with the present system, according to one embodiment.

The execution of a request can take a variable amount of time (e.g., one or two dozen minutes). For this reason, the present system provides means for any of the aforementioned submitter methods to, after a submission, receive (via email) a report at a later time, informing of the completion of the analysis. FIG. 1C shows a screenshot of the collection of the User's email address by the Subscriber App (10). A setting panel (2) allows the User to enter an email (3). As stated, once analysis results for a submission are available, the Cloud Service will send an email to the User containing a link to a report detailing the analysis.

To enhance the response time of the Cloud Service to this embodiment, that Sandbox Analyses for Apps may be cached in terms of a unique identifier derived from an App (such as but not limited to MD5 and/or SHA1), thus allowing almost instantaneous analysis response to all but the first request to the Cloud Service of a given App.

Figure 1D:
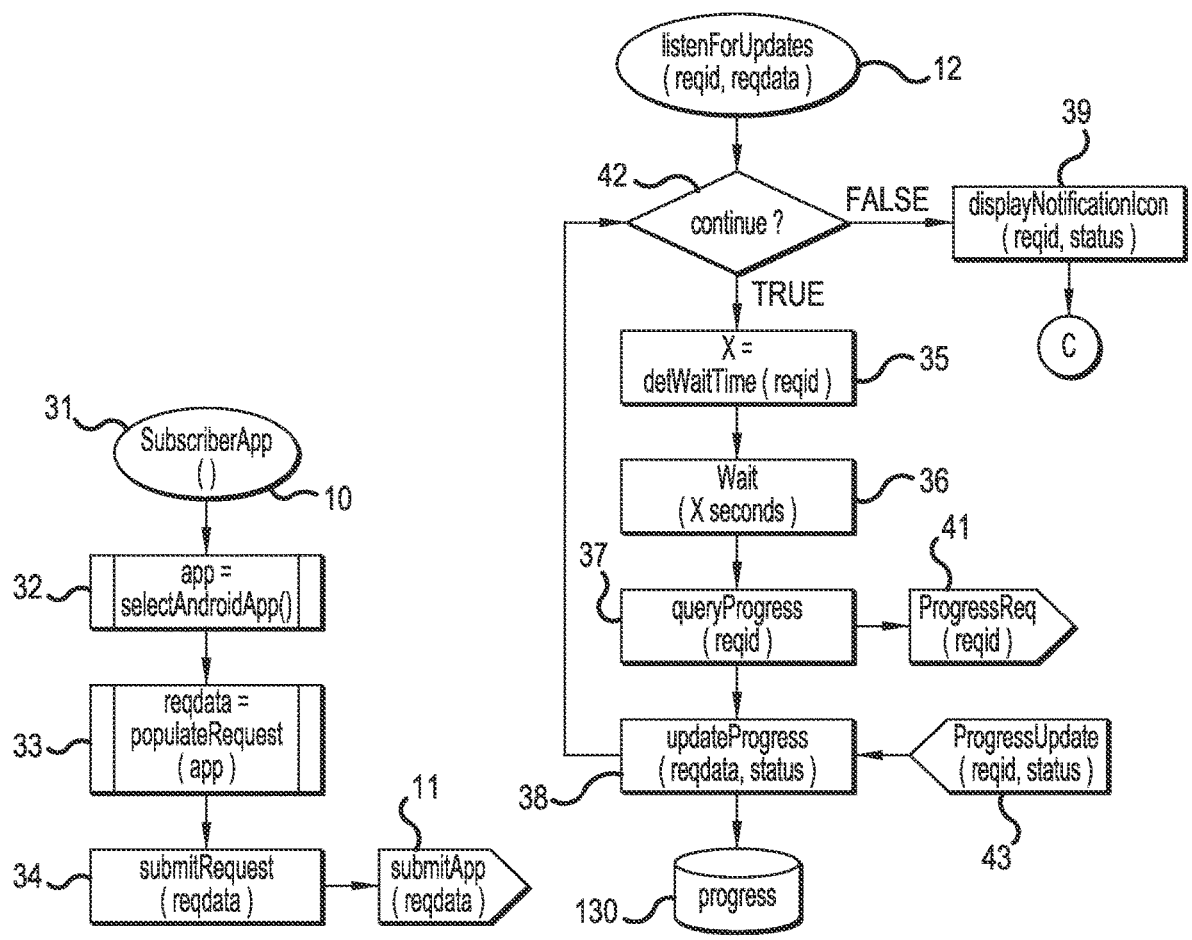
FIG. 1D illustrates an exemplary subscriber application submission process for use with the present system, according to one embodiment.

FIG. 1D illustrates an exemplary reduced footprint Subscriber App (10). A thread (31) on the Subscriber App (10) allows the User to select (32) an installed App (e.g., 5 on FIG. 1). Then, it populates (33) the message to be sent to the Cloud Service, and next it submits (34) a Sandbox Request message (i.e., Submit App (11)) to the Cloud Service. Among other things, the Sandbox Request Message forwards a copy of co-resident App from the Mobile Device (1) to the Cloud Service (20). A threaded design allows multiple other applications to be submitted; that is, without having to wait on a pending Sandbox Request to complete.

A thread (12) allows the Subscriber App to query (37) the Cloud Service (via the Progress Request (1) message) for status updates for any pending Sandbox Request. In response to any such query, the Cloud Service sends back a Progress Update (43) message to the Subscriber App, which then stores said update(s) into the Database (130). To reduce drain of the Mobile Device's battery, this querying process follows a variable delay that decays as the submission gets older unless renewed (e.g., 1, 2, 4, 8, 1, 2, . . . ) due to a explicit recheck (by the User) of the pending submission's status. Finally, upon receiving a Progress Update (43) indicating the completion (42) of a pending Sandbox Request, the Subscriber App (10) displays a notification icon (see FIG. 3D) on the notification bar of the Mobile Device.

The Cloud Service (20) represents a scalable load-scheduling service that matches Sandbox Request to available capacity subject to some criteria such as but not limited to available compute capacity, available type of the resources, connectivity status, failure rate, Application and/or Device Identity of the Sandbox Request, etc.

Figure 2:
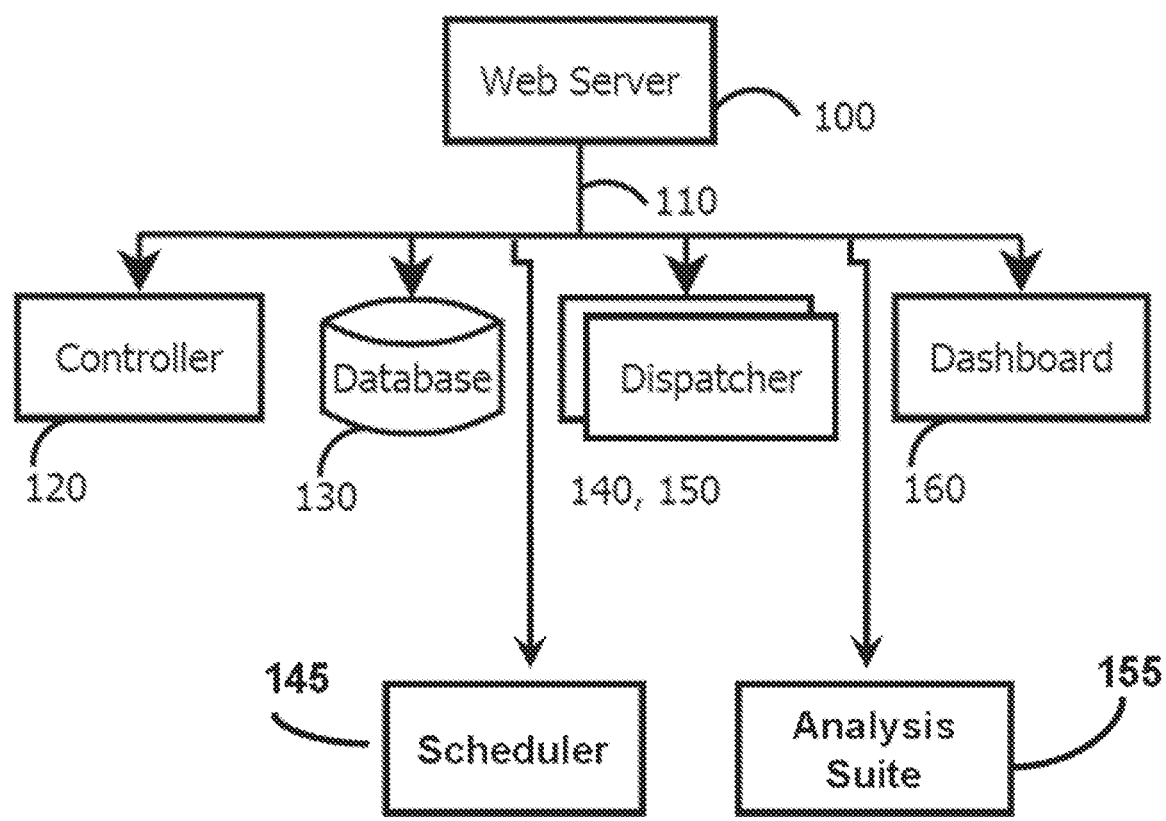
FIG. 2 illustrates exemplary cloud service components for use with the present system, according to one embodiment.

FIG. 2 illustrates an exemplary Cloud Service (20) consisting of an externally visible Web Server (100), which has access to an internal local area network (110), on which the Controller (120), Database (130), Dashboard (160), and one or more Dispatcher Node(s) (140, 150) interconnect.

The Web Server (100) provides support for an array of web APIs that allow users to remotely interact with the system, a Controller (120) is used for mapping requests to a Dispatcher (e.g., 140) providing support for one or more sandboxes. All components initiate and terminate transactions with respect to a Database (130). This Database (130) provides persistent memory across Cloud Service components. Cloud Service components can be distributed on different nodes or networks. A Scheduler (145) queues and throttles down the incoming request rate presented to the Webserver into a maximum load to the Controller (120). An Analysis Suite component (155) is invoked by the Dispatcher (e.g., 140) upon completion of a sandbox simulation in order to apply a series of forensic analyses (such as but not limited to machine learning classification, static analyses, aggregate-based analyses, network analyses, event timeline analyses, malware rating analyses, and report generation) to execution logs produced by a sandbox within a Dispatcher. Execution logs are stored by the Dispatcher into the Database and retrieved by the Analysis Suite for post-mortem analysis. Analyses performed by the Analysis Suite need not be located at the same server as long as these are connected to the Database (130).

A Dashboard (125) is available via the web and provides support for real-time querying of the progress, stat us, and findings associated with one or more requests selected in accordance to some criteria such as but not limited to common App Store key, time range, or both. The Dashboard (125) comprises several different projection views representing statistical abstracts of the selected requests. Some of these projection views are Webserver Page (126) providing with real time update of incoming requests and indicating queuing rates and completion status among other things, a Controller Page (127) providing with real time update of scheduled requests and indicating malware findings as well as execution quality analytics for these among other things, a Dispatcher Page (128) providing real time update of sandbox (e. g., 141, 142) utilization across one or more Dispatchers (e. g, 140), and a Database Page (129) providing real time update of aggregate-based analytics for malware threat assessment for a given subset of requests.

An Emulator (e.g., 330, 331) represents a targeted mobile device image (e.g., Generic Android device, Generic iOS device) which can be customized for measurements gathering with high concealment. A Sandbox (e.g., 320) represents a data and control flow shell wrapped around one such emulator designed in such a manner so as to exercise an emulator in a predefined, invariant, and resilient sequence of steps such as but not limited to:

(a) clean imaging of the Emulator device (e.g., 331),
(b) planting of data such as a randomized or pre-ordered selection of e-mails, user identity data, device identity data, login credentials, credit card numbers, phone numbers, GPS coordinate history, Internet addresses, web browsing history, address and contact book entries, short messaging system SMS) messages, phone call log, audio and video recordings, samples of data and text files, etc. into the Emulator device,
(c) initiation of measurements collection,
(d) installation of the application binary into the Emulator device,
(e) launching of the application binary,
(f) interactive throttling and monitoring of the user interface of the execution progress of the launched application,
(g) termination and/or restarts of the application,
(h) termination of measurements collection, (i) retrieval of obtained logs and data from the Emulator device, and finally, (j) propagating the release (i.e., scheduling availability) of the Emulator device back to its associated Dispatcher (e. g., 140). For these reasons, subsequently, the Sandbox shell maybe also referred to as an Instrumented Shell.

More importantly, in a deployment and autonomous Cloud Service environment, the Sandbox shell must also add significant resiliency, monitoring, documentation, recovery, and throttling measures over the emulated device's status, progress, and availability at each and during each of these steps. In an embodiment, the Controller Page (127) provides real time monitoring of the progress of a Request within the Cloud Service with enough granularity to track the above steps (a-j). The Dispatcher Page (128) provides real-time detection of the availability and utilization of Sandboxes.

Dispatchers (e.g., 140, 150) provide access to virtualized computation environments that execute Sandbox Requests. The Controller (120) provides the scheduling and mapping of Sandbox Request into available computing resources. The Webserver (100) provide Consumer and/or Enterprise interfaces to receive Sandbox Request and track the progress of those. A Database (130) provides access to shared data tables about the Cloud Service, its Sandbox Requests, and the resulting findings.

Figure 2A:
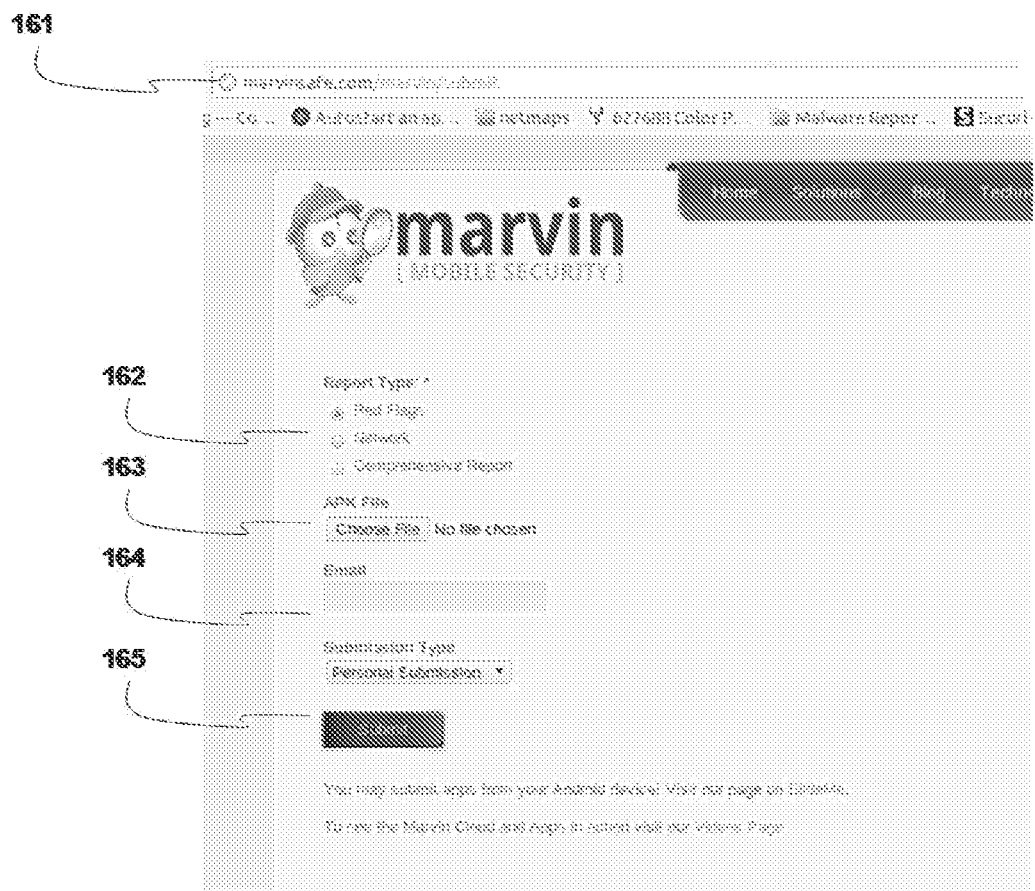
FIG. 2A illustrates an exemplary application upload interface for use with the present system, according to one embodiment.

FIG. 2A illustrates an exemplary application upload interface for use with the present system, according to one embodiment. The upload is accomplished via access to the system's web address (161) providing a web-hosted form comprising:

a request selection box (162) where one of several analyses is selected, a file selection control (163) allowing the user to specify the mobile application for upload, an email field (164), specified by the user and used by the system to send a report link back to the user made accessible via the web, and a submit button (165), initiating the upload of the mobile application binary into the Cloud Service.

Figure 2B:
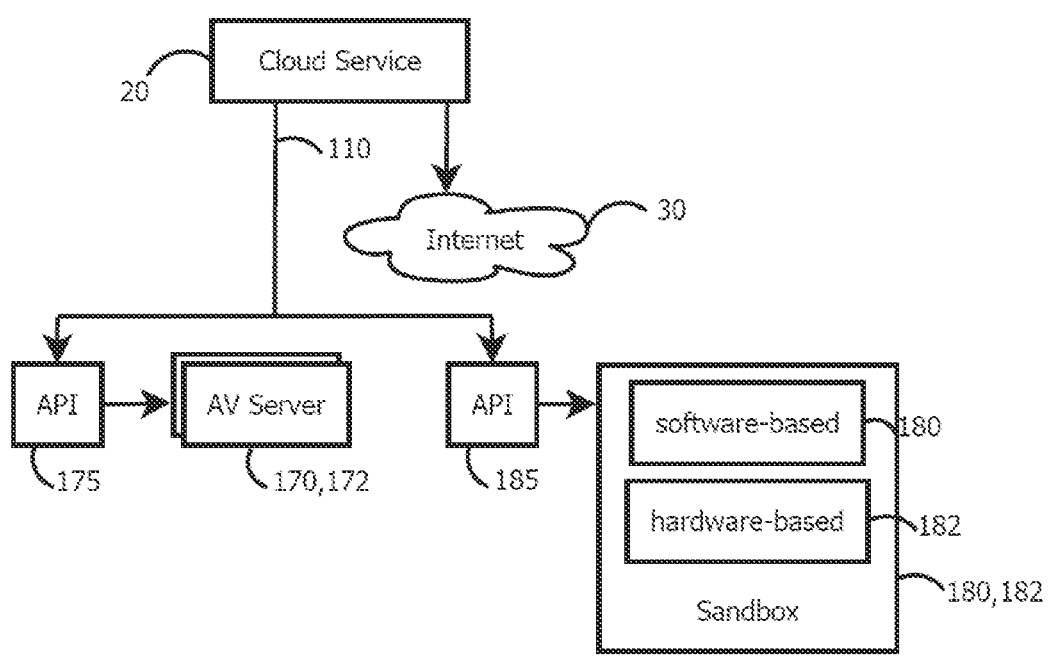
FIG. 2B illustrates exemplary cloud service plug-in components for use with the present system, according to one embodiment.

FIG. 2B illustrates an exemplary Cloud Service (20) interfacing (via a local area network (110) or the Internet (30)) to plug-in components (170, 172, 180, 182). The plug-in components comprised but are not limited to one or more AV Server, which connect via an Antivirus API and one or more Sandboxes, which implement the software specification of the Sandbox API.

The Antivirus API (175) allows the Cloud Service (20) to connect to potentially different AV Servers (170, 172). The Antivirus API (175) allows:

the submission of an AV scanning request with respect to a particular Sandbox Request, the extraction of the App from the Database (130), and the population of the antivirus scan result into the Database (130).

Note that an AV Server executes scanning requests in an asynchronous manner with respect to the execution of a Sandbox Request within the Cloud Service. Both submission and scan result notification result in asynchronous updates to the Database (130). Multiple AV Servers may be used to distribute the scanning load as well as to achieve cross-verification of AV scan results from different providers.

The Sandbox API (185) allows the Cloud Service (20) to connect to software-based (180) or hardware-based (182) Sandboxes (180, 182). The Sandbox API (185) provides compliance to the software specification given subsequently in FIG. 7B. The Sandbox API can allow the Cloud Service to interact with a highly instrumented (i.e., software or hardware-based) entity that emulates a Mobile Device of the specified type and operating system such as but not limited to arrays of software simulators, "rooted and/or jailbroken" hardware devices, or combination of such. Rooting is a privilege escalation technique and/or process allowing users of mobile devices running the Guest operating system to attain privileged control (known as "root access") within Android's subsystem allowing applications within the rooted device to, if capable of, overcoming limitations that carriers and hardware manufacturers put on devices, resulting in the ability to alter or replace system applications and settings, run specialized application binaries that require administrator-level permissions, or perform other operations that are otherwise inaccessible to a normal Android user. Rooting is analogous to jailbreaking devices running the Apple iOS Operating System.

Figure 3:
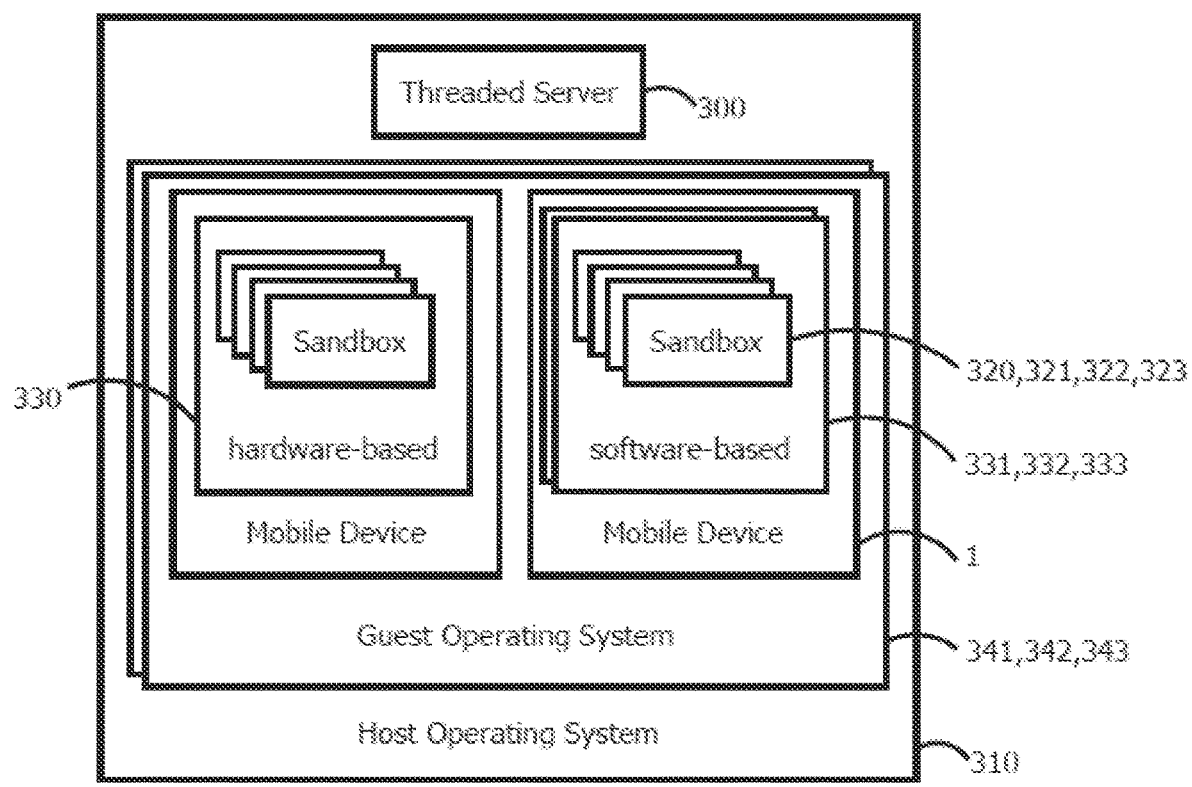
FIG. 3 illustrates an exemplary dispatcher for use with the present system, according to one embodiment.

FIG. 3 illustrates an exemplary single Dispatcher Node (140), consisting of a Threaded Server (300) running atop a Host Operating System (310). The Threaded Server (300) provides access to a finite set of Sandboxes (320, 321, 322, 323, etc.), which could be built atop hardware-based (330) and/or software-based (e.g., 331, 332, 333, etc.) emulators of a Mobile Device (1). Each of these emulators run atop separate (and possibly different) instances of Guest Operating Systems (e.g., 341, 342, 343, etc.). Each such Guest Operating System (such as but not limited to AndroidOS or iOS) is independently virtualized atop a common Host Operating System (310) (such as but not limited to Ubuntu or Windows) running on a Dispatcher node (e.g., 140). In the preferred embodiment, each Dispatcher node may be associated with a maximum number of concurrent virtualizations defined based on some criteria such as the number of available CPU, net work bandwidth, and/or memory.

Figure 3A:
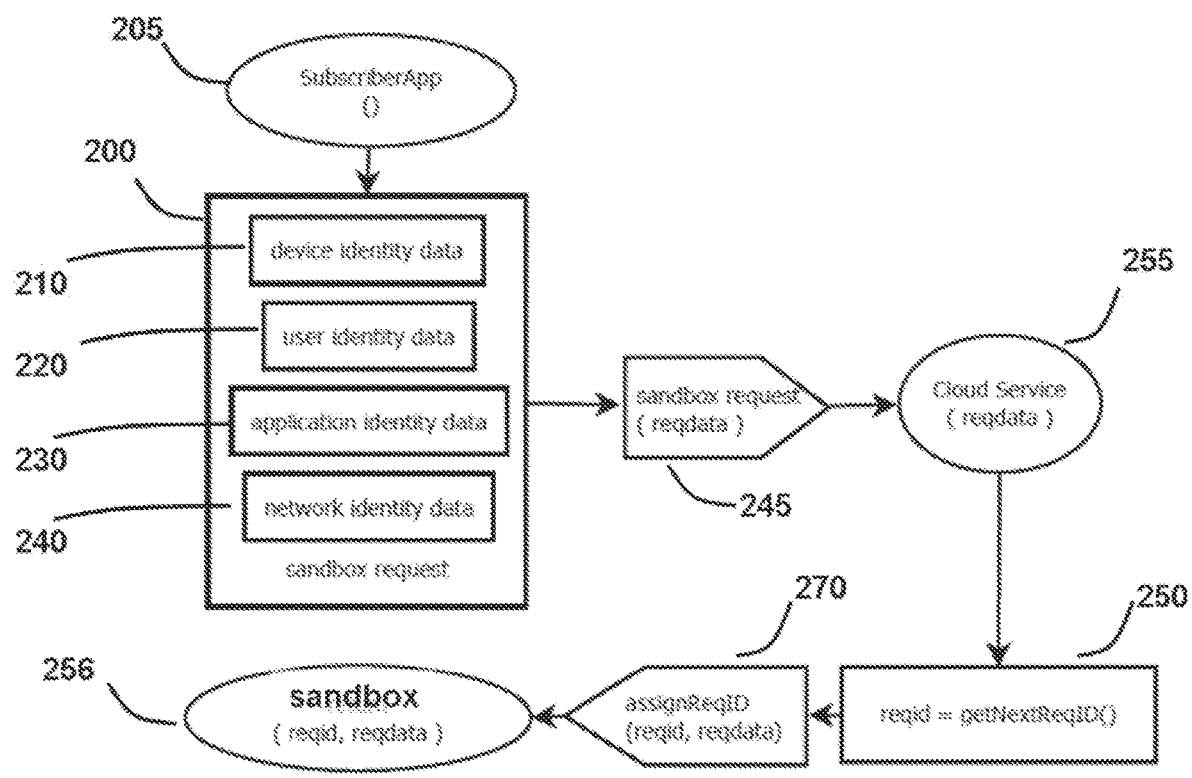
FIG. 3A illustrates an exemplary subscriber application sending a sandbox request to a cloud service process for use with the present system, according to one embodiment.

FIG. 3A illustrates an exemplary Subscriber App (205, 10) sending (245) a Sandbox Request (200) comprised of data such as but not limited to Device Identity data (210), User Identity data (220), Application Identity data (230), and Network Identity data (240) to the Cloud Service (20). For example, the Device Identity data comprises data such as but not limited to the maker, brand, MAC address, and/or serial number of the Mobile Device. The User Identity data comprises data such as but not limited to user account, email address, corporate employee number, app store identification key, etc. The Application Identity data comprises data such as but not limited to the MD5/SHA1 of the App, filesize, package name, filename, binary code. Finally, the Network Identity data comprises data such as but not limited to the User's assigned IP, subnet, GPS coordinates. The above fields can be optionally provided with the exception of the App's filename, MD5, binary code, and User's email.

In an embodiment, prior to considering any Sandbox Request (200), the Cloud Service (20) determines first whether the supplied App Store key (271) of a Sandbox Request (200) is valid. This allows the Cloud Service to provide priority queuing of Sandbox Requests based on their supplied App Store key as well as denial of service for invalid App Store keys. For example, an App Store key may be invalid or associated with an expired or unfunded account, whereas Sandbox Request associated with a Shared/Public App Store Key may be given lesser priority to Sandbox Requests from paying Sub mission Sources.

FIG. 3A also shows that a Sandbox Request (245) message is handled by a thread (255) at the Cloud Service (20) which then forwards (270) a reply to the Subscriber App (205) relaying a Request Identifier (250) assigned to the said Sandbox Request (245). Then, the request for a sandbox evaluation of the Sandbox Request is queued (256) by the Cloud Service for subsequent processing. The Request Identifier (250) is made to be unique as well as valid across all components of the Cloud Service.

Figure 3B:
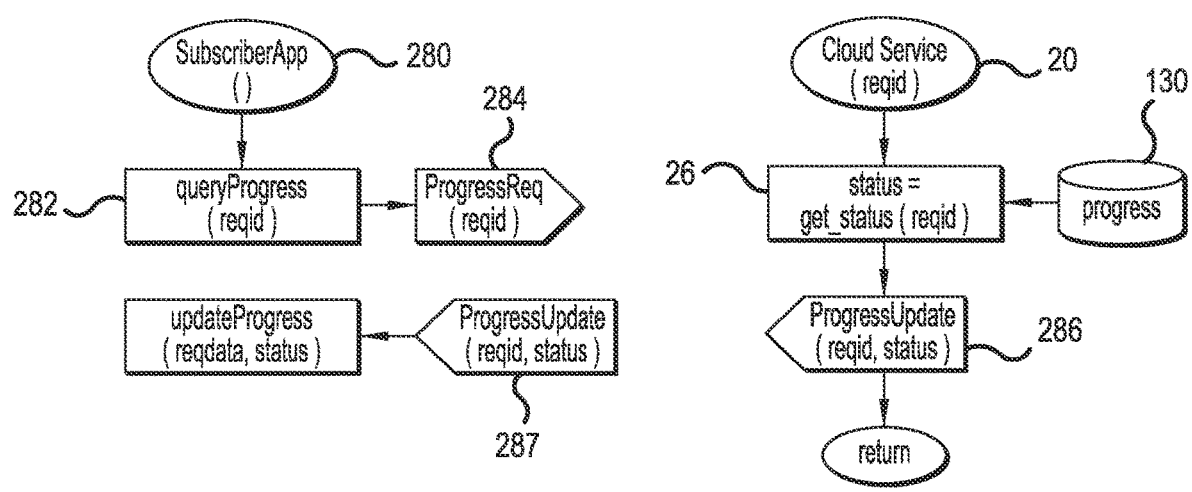
FIG. 3B illustrates an exemplary subscriber application requesting progress from a cloud service process for use with the present system, according to one embodiment.

FIG. 3B illustrates an exemplary subsequent interaction between the Cloud Service (20) and the Subscriber App (10). A thread (280) of the Subscriber App (10) requests (282) progress update information by sending a Progress Request (284) message to the Cloud Service (20) using the assigned Request Identifier (250). The Cloud Service (20) queries the Database (130), retrieving the last progress update record (26) for said Request Identifier (250). The record is then forwarded (286, 287) to the Subscriber App (10), which then updates the status of corresponding Sandbox Request (as described in FIG. 1D)

Figure 3C:
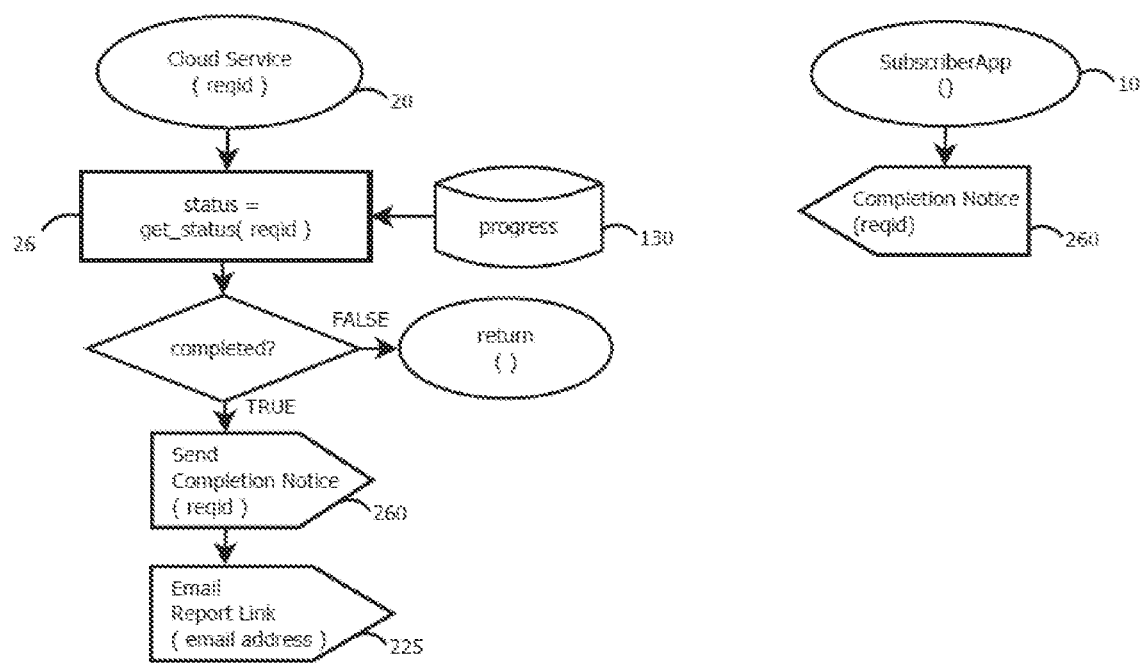
FIG. 3C illustrates an exemplary cloud service sending a completion notice to a subscriber application process for use with the present system, according to one embodiment.

FIG. 3C illustrates an exemplary Cloud Service (20) sending a completion notification (260) to the Subscriber App (10) of the completion of the Sandbox Request (200). At the same time, the Cloud Service (20) emails a report link (225) to the email account previously specified in the user identity data (220). Then, after Subscriber App (10) receives the Completion Notice (260) message, the status of corresponding Sandbox Request is updated (as described in FIG. 1D). In an embodiment, reports links are protected from data mining access by web crawlers and search engines by means of passkeys and secure HTTP access.

The present invention provides means to pre-compute (i.e., prior to access by an user) Analysis reports as well as to generate an Analysis report on-demand (i.e., based on real-time access by an user). To efficiently manage retrieval and updating of Analysis reports, the present invention envisions the use of caching, versioning, re-validation, and on-demand generation of Analysis reports. For example, it is desirable for previously generated Analysis reports to incorporate new enhancements, formats, and/or updates to their underlying analysis-suite and/or underlying data made after their generation. For example, it will be desirable to propagate updates related to analysis-suite facets such as but not limited to updates due to new antivirus result s, updates due to improved machine learning analyses, updates due to enhanced/tailored risk assessments and policies, updates due to blacklisting of new malicious sites, updates due to aggregate-based analysis of IP network reach, updates due to changes on policies related to the curtailment of network traffic, updates due to changes on policies related to privacy and intrusion detection, updates due to enhancements to application binary metadata, etc.) that may arise since the time of the last generation of a report.

Figure 3D:
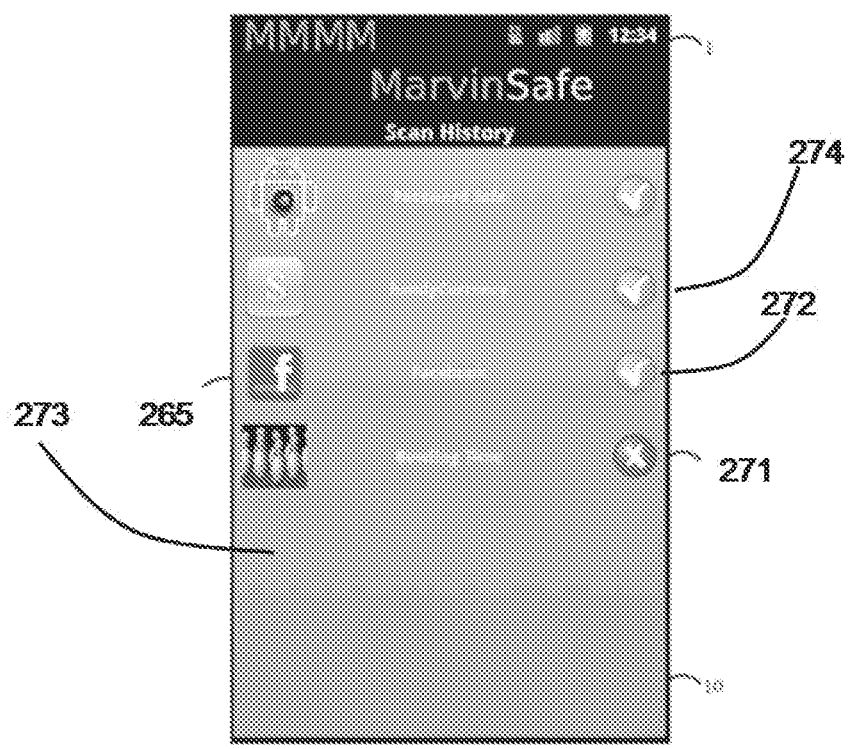
FIG. 3D illustrates an exemplary interface for receiving a completion notice for use with the present system, according to one embodiment.
Figure 3E:
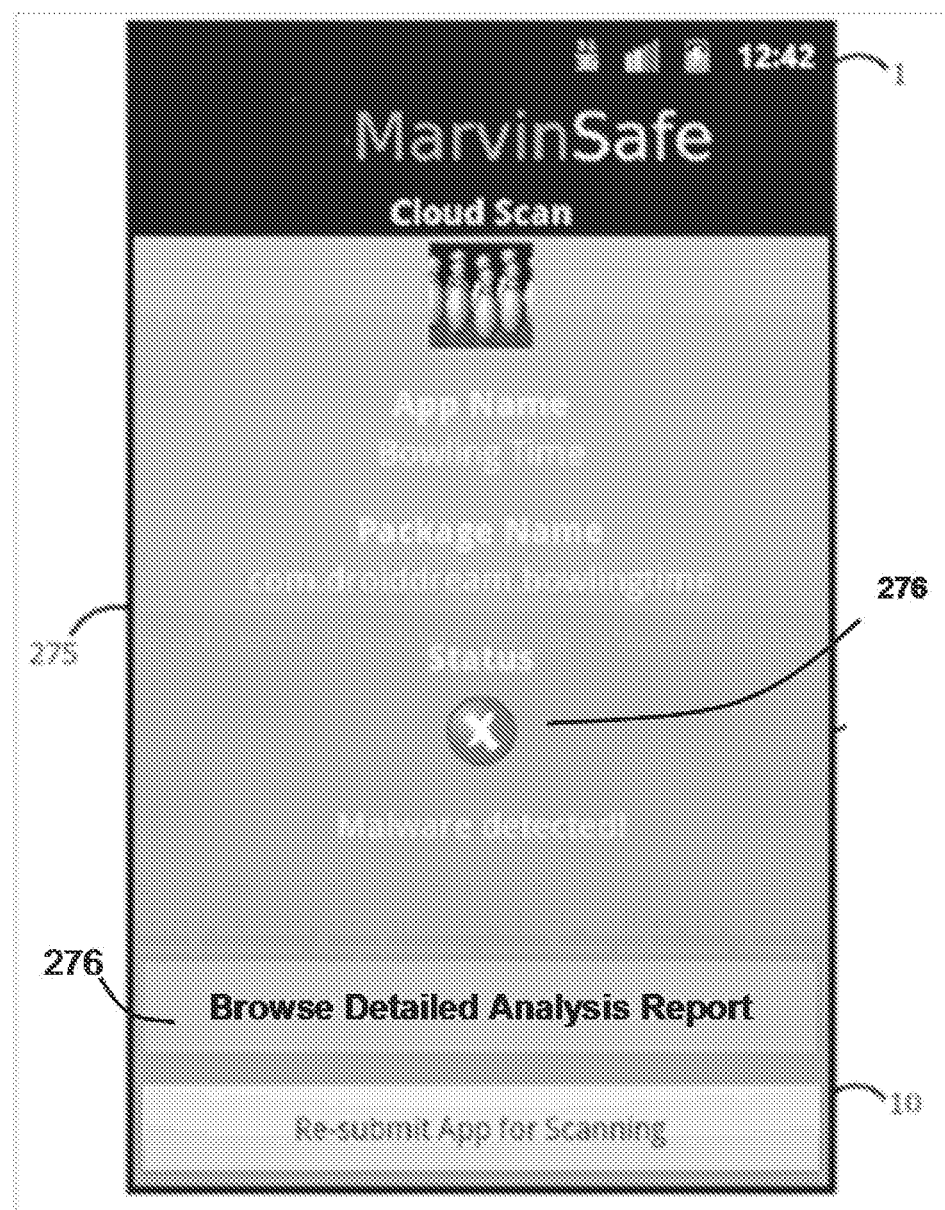
FIG. 3E illustrates an exemplary interface for a mobile device displaying a analysis report link for use with the present system, according to one embodiment.

FIG. 3D illustrates an exemplary view of the Mobile Device (1) with the Subscriber App (10) after receiving the completion notification (260 on FIG. 3C) and displaying a notification icon (270) on the System notification history view (273) on the device screen. Clicking on a notification displays the scan results screen (FIG. 3E). A notification (e.g., 270, 272, 274) for each submission is displayed. The screen displays the history (265) of Apps scanned, showing infection (271) or not (e.g., 272, 274). Dates for the submission can also be displayed. Moreover, clicking on an individual record brings a new screen (see FIG. 3E) with detailed information about the results of said scan and containing a link to the online report.

FIG. 3E illustrates an exemplary Mobile Device (1) with the Subscriber App (10) after the notification icon (270) has been attended to resulting in the subsequent display of details about the scan result (275) and providing with a link (276) to the report documenting the analysis as well as a clear display (277) of the summary findings (i.e., infected in this case).

Figure 4:
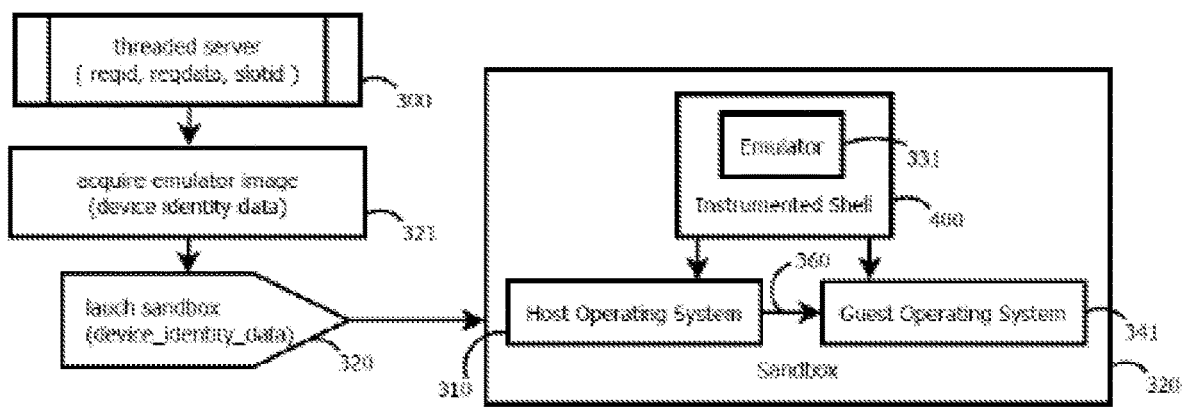
FIG. 4 illustrates an exemplary launching of a sandbox for use with the present system, according to one embodiment.

FIG. 4 illustrates an exemplary Sandbox (320) at a Dispatcher Node (e.g., 140). A Threaded Server (300) uses Device Identity data (210) (e.g., OS version, device type) to acquire an emulator image (e.g., 321) for the Mobile Device (1). Then, the Threaded Server (300) launches a Sandbox (320) comprised of a highly Instrumented Shell (400) around an Emulator (e.g., 331) of a Mobile Device (e.g., 1) that interacts with both the Host Operating System (310) and the selected Guest Operating System (341). The Guest Operating System provides a virtualization environment that allows monitoring and controlling the execution of the App within the Emulator. To allow this interaction, there is a Host-to-Guest Bridge (360) from the Host Operating System (310) to the selected Guest Operating System (e.g., 341) that allows commands to be forwarded from Host Operating System (310) to Guest Operating System (e.g., 341) as well as data to flow on either direction.

Figure 4A:
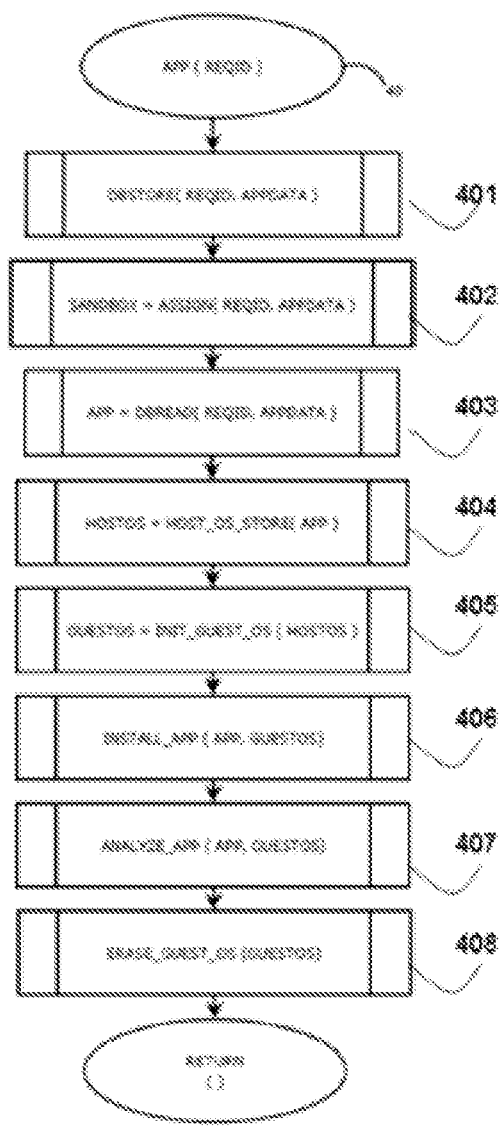
FIG. 4A illustrates an exemplary lifecycle of a application within a cloud service according to one embodiment of the present system.

FIG. 4A illustrates an exemplary lifecycle of an App (40) within the Cloud Service (20). After being uploaded, the Sandbox Request is assigned a Request Identifier (402) and its App is stored (401) into the Cloud Service's Database (130), indexed by its assigned Request Identifier (250). If an analysis for said App is found not to be previously available, the Sandbox Request proceeds to be scheduled for execution. Otherwise, a cached analysis is provided and returned. Caching of analyses is a desirable feature to lower latency of the response as indicated in FIG. 1B. The determination of whether a cached analysis exists may be based on criteria such as but not limited to whether the same App was previously analyzed for this Consumer, for some other Consumer, or for any Consumer based on data such as but not limited to User Identity data. For example, a previous analysis search may be limited to either Consumers from only Country Z, or Enterprise X, or Mobile Carriers Y. According to one embodiment, the present system allows for an override mode that would allow a successfully analyzed App to be re-submitted again for analysis without relying on past analyses. The evolution of malware analysis often requires revalidation of past analysis and such feature is desirable. If the Sandbox Request is to be executed, it is first assigned (402) to a Sandbox (e.g., 321) found on some Dispatcher node (e.g., 140). Then, a thread (300) on said Dispatcher retrieves (403) the App (e.g., 40) from the Database (130) and copies (404) it onto the file system of the Host Operating System (310). Next, a Guest Operating System (e.g., 341) is selected, virtualized, and initialized (405) with an image of a Mobile Device (e.g., 1) and then, the App (e.g., 40) is installed (406), by the Host Operating System (310) via the corresponding Host-to-Guest Bridge (360, on FIG. 4), into the selected Guest Operating System (e.g., 341). Finally, after the App (e.g., 40) is analyzed (407), and the image of the selected Guest Operating System (e.g., 341) is erased (408).

In an foreseen embodiment, the determination of whether to use a cached Analysis report may be subject to further validation using a dependency update model against the various constituent elements of the analysis-suite in a fashion being analogous to the use of Makefiles in a filesystem. Specifically, the validity of a cached Analysis report is dependent on the recency of its associated analysis-suite. In turn, the validity of each of its analysis is dependent on elements related to control (such as but not limited to parsers and algorithms), data (such as but not limited to log files and tables), and/or presentation (such as but not limited to XML/HTML formatting). In the foreseen embodiment, a simple dependency rule validates the use of a cached Analysis report if the above-mentioned constituent control, data, and presentation elements for all analyses within an analysis-suite have not been modified since the timestamp of the generated cached Analysis report.

Figure 4B:
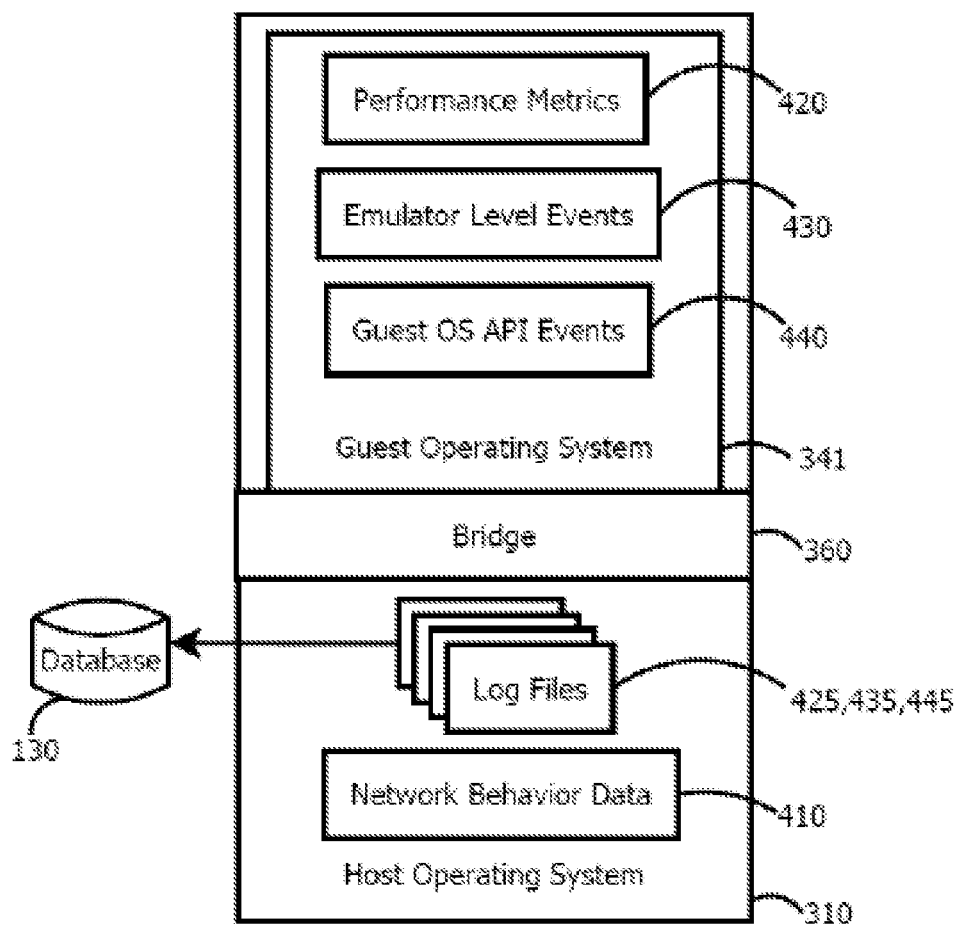
FIG. 4B illustrates an exemplary instrumented shell in relation to a host and guest operating system according to one embodiment of the present system.

FIG. 4B illustrates an exemplary Instrumented Shell (400) in relation to the Host Operating System (310), the selected Guest Operating System (e.g., 341) and their corresponding Host-to-Guest Bridge (360). It illustrates that Network Behavior Data (410) is captured outside the Guest Operating System (341), performance metrics (420), emulator (e.g., 331)-level events (430), and Guest Operating System (e.g., 341)-level API events (440), etc. are captured within the Guest Operating System (341). The output of this instrumentation is stored into Log Files (425, 435, 445, etc.) and later stored on the Host Operating System (310). There, the Dispatcher will subsequently store these Log Files on the Database (130) indexed by the corresponding unique request identifier (250) associated with the just analyzed Sandbox Request (200). In the present invention, an Emulator (e.g., 331) is provided bi-directional network access to the Internet and the Web. In an embodiment, network access to/from an Emulator (e.g., 331) is mapped by the underlying Guest Operating System (e.g., 341) to the network interfaces of the supporting Host Operating System (310) which then provides access to networks.

It is known that an application binary could make use of secure HTTP traffic for covert or malicious reasons. In a foreseen embodiment, all secure HTTP traffic to/from a particular Emulator (331) is intercepted, inspected, logged, and then relayed by an intercepting HTTPS proxy (such as BURP [http://www.portswigger.net/burp/proxy.html]) located at the Host Operating System (310). The resulting transaction log would allow for forensic content analysis of secure HTTP transactions such as but not limited to intrusion detection alerts, identification of HTTP transferred objects such as but not limited to parameters, leaks, and files, and inferential detection of the presence of compressed network traffic. By these means, the present invention provides means to detect the presence of a multi-stage malware payload. For example, a two-stage malware binary delivers its malicious payload by means of the distribution of a relatively non-malicious first-stage application binary which once executed, simply downloads a malicious second-stage application binary which is then installed and launched on the Mobile Device.

The present invention provides means to forensically identify, reassemble, and analyze downloaded as well as uploaded objects found in the capture network streams. The present invention identifies, reassembles, and autonomously scans for the presence of malware on network-transferred objects such as but not limited to PNG/JPG/GIF images, text/html documents, pdf files, and flash objects. In a foreseen embodiment, all identifiable network transferred objects will be further subject (based on criteria such as file type) to specialized scans such as but not limited to Javascript exploit analysis, HTML/CSS validation, Adobe PDF/Flash exploit s, risk assessment of second-stage application binaries, etc. This way, the invention provides means for detecting the download of an intentional or not second-stage malicious network object (e.g., Flash exploit) from a seemingly non-malicious first-stage application binary.

The present invention also provide means for down-scaling the aggregate submission rate Y from multiple Submission Sources. In the preferred embodiment, the Webserver (100) queues a persistent version of the Sandbox Request (200) and immediately returns the assigned Unique Request Identifier (250) back to the originating Submission Source (e.g., an App Store) via the SandboxResp Message (515). A Queuing Server/Scheduler (145) then schedules the queued Sandbox Request by sending the SandboxReq Message (510) to the Controller (120) but at some rate X set based on some criteria (such as but not limited to completion rate per hour and available and/or engineered Emulator capacity). This way, the invention provides throttling control means to enforce down-scaling an arbitrary submission rate X to a maximum processing rate of Y. These means allow an App Store is able to batch submit thousands of application binaries for analysis without wait. In a foreseen embodiment, the Queuing Server/Scheduler (145) also provides priority scheduling of Sandbox Requests based on criteria such as but not limited to App Store Keys, email/login, geoip, etc. of queued Sandbox Requests.

The present invention also provide web interface access to selected individual analysis components of the analysis-suite such as but not limited to inferential risk assessment via redflags static analysis, summary and detail of network analytics, one-page summary findings analytics, and malware-rating for the given application binary. In the preferred embodiment, if the application binary does not validate to a cached Analysis report, all these requests for specialized analyses result also on the underlying request being carry-over into a normal Sandbox Request subject to the comprehensive analysis-suite. Herein these requests are referred to as Carryover Requests.

The present invention is designed for scalability of concurrent Sandbox Requests. The Controller maintains a one-to-many relationship to multiple Dispatcher nodes. In essence, the Controller provides a mapping service between a Unique Request Identifier (250) to a suitable Sandbox selected from an arbitrary number of Dispatcher (e.g., 145) nodes based on some aggregate (e.g., load balancing) and/or individual (e.g., device type) suitability criteria and where Dispatcher nodes may not be net work-collocated. In turn, a Dispatcher node may have one or more Sandboxes per node and the number of Sandboxes per Dispatcher may be set to be fixed or variable in accordance to some criteria such as but not limited to number of CPU cores and/or available memory present within the Dispatcher node.

At a minimum, a Dispatcher needs only the knowledge of said mapping (i.e., an Unique Request Identifier to an available Sandbox), in order to retrieve all associated Sandbox Request data from the net work-shared Database (130). After completion of a Sandbox Request, a Dispatcher needs only to store all execution logs (e.g., 425, 410) extracted during the simulation of the Sandbox Request into the network-shared Database (130). Dispatcher nodes can be large-scale deployed on network-accessible server farms (such as Amazon Cloud Services) to address scalability concerns whereas the remaining Cloud Service components may be run elsewhere. For very large-scale server farm deployments it may be necessary to lessen the imposed network load into the network-shared Database (130) component. A reader versed in the arts will appreciate that a caching/local Database could then be used to lessen this network load. Specifically, each partition or sub set of remote (i.e., server-farmed) Dispatchers would be associated to a local (to the server farm) Database and then each local Database would be assigned a batched update schedule to efficiently batch-relay completed execution logs into the network-shared Database. For efficiency, a local Database may periodically be truncated from such successfully transferred records.

The preferred embodiment relies on the Controller to issue an asynchronous notification (of a mapping) to a Dispatcher node. Yet in a foreseen embodiment, a Dispatcher can instead poll the network-shared Database for said mapping. However, the preferred embodiment is more amenable to large scale deployment because of avoiding this polling effort. Moreover, the Controller node in the preferred embodiment provides means to enable a decision-making point capable of managing, allocating, activating, and disabling dynamic instances of Dispatcher nodes to match demand for services.

Figure 5:
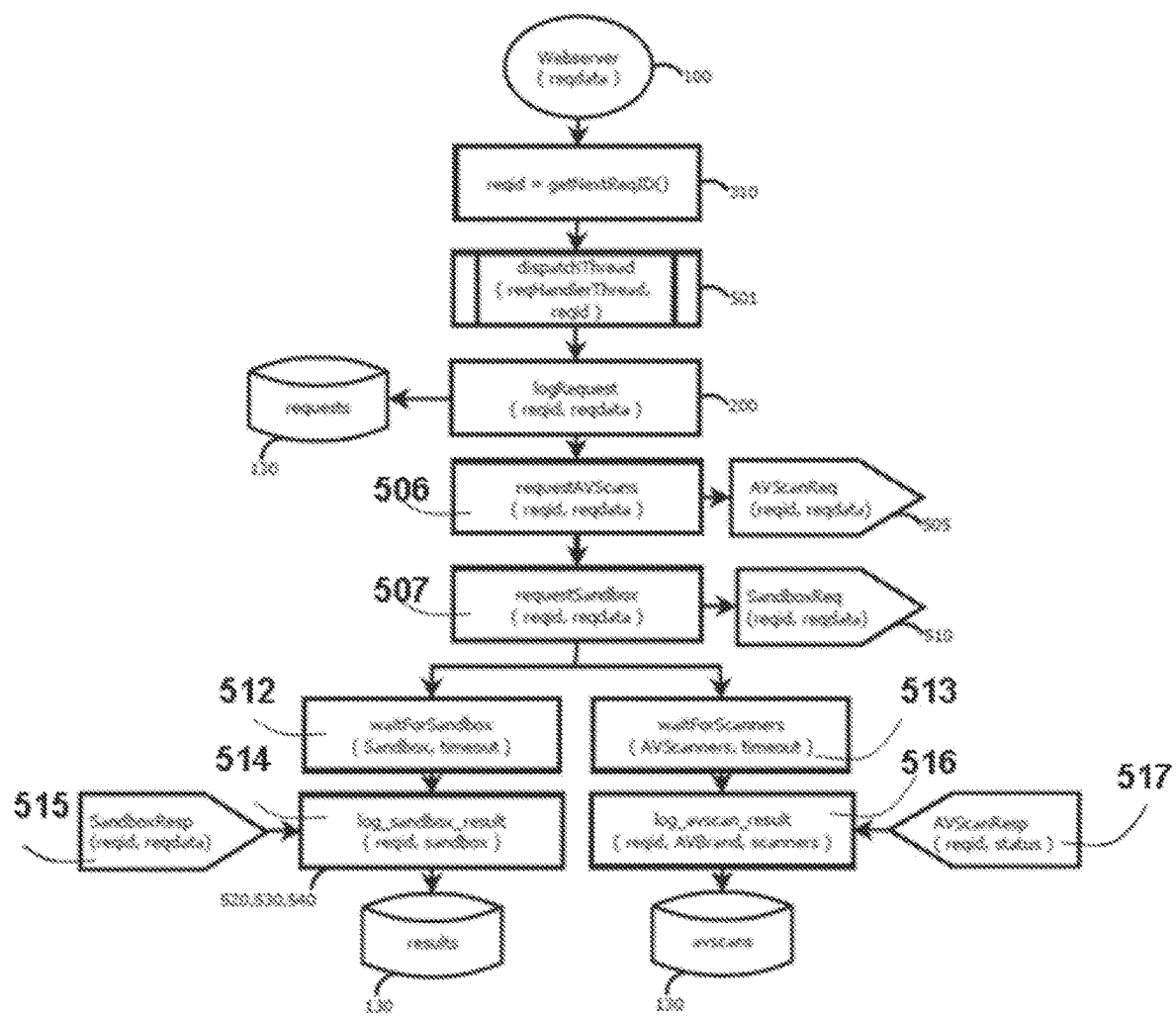
FIG. 5 illustrates an exemplary process for a web server handling a sandbox request according to one embodiment of the present system.

FIG. 5 illustrates an exemplary process for a Web Server (100) handling a Sandbox Request (200). The Web Server (100) assigns a Unique Request Identifier (250), launches a new thread (e.g., 501), and logs the Sandbox Request (200) to the Database (130) indexed by the said Unique Request Identifier (250). The Web Server (100) then sends (506) a Scanning Request (505) that triggers asynchronous antivirus analysis (i.e. static analysis) from an AV Server (e.g., 170). Note that the Scanning Request (505) relays the Request Identifier (250) to the AV Server (e.g., 170). The thread (501) then proceeds to send (507) a Sandbox Allocation Request (510) to the Controller (120) seeking a (suitable) assignment of this Sandbox Request (e.g., 200) into a Sandbox at some Dispatcher Node (e.g., 140), this based on criteria such as available Dispatcher's resources and/or Device Identity data (210). The thread (501) waits (512) for the completion (e.g., 515) of the Sandbox Request (200) and logs (514) the results into the Database (130). At some point in time, the asynchronous AV scans of the App will notify (517) of their completion and subsequently update (516) the Database (130) with the corresponding scanning results.

The Sandbox Request can be terminated due to a form of a successful completion (515), caching (520), or a timeout (530) of the timer controlling the maximum allowed duration for the execution of any Sandbox Request.

Figure 6:
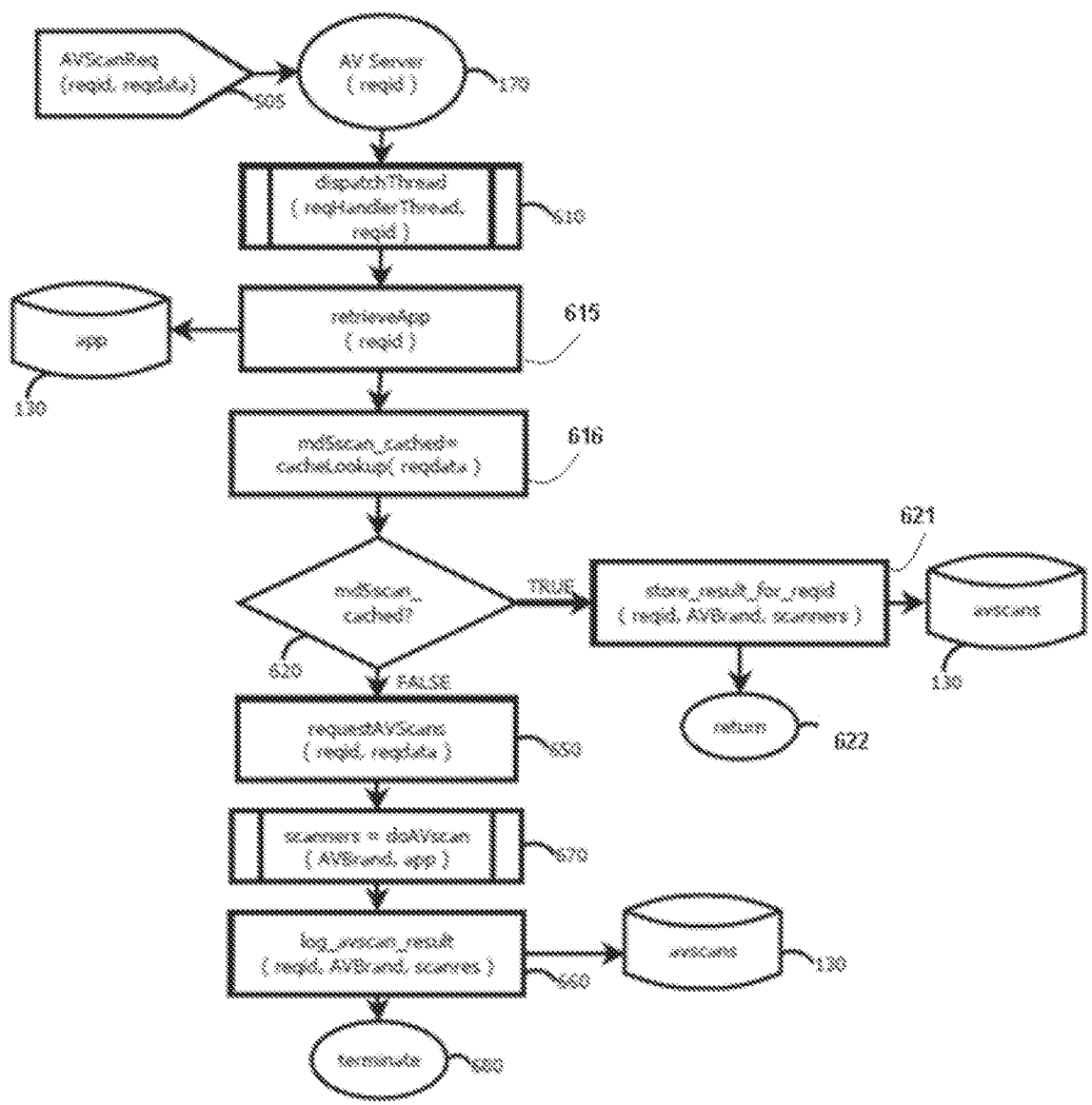
FIG. 6 illustrates an exemplary process for an AV (antivirus) server according to one embodiment of the present system.

FIG. 6 illustrates an exemplary AV Server (170). First, it launches a thread (610) to handle each new Scanning Request (505). The thread (610) uses the Unique Request Identifier (250) sent with the Scanning Request (505) and retrieves (615) the App (20) from the Database (130). Next, it computes the MD5/SHA1 (616) for the App (20) and queries (620) the Database (130) to determine if any AV scanning results (630) for the same App (20) have already been logged by some previous Sandbox Request (i.e., not 200). If so, it stores (621) the results in the Database (130), this time indexed by the given Request Identifier (250) and terminates (622). Otherwise, it scans (650) the App and waits (670) for the completion of the scan to trigger (660) the storing of the AV scanning results into the Database (130), indexed by the given Request Identifier (250) and terminates (680).

Figure 7:
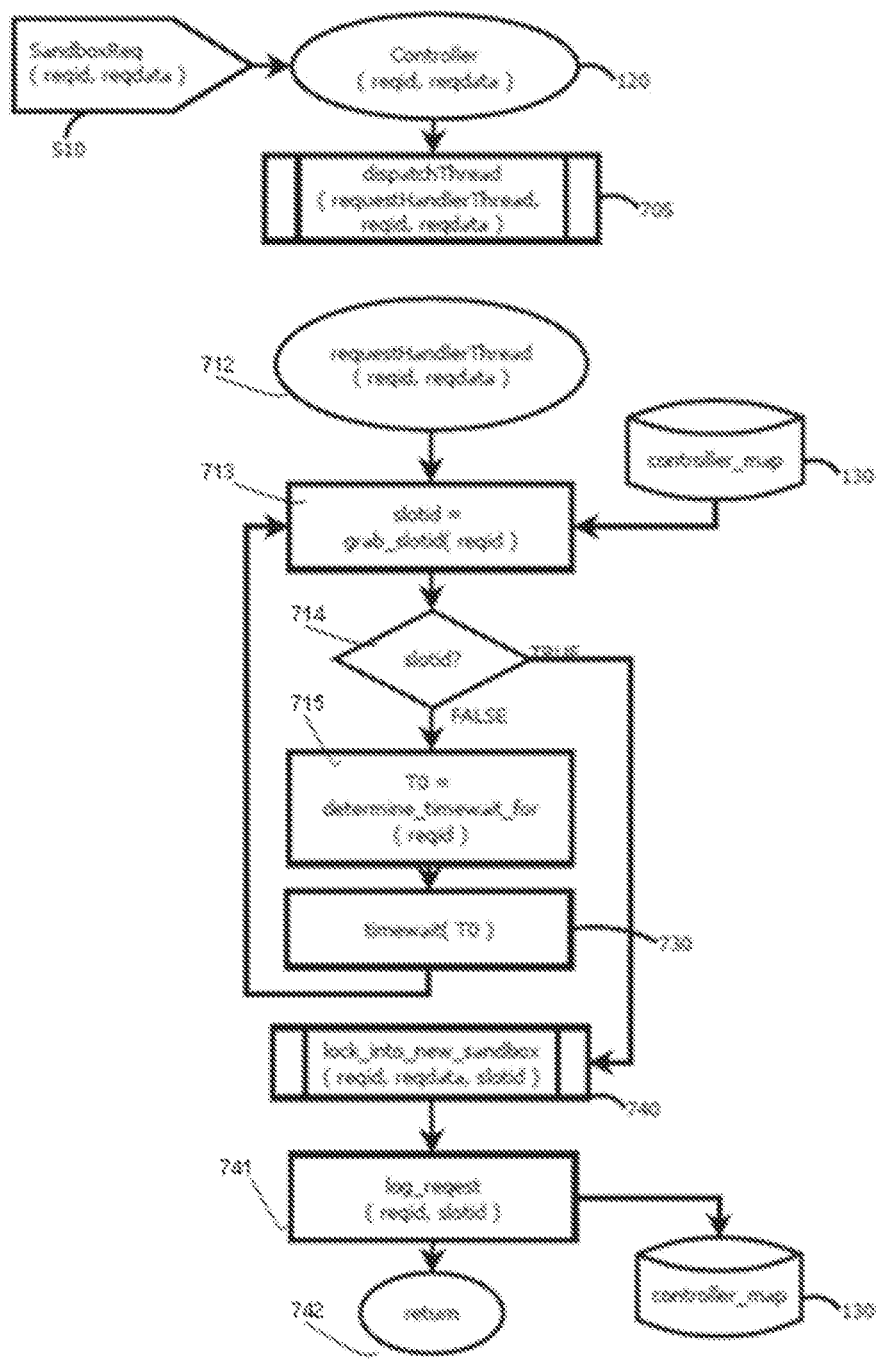
FIG. 7 illustrates an exemplary process for a controller for use with the present system, according to one embodiment.

FIG. 7 illustrates an exemplary Controller (120). Upon receipt of a Sandbox Request (510), a new thread (705) is spawned to find an available (and/or suitable) Sandbox (e.g., 320) to complete said Sandbox Request. The present system provides that said allocation of an available Sandbox to a pending Sandbox Request is based on criteria such as but not limited to availability, server load, device type. The present system provides that the emulator chosen for executing a request is selected among the top market share devices set at the respective supported Device OS releases.

The present system foresees that the Sandbox be chosen on criteria such as but not limited to Device Identify (210) of the Mobile Device used to submit the request or Submitter API's Device Identity.

The Controller (120) maintains a Controller Mapping structure tracking the allocation of Sandboxes to Sandbox Requests. The Controller Mapping structure is also used to determine which Sandboxes are currently available and where at. The Controller Mapping is a shared data structure that is updated across all Sandbox Request threads and as such, the Controller enforces the integrity of access to this shared data structure by said concurrent threads via the use of a shared lock.

The thread (705) attempts to schedule (713) its Sandbox Request into a Sandbox and if successful (714), it then locks in (740) to the new Sandbox and then logs (741) the request to the Controller Mapping structure in the Database (130), indexed by the Request Identifier (510, 250) for said Sandbox Request (e.g., 200) and returns (742).

If no Sandbox is available (720) the thread (705) causes the Sandbox Allocation Request (510) to become dormant (730) for a finite amount of time (715) and then proceeds to re-attempt scheduling (713). If necessary, this process is repeated until either the Sandbox Request is scheduled or under extraordinary circumstances, until some maximum number of attempts has been made.

Figure 7A:
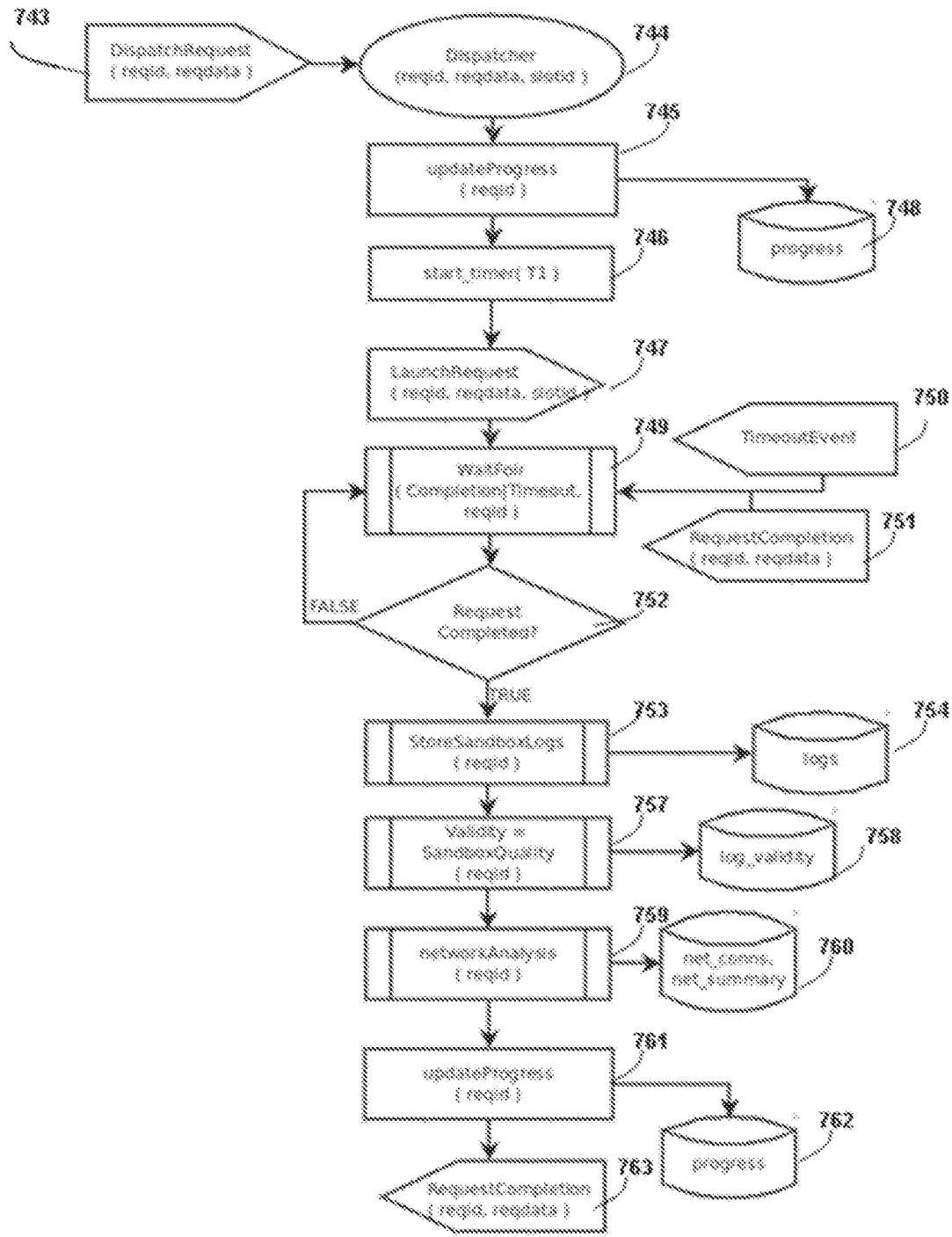
FIG. 7A illustrates an exemplary process for a dispatcher for use with the present system, according to one embodiment.

FIG. 7A illustrates an exemplary Dispatcher. Upon receiving a Dispatch Request (743) message from the Controller, a Dispatcher updates (745) the Progress Status (748) of this Sandbox Request. Then, it starts a timer (746) to control the maximum amount of time allotted for the execution of the Sandbox Request. Next, it launches (747) a virtualization setup that will execute the Sandbox Request on a specified Sandbox and waits (749, 752) for a Request Completion (751) event that signals the successful completion of the execution in the allotted Sandbox. Alternatively, it is possible that the execution of the Sandbox may time out (750). Next, it stores (743) the behavioral and static Log Files obtained from the execution of the Sandbox Request into the Logs (754) Table in the Database. Additionally, it computes (757) and stores (758) a metric related to the quality or validity of these Log Files so as to assess the fitness of use associated with the execution of the Sandbox Request. Then, it applies post-processing analysis such as but not limited to network analysis (769), feature vector generation, etc. and then populates (760) the database with the results. Finally, it updates the Progress Status of this Sandbox Request and informs the Controller of the completion of the Sandbox Request via the Request Completion (763) message.

Figure 7B:
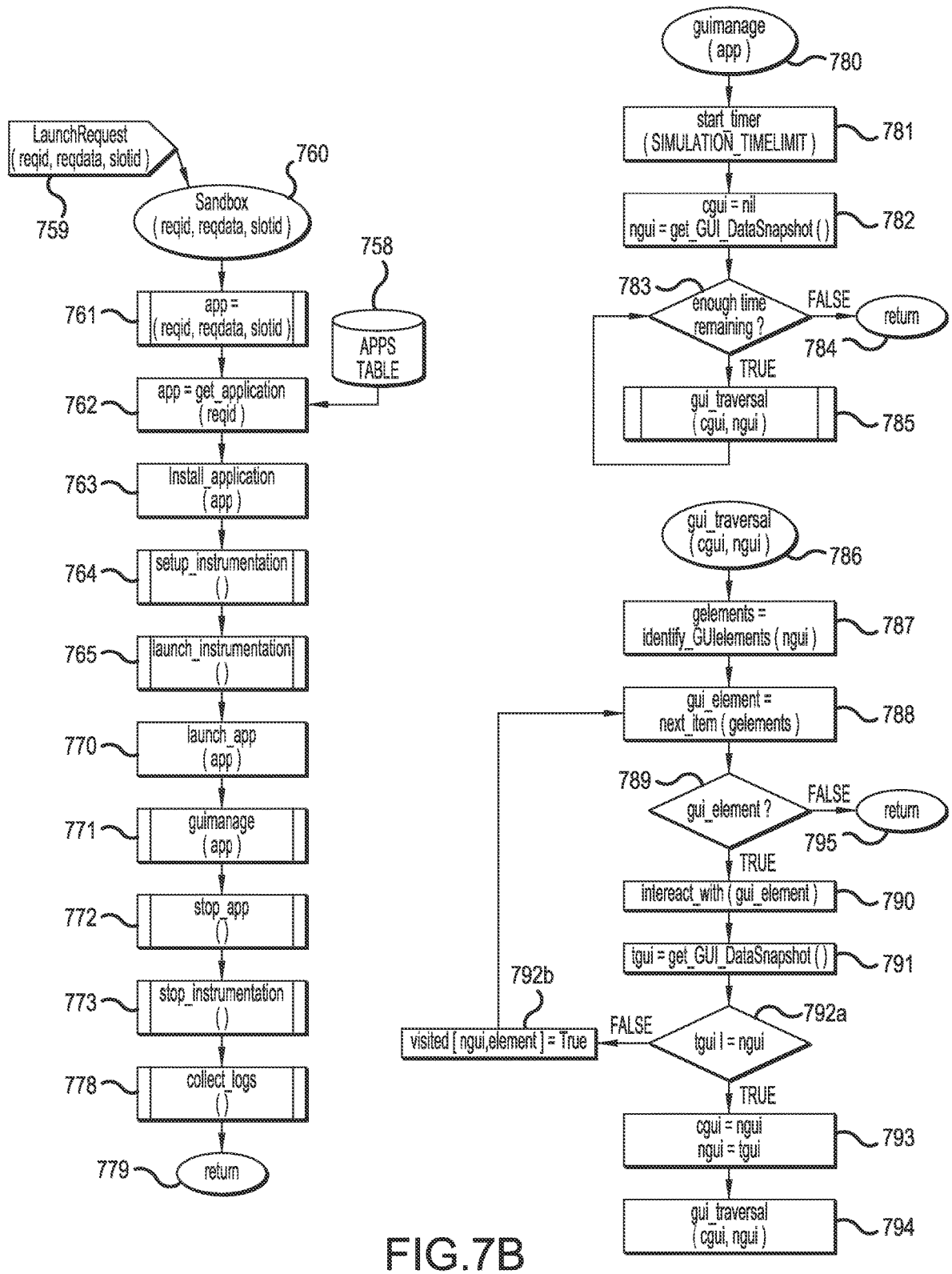
FIG. 7B illustrates an exemplary process for autonomous user interface traversal during the execution of a sandboxed application binary, according to one embodiment.

FIG. 7B illustrates an exemplary Sandbox API. Upon receiving a Sandbox Request (759), the Sandbox (760) is started. First, it performs initialization steps such as retrieving a suitable emulator for the Mobile Device and starting the emulated device. Then, the App is retrieved (762) from the Database (130) and then installed into the device (763). Instrumentation is then installed (764) and launched (765). Then, the App is launched (770) and its User Interface is then exercised (771). After the exercise of the App's User Interface is completed, the App is terminated (772), the instrumentation is stopped (773), and the resulting Log Files are collected (778).

The above mentioned software specification for the Sandbox API may be satisfied by different plug-in components such as but not limited to a virtualized software emulation of a Mobile Device, a physical Mobile Device, a combination of such.

According to one embodiment, said exercise (771) of the User Interface (UI) of an App is comprised of steps such as but not limited to:

identity the set of UI Elements present in an UI Activity Window, select, in accordance to some criteria, an UI element from said set, interact with said UI Element, discover whether said interaction with an UI Element results in a change of UI Activity Window, update a Activity Visitation Matrix with discovered transitions between an UI Activity Window to the same or different UI Activity Window via said interaction with an UI Element, iterate over all UI Elements in an UI Activity Window, and/or iterate over all UI Activity Windows discovered.

The Activity Visitation Matrix abstracts observed UI transitions of the given App via tuples of the form: [FromActivityWindow, Interaction(Element)→ToActivityWindow], corresponding to Present State (i.e., FromActivityWindow), Transition (i.e., due to Interaction(Element)), Next State (i.e., ToActivityWindow), respectively of the finite state machine discovered by parsing the application binary's user interface.

It is also a feature of the present invention that application binaries that failed to behave properly under autonomous GUI traversals be flagged for subsequent submission to a Manual Operator Queue. These application binaries will then be exercised by a human in accordance to well-defined procedural steps in a manually controlled sandbox environment. The present invention prescribes that said flagging of failed UI interact ions be detected by means of a fine-grained aggregate-based analysis of the resulting User Interface traversal (UI) feature set profile. The UI traversal profile contains features such as but not limited to the total number of activities encountered, the total number of UI elements discovered, the total number of UI elements interacted, the total number of traversal restarts required, etc.

The present invention provides means to assess the historical performance by close examination of the instrumentation log files produced by all Sandbox simulation within an arbitrary time range in a Dispatcher. The present invention autonomously schedules a Dispatcher evaluation analysis that examines the selected Sandbox Instrumentation Logs for the presence of a known set of valid and incremental progress markers within. This way, the system is capable of producing evaluations of whether within an arbitrary time range, the Sandbox simulations appeared to complete satisfactorily or otherwise, how many failed to perform and itemize which failure sequences were observed and at which stage where failures observed. This way, when a set of known application binaries is periodically submitted, the present invention provides means for autonomous regression testing.

The present invention maintains an assortment of analysis result caching tables used to speed up response time by the Cloud Service to requests. To speed up response, it is a feature of the present system that all these tables be indexed by both Unique Request Identifier and associated MD5 for the underling application binary. An exemplary list of these tables comprises the following but is not limited to:

a Network Connections Table itemizing all network transactions, a Redflags Table itemizing all identified redflagged findings from inferential static analysis, a Network Transferred Objects Table itemizing all identified network-transferred objects, various Event-based Tables itemizing all Guest Operating System-level (e.g., AndroidOS) events logged during execution, an Intrusion Detection Table itemizing all observed network-based alerts for leaks, malicious sites, malware, etc., a Screenshots Table itemizing all screenshots extracted during execution, a Malware Rating Table itemizing rating and confidence details about an application binary, a Findings Table itemizing findings made about an application binary, a Log Validation Table itemizing details about the validity of extracted logs, a UI Traversal Table itemizing details about the coverage and traversal findings observed during execution, and a File Integrity Table itemizing details about file system changes observed during execution.

The present invention maintains an assortment of support tables used to support operations by the Cloud Service. An exemplary list of these tables comprises the following but is not limited to:

a Queued Requests Table itemizing a persistent version of incoming Sandbox Requests and used to (1) slow down the incoming arrival rate at the Webserver of Sandbox Requests into a fixed QoS rate at the Controller and (2) allow restarts of the Cloud Service with loss of pending Sandbox Requests, an Offline Tasks Table itemizing all analyses to be performed forensically after the successful extraction of execution logs for a Sandbox Request, and used for (1) triggering the specified analysis against the execution logs associated with the specified Unique Request Identifier, a Mapped Requests Table documenting details associated to which Sandbox Requests were cached or not in terms of a mapping between Unique Request Identifiers, a Carryover Request Table documenting all specialized analysis requests (e.g., redflags risk assessment, network analytics, malware rating) placed onto the Cloud Service and used to (1) initiate and document a carryover Sandbox Request for each such, a Report Passkeys Table mapping a passkey to each Unique Request Identifier and used to (1) limit and validate network access to Analysis report obtained with a Unique Request Identifier, an App Stores Table itemizing all App Store Keys for each App Store and their current usage statistics, and an App Store Requests Table itemizing the App Store key supplied on each Sandbox Request and used to (1) perform Dashboard analytics projections over da a with respect to App Stores.

The present invention provides means for maintaining usage and credit totaling per App Store. In one embodiment, once a Cloud Service request (e.g., Sandbox Request) is received, the credit tot al for the corresponding App Store associated to the supplied App Store key is updated to reflect the cost in credits of the request. The invention also provides means to support free of cost submissions to the Cloud Service; a public App Store key is populated by default and associated to non-paying submissions. In a foreseen embodiment, its associated credit total is periodically replenished based on some set criteria such as but not limited to maxi mum number of submissions per hour, day, and/or API type.

The present invention maintains an assortment of support tables and rules used to support operations by the analysis suite. An exemplary list of these tables (and uses) comprises the following but is not limited to:

an Ad Servers table listing commercially known ad-server sites and used to (1) itemize which network traffic transactions and/or content reached known ad-servers, a Malicious Sites table listing malicious sites and used to (1) itemize which network traffic transactions and/or content reached known malicious sites by name, a Malicious Ips table listing malicious internet addresses and used to (1) itemize which network traffic transactions and/or content reached known malicious sites by IP address, a Default Apps table listing the set of application binaries found to be installed by default on a device and used to (1) prevent reprocessing of said default apps, a Metadata table listing any App Store provided metadata for application binaries and used to (1) expand Analysis reports with said relevant metadata for said application binary, an Intrusion Rules listing intrusion detection rules and used to (1) configure the forensic application of intrusion detection content analysis over net work traffic logs scanning for content such as but not limited to previously planted data, emails, passwords, accounts, usernames, tokens, SMS messages, identifiers, phone numbers, malicious sites and addresses, and malware signatures, and a Redflags Rules listing risk assessment redflags, used to (1) configure the application of inferential risk assessment static analysis over the application binary, used to infer risk via (but not limited to) API calls, tokens, adjecency of API calls and/or tokens, and obfuscation level.

In a foreseen embodiment an App Store will be allow to supply custom metadata to populate the above-mentioned Metadata table. By keying this table with MD5 as well as App Store key it will now be possible to enhance the Analysis Reports generated for this App Store with data such as but not limited to: (1) App Store brand, (2) selected App Store metadata for application binary (e.g., number of downloads, cost structure, developer information), and (3) selected feedback, information, reviews, and recommendations from App Store content.

Figure 10:
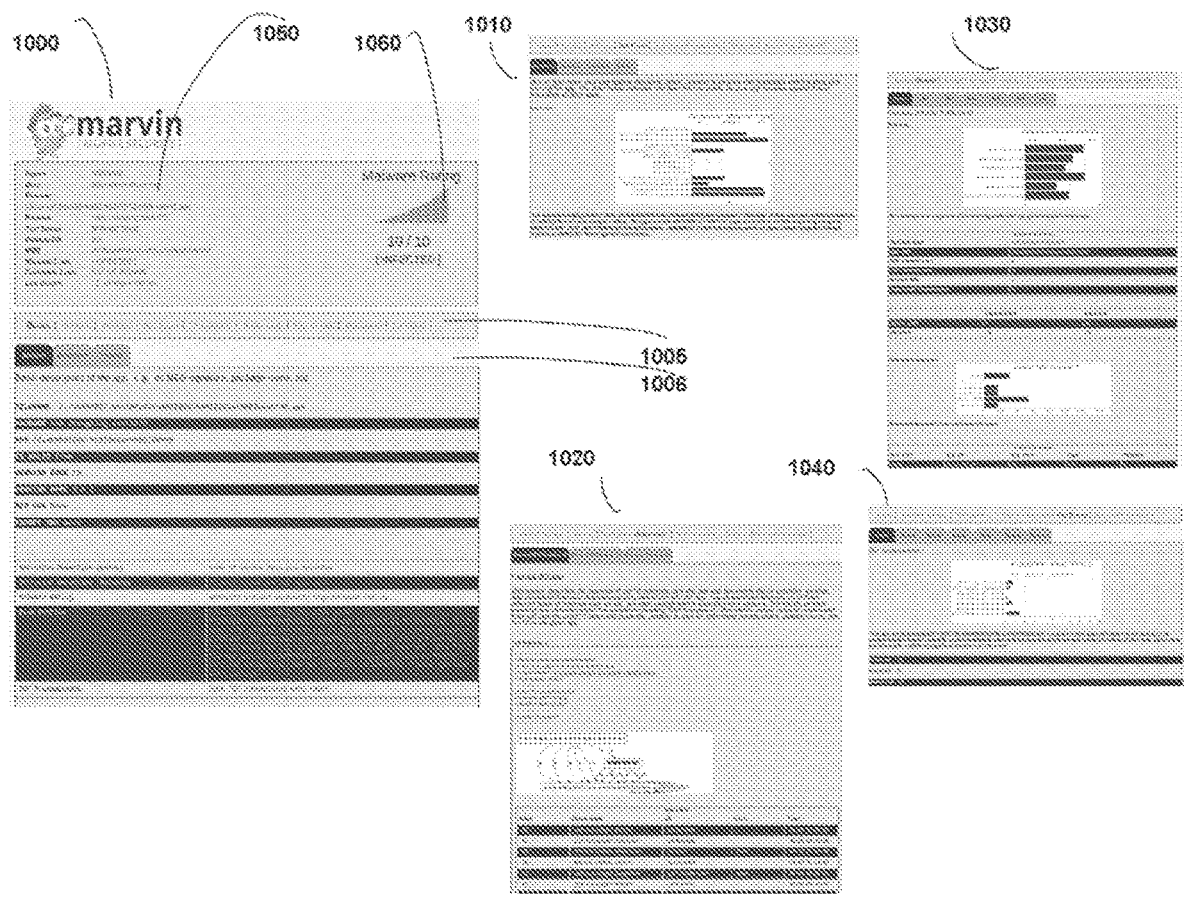
FIG. 10 illustrates an exemplary end-user report interface for use with the present system, according to one embodiment.

FIG. 10 illustrates an exemplary End-User Report (1000) intended for the Consumer and made accessible to a Consumer via a Universal Resource Locator (URL) emailed by the Cloud Service to the e-mail associated with the corresponding Sandbox Request. The report consists of a common Header area (1050) and a series of report sections (e.g., 1010, 1020, 1030, 1040) containing the analysis findings for each specialized forensic analytics (e.g., static analysis, network analysis, file system analysis, etc.). Access to each of these sections is provided via a contents navigation bar (1005) listing a link with the name for each of analyses implemented. The contents of the presently selected section of the report is presented on the area (1006) below the contents navigation bar (1005). For illustration, examples of the content appearance of these sections are also shown: static analysis (1010), user interface traversal analytics (1020), network analytics (1030), and file system analytics (1040). The invention provides means to customize the contents of the report by selecting which access links to display on the contents navigation bar (1005) of a report based on some criteria such as submission source and/or app store key. A Header (1050) area is common to all sections of the report and is used to emphasize basic attributes and summary findings about the Analysis of the application binary. The Header has two sections, a text-based stats section (1050) and a graphical malware rating section (1060).

The stats section of the Header (1050) is comprised of given attributes such as but not limited to: a unique inquiry number, the date that the Analysis was performed, the filename supplied for the application binary, the identified package name of the application binary, the target emulated device used to evaluate the application binary, the target Guest Operating System used to evaluate the application binary, the MD5 associated with the application binary as well as derived attributes such as the malware label associated by analysis of the application binary, the machine learning label associated to the application binary, and the log validity and/or quality associated with the logs extracted after execution of the application binary. In a foreseen embodiment, this section will display a relative quality indication of the autonomous User Interface traversal analysis.

The graphical rating section (1060) contains a visual indication of the confidence of the analysis that the malware is suspect to be malicious. The present invention uses a numerical scale (such as but not limited to a rating from 0 through 10) to rate increase in confidence. For example, a malware rating of 0 indicates that the Analysis did not discern causes of concern, whereas a malware rating of 10 indicates that the application binary exhibits known or derivative to known malicious behavior and then malware ratings in between indicate an accumulation of cause for concern. In an embodiment, this visual indicator is enhanced with additional information intended to highlight the nature of the risk exposure associated with the application binary (e.g., network exposure, privacy/identity leak, etc.).

The report consists of several different sections such as but not limited to:

Basics section (1000), comprised of summary and essential key findings about the Analysis of the application binary, optional (public) metadata about the application binary, initial screenshot upon launching the application binary, and summary and detail of the integrated timeline of events obtained from time-based correlation of Guest Operating System logs (such as but not limited to event log, activities logs, network connect ions log, intrusion detect ion log, etc.);

Redflags section (1010), comprised of comparative risk assessment profile for the application binary documenting risk per end-user area of interest (herein referred to as a redflag category), summary and detail of activations of redflag rules and categories, summary and graphical detail of context surrounding the activation of each redflag rule, and identification of a application binary with exhibiting similar risk assessment;

UI Automata section (1020), comprised of comparative statistics about the discovery windows, UI elements, stimuli applied to these, and resulting traversals discovered by the UI Automata in accordance to up to three different traversal techniques;

Network section (1030), comprised of Network Analytics and aggregate-based comparative profiles for Packet Traffic, Domain Name Resolution (DNS) for Internet addresses and Geo IP analysis of network access, intrusion detection analysis, network transferred files analysis, TCP connection analysis, UDP connection analysis, and HTTP transaction analysis;

File System section (1040), comprised of aggregate-based comparative profile and results of file system integrity analysis documenting modified, deleted, renamed, added, and unchanged files during the execution of the application binary;

Antivirus section (1050), comprised of static AV Scanning Results and results from Machine Learning analysis over static and behavioral features; among the sections shown in FIG. 10. Other sections not shown in FIG. 10 are such but are not limited to:

social network visualization for network connectivity with labeling of ad-servers, malicious-sites, countries, subnets, and infected application binaries, basic static analysis information such as but not limited to declared permission, files, methods, constants, strings, declared intents, services, sandbox instrumentation file;

CPU, memory, and thread-based performance analysis and aggregate-based comparative profile, and statistical summary for system calls within the Host Operating System and associated aggregate-based comparative profile.

The preferred embodiment provides with support for fine-grained aggregate-based analysis for most analysis components (e.g., network features, file system integrity features, system API-calls features, performance features, UI traversal features, etc.) of the analysis-suite. To perform a fine-grained aggregate-based analysis for a particular feature set of a given application binary, the system composes a profile comprised of two or more features of interest in said feature set. The system stores each such computed profile resulting in an ever-accumulating collection of said profiles. When anomaly and/or similarity detection analysis is to be generated for a given analysis of an application binary, the associated profile is first normalized (e.g., with respect to the statistics associated with the current collection of said profiles). Then, anomaly and/or similarity analyses are applied between the normalized profile and a set of profiles from the associated profile database (e.g., network profiles, UI traversal profiles, etc.). In an embodiment, this set of profiles can be comprised of the entire set of profiles in the database or a subset selected by some sampling criteria such as but not limited to those associated to the same App Store key. In the present invention, anomaly detection relies on a comparison of current z-scores for both the profile against z-scores for members of the selected set of profiles from the database. A reader versed in the arts can appreciate that more advanced classification techniques can readily be applied to this model. In the present system, similarity detection relies on (but is not limited to) fuzzy clustering via Euclidean distance vectors of current z-scores for both the profile against z-scores for members of the selected set of profiles from the database. A reader versed in the arts can appreciate that more refined similarity techniques can readily be applied to this model. This aspect of the present invention allows to identify and magnify the presence of an isolated anomaly in the behavioral of a given application binary that could otherwise be smoothed during the aggregation of multiple feature sets. For example, via this fine-grained aggregate-based analysis is possible to identify whether an application binary imposes unusual network load, unusual ad-server-based network load, unusual GeoIP reach, unusual UI behavior, unusual CPU performance when compared to tens of thousands or more of other application binaries. This aspect of the present invention attracts business interest that is not limited to malware analysis concerns but rather extends the desirability of the present invention to monitoring, policing, and engineering of site capacities by administrators.

It is a feature of the embodiment that an Analysis be performed over one or more Log Files. In the present invention, the Analysis comprises elements such as but not limited to:

An end-user oriented paragraph of its goal and nature of important findings (e.g., "The system data mines your application binary against thousands others to better assess the risk associated with installing and running the app. The chart below indicates how does the risk profile for your application binary compare against that of thousands of others.").

A statistical abstract and/or summary of selected features extracted from across the contents of targeted Log Files. For example, the Network Analysis generates a summary comprises a items such as but not limited to: amount of network traffic consumed by ad-servers, number of malicious sites visited, presence and number of network-detected leaks of planted data, presence and number of malware signatures detected (e.g., references to command-and-control sites, commands, signatures, etc.), presence and number of privacy/identity data relays to non-ad-servers, geographical distribution of network reach in terms of countries and Internet addresses, number and infection stat us for identified types of network transferred objects, etc.

An aggregate-based analysis such as but not limited to selection of a profile for selected Log File features and ranking this profile against the collection of other similarly collected profiles.

An end-user oriented presentation of the contents of the targeted Log Files comprised of, but not limited to, abstraction of content such as grouping of related events (e.g., abridged representation of observed activity, service, and/or event transition sequences), selection and/or filtering of content based on some criteria such as importance and/or priority, annotation and/or highlighting of content based on. criteria such as relevance to the assessment of malicious, suspicious, risky, and/or compromising to site and/or end user policies.

An autonomously documentation of findings of high end-user interest based on, but not limited to, maliciousness, riskiness, suspiciousness, anomalousness of findings derived from any of the above Analysis element elements.

In addition, each Analysis is associated with a feature extractor, intended to identify and itemize selected numerical features from any of the above Analysis elements for subsequent use in the application of machine learning classification methods.

For example, the Redflags Analysis provides summary and detail for activated risk assessment rules as well as risk assessment categories as obtained during static analysis of the application binary, aggregate-based ranking of the resulting risk assessment profile against a selection of other profiles to identify anomalies in risk exposure, annotated and highlighted text and/or graphical document context surrounding the inferential activation of each risk assessment rule. The Analysis also generates a series of findings such as but not limited to aggregate-based ranking anomalies encountered during ranking of the risk assessment profile for the application binary and the presence of highly dangerous risks such as device rooting and malware infections. A partial view to the results (1010) of this Analysis is shown in FIG. 10.

Specifically, as shown in FIG. 7B, the GUI Manager (771, 780) implements a depth-first like recursive (see 785, 794) traversals to allow for autonomous discovery of the underlying UI of an arbitrary App (e.g., 40). On its inner core (790, 791), it consists of two basic steps of querying the GUI for current state (791) and then choosing an appropriate interaction method (790) for the given GUI screen. This way, an autonomous and unsupervised traversal of most (if not all) the GUI windows (793) and their constituent UI elements (787) is performed. Infinite loops are prevented via the use of a visited data structure (792b). The recursion ends when no more new Windows and UI elements can be discovered.

According to one embodiment, the interaction with an UI Element is based on methods, heuristics, and/or procedures based on the underlying object type (e.g., button, text area, panel, tab host, canvas, webview, checkbox, label).

According to one embodiment, timing mechanisms are used to achieve two goals. First, if the GUI traversal takes longer than the maximum amount of time allotted for a request to execute within a sandbox, the Sandbox Request is then gracefully terminated. Second, if the GUI traversal takes a fraction of the amount of maximum amount of time allotted for a Sandbox Request to execute, the Sandbox re-starts the GUI traversals but this time, first with randomized traversals and then if time avails, with the incorporation of more complex UI interaction methods based on heuristics about UI objects and windows. This mechanism allows the Sandbox to interact with Apps that fail to follow traditional UI templates and interaction elements; as for example, in the case of Gaming Apps based on display of vector mapped graphic elements into a canvas.

According to one embodiment, the said exercise of the User Interface of an App is performed autonomously, that is, without any human intervention.

The present system anticipates means to autonomously identify via some criteria such as but not limited to the Validity of resulting Log Files, whether a Sandbox Request should be considered to be a Sandbox Exception and such should be also submitted to a Sandbox allowing for human interaction in order to enhance the quality or Validity of the resulting Log Files.

Figure 8:
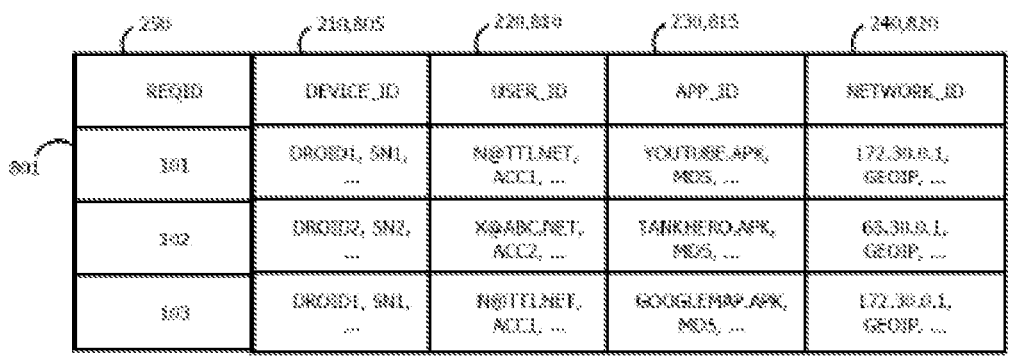
FIG. 8 illustrates an exemplary requests database table for use with the present system, according to one embodiment.

FIG. 8 through 8F illustrate examples of Tables maintained by the Database (130) in order to support the embodiment as described so far in FIG. 1 through FIG. 7B. It illustrates six tables, the Requests Table (800), the Apps Table (825), the Controller Map Table (850), the Logs Table (875), the AV Scans Table (890), and the Progress Table (845).

FIG. 8 illustrates an exemplary Requests Table (800) which stores per-request identity data (comprised of Device Identity data (210, 805), User Identity data (220, 810), Application Identity data (230, 815), and Network Identity data (240, 820)) as provided by a Sandbox Request (200) into the Cloud Service (20), with the exception of the App (40). Each record is indexed (801) by the corresponding Request Identifier (250) and the timestamp (802) of its logging is entered. For example, it show that Request Identifier 102 consists of the submission of a TankHero.apk binary from a Droid2 device located at IP 65.30.0.1, and indicates that the results of the scan should be emailed to X@ABC.NET FIG. 8A illustrates an exemplary Apps Table (825) which contains a record for each Sandbox Request (200) that stores the App (40) to be analyzed and its computed MD5/SHA1 (830) along with its Filename (835) and Package Name (840). The record is indexed (826) by the corresponding Request Identifier (250). For example, it shows that Request Identifier 104 consists of the submission of a cellfire.apk binary, whose formal Java package name is com.cellfire.android, with some given MD5 corresponding to given binary code starting with 0x0234 . . . .

FIG. 8B illustrates an exemplary Controller Map Table (850) which contains a record for each Sandbox Request (200) that stores the mapping of said request into a Sandbox (e.g., 321, 855) at some Dispatcher Node (e.g., 170, 860). The record is indexed (851) by the corresponding Request Identifier (250) and the logging timestamp (852) is entered. For example, it shows that Request Identifier 105 was assigned to the Dispatcher Node called dirac.tti on August 8 using a Droid1 device with the 2.2 version of the Android OS.

FIG. 8C illustrates an exemplary Logs Table (875) which contains a record for each Log File (e.g., 410, 420, 430, 440, etc.) produced by a Sandbox (e.g., 321) during the analysis of a Sandbox Request (e.g., 200). The record is indexed (876) by the corresponding Request Identifier (250) and the logtype (880) associated with the Log File (e.g., 410). The timestamp (877) of the logging is also entered for each record. For example, it shows that for Request Identifier 104, two Log Files (Network and Low Level System Calls) have been logged on August 8 by 12:15 PM.

FIG. 8D illustrates an exemplary AV Scans Table (890) which logs the result (896) of an AV scanner for a given App (e.g., 40), resulting in one or more tuples indexed by the Request Identifier (250) and the AV scanner name (895). In addition, a detailed description field (897) is provided and the timestamp (898) for the logging are provided. For example, it shows that for Request Identifier 125, the A brand AV Scanner completed its scanning on August 9 and reported that the infection claim to be False and consequently described the scanning as Nothing Found. On the other hand, for Request Identifier 124, two different brands of AV scanners A and B have completed their scans with both asserting that the corresponding App is infected (896) but showing that they disagree on the description of the infection (897).

Figure 8E:
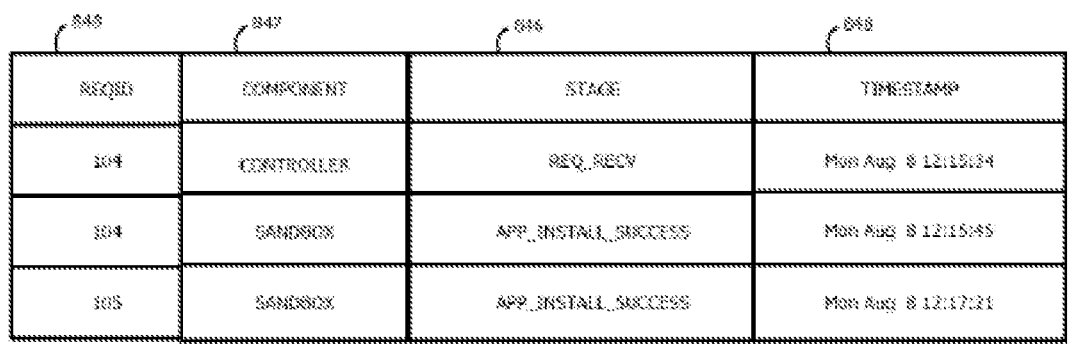
FIG. 8E illustrates an exemplary progress database table for use with the present system, according to one embodiment.

FIG. 8E illustrates an exemplary Progress Table (845) which contains a record for each STAGE (846) (e.g., REQ START, REQ END, FAILURE, etc.) of each component (847) (e.g., Web Server, Controller, Dispatcher, Sandbox, AV Server) reached in the processing of a given Request Identifier (e.g., 250) during the analysis of a Sandbox Request (e.g., 200). The record is indexed by the corresponding Request Identifier (848) and a logging timestamp (848) is recorded during the logging.

Figure 9:
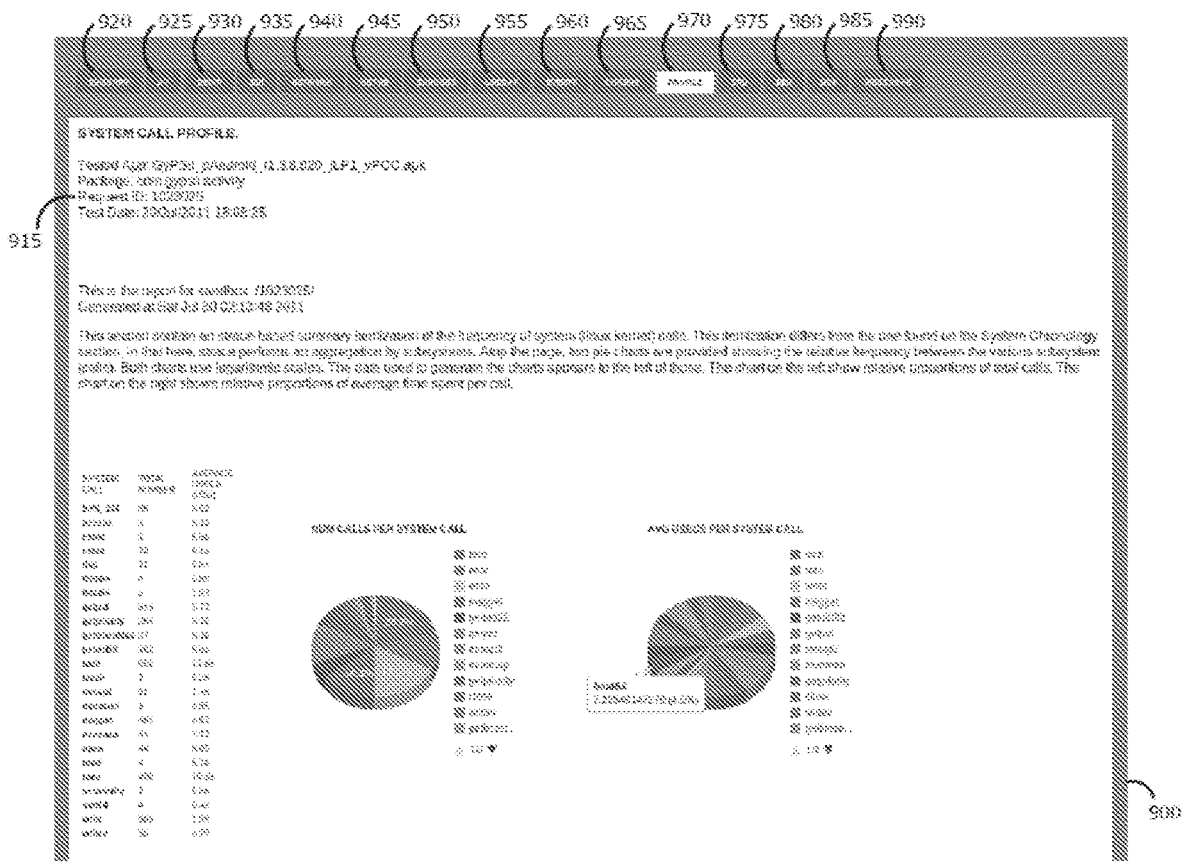
FIG. 9 illustrates an exemplary comprehensive analysis report interface for use with the present system, according to one embodiment.

FIG. 9 illustrates an exemplary Developer's Report (900) generated after Log Files for a sandbox are analyzed. The report is accessible via the Request Identifier (250), which is labeled within the report (915). The report consists of several different sections such as but not limited to: Summary/App Metadata (920), AV Scanning Results (925), Geo IP Demographics (930), GUI Automated Log File (935), Network Analysis (940), Network Visualization (945), Sandbox Instrumentation Log File (950), Android Activities (955), Android Application Events (960), System Level Chronology (965), Profile (970), CPU Performance (975), Static Analysis/DEX (980), File System Changes/MD5 (985), Contents of Web Cache (990), and Clustering Analysis (995).

According to one embodiment, a tiered report can be generated including but not limited to a simplified End-User Report being generated by a projection from the comprehensive Developer's Report. In particular, the End-User Report is generated on the assumption that such report may be accessed from a Mobile Device and in accordance to restrictions placed by such type of devices on file and/or display size.

FIG. 10 illustrates an exemplary End-User Report (1000) intended for the Consumer and made accessible to a Consumer via a Universal Resource Locator (URL) emailed by the Cloud Service to the e-mail associated with the corresponding Sandbox Request.

Figure 11:
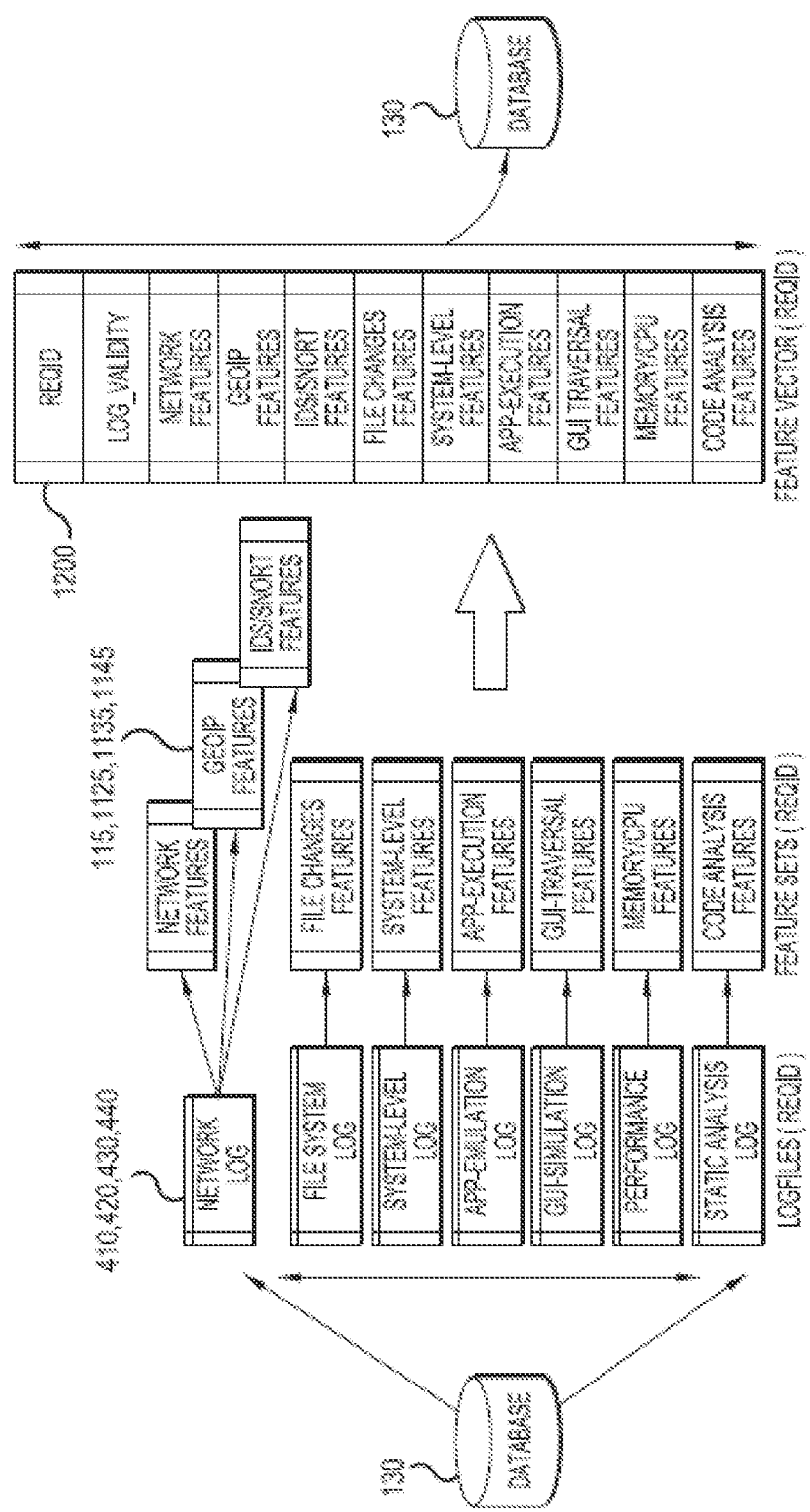
FIG. 11 illustrates an exemplary successful execution of a sandbox request process for use with the present system, according to one embodiment.

FIG. 11 illustrates an exemplary process for after successful execution of a Sandbox Request (200). It shows that the series of Log Files (e.g., 410, 420, 430, 440) generated by the Sandbox (and stored onto the Database (130)) are then parsed to generate corresponding numerical features (e.g., 1115, 1125, 1135, 1145). Then, these features (e.g., 1115, 1125, 1135, 1145) are combined to produce the feature vector (1200) for the specified Request Identifier.

Figure 11A:
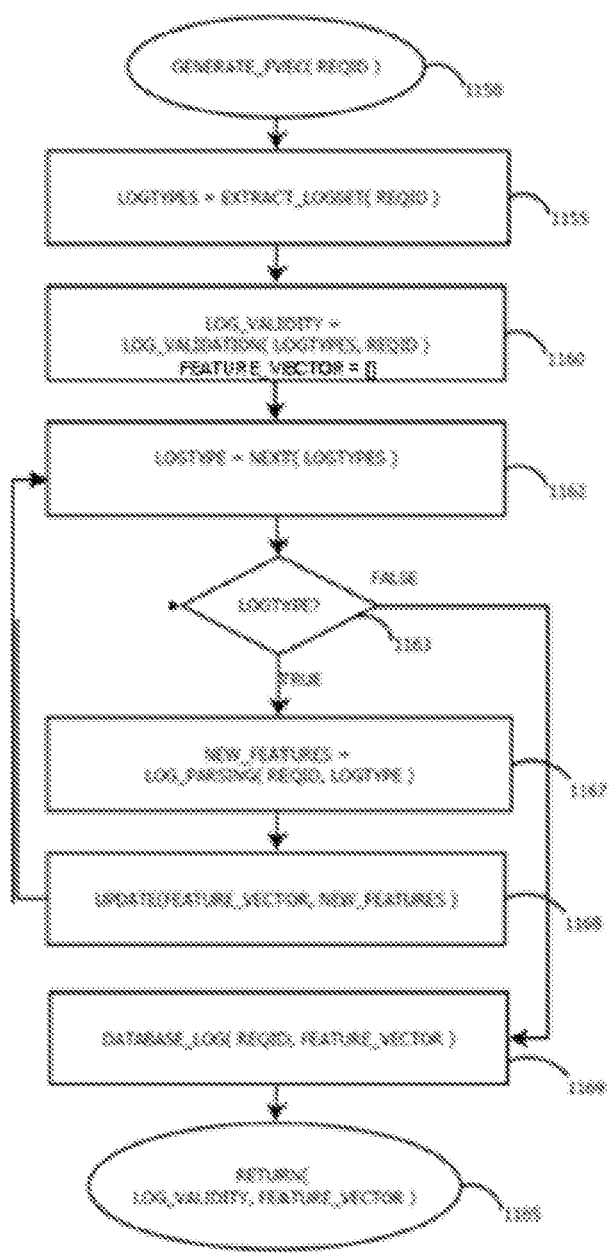
FIG. 11A illustrates an exemplary feature generation for a request identifier according to one embodiment of the present system.

FIG. 11A illustrates an exemplary feature generation for an arbitrary Request Identifier (1150, 250). First, the set of logtypes (1155) associated with the Request Identifier are retrieved (1155), then the Validity of the set of Log Files is computed (1160), and the feature vector is initialized. Next, iteration (1162) is made against each of Log File, where each Log File is parsed to extract numerical features from it (1167) and then the feature vector is updated (1168). This process iterates over each of the Log Files. Finally, when all logs have been processed (1163), the updated feature vector is stored (1169) into the Database (130).

According to one embodiment, the present system provides means to assess the Validity of the results of the execution of a Sandbox Request by means of some evaluation criteria such as but not limited to the size of the Log Files, the contents of the resulting Log Files (e.g., a valid TCPDUMP file), the presence or absence of keywords (e.g., GUI TRAVERSAL COMPLETED).

Figure 11B:
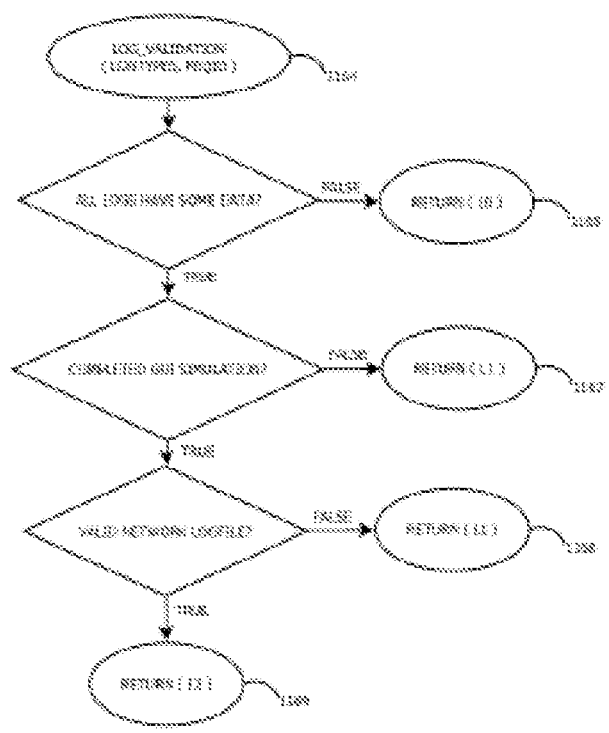
FIG. 11B illustrates an exemplary process for accessing the validity of the logs, according to one embodiment of the present system.

FIG. 11B illustrates an exemplary process for assessing the Validity of the logs produced by the execution of a Sandbox Request. By default, a given Request Identifier (250) is mapped into a default log-validity of L0 (1165), however, if the execution of the Sandbox Request resulted in logs with valid data and a successful traversal of the GUI interface, a log-validity of L1 is assigned (1167). Finally, if the execution resulted in a Log File that also had successfully monitored network activity, a log-validity of L2 is assigned. These ratings can be redefined and/or extended.

Figure 11C:
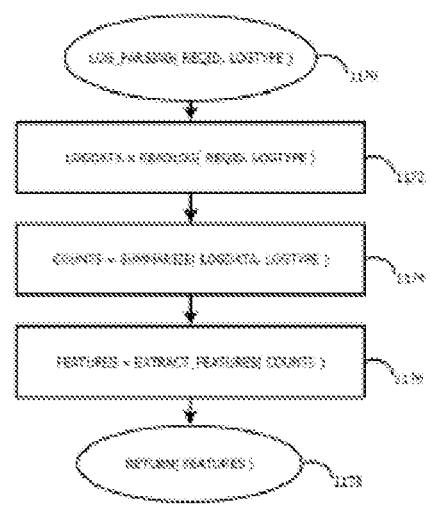
FIG. 11C illustrates an exemplary parsing of a Log File according to one embodiment of the present system.

FIG. 11C illustrates an exemplary parsing (1170) of a Log File. The data from the Log File is read (1172), and a statistical summary (1174) is obtained from the Log File. The resulting summary statistics are then combined (if necessary) and transformed (1176) into numerical features. For example, for a network Log File, numerical features such as but not limited to the average throughput across outgoing connections, number of TCP, UDP, HTTP connections initiated, total number of bytes sent and/or received are computed here. Finally, the numerical features are returned (1178).

According to one embodiment, the statistical summary and resulting numerical features may also be derived from the application of known natural language processing (NLP) techniques including but not limited to:
  term frequency (TF) analysis of terms in accordance with some criteria such as high importance (TDIDF),
  approximate spatial/temporal proximity within documents (PROXIMITY),
  sequences of tokens in a document (NGRAMS),
  data mining of regular expressions (REGEX),
  counts of element types in a document (COUNTS),
  sums of element values in a document (SUMS),
  differences (DIFFS) between versions of similar documents,
  Boolean assertions (BOOLEANS) on combinations of the above.

Exemplary list of applications of these feature extraction methods consists but is not limited to: a BOOLEAN can be used to assert whether an App has associated Market Metadata, a COUNT may be used to identify the number of malicious sites reached, a SUM to total the imposed adserver network load, a PROXIMITY to infer whether the application binary have rooting capabilities, NGRAMS c an be used to construct a low-level behavioral signature over sequences of Host Operating System system calls, REGEX can be used to identify Internet Protocol (IP) addresses, and TF can be used to construct an application-level behavioral signature over the distribution of calls to different Guest Operating System APIs.

It is a feature of the present embodiment that static analysis can also be applied to the Android OS's Dalvik bytecode of the application binary. This has the benefit that Dalvik bytecode can readily be extracted from the application binary. It is also an aspect of the current invention that the aforementioned static analyses performed by the system do not require data and control awareness of the code specifics of the application binary.

These steps are referred to feature extraction steps. In the present invention, an Analysis encapsulates these feature extraction steps and generates a single component (1250, 1260, etc.) of a feature vector. However, an Analysis may also correlate multiple above-described feature extraction result from different Log Files (e.g., network traffic log, intrusion detection log, HTTPS transaction log) into a single component (such as network component) of the feature vector associated with the Sandbox execution of the application binary.

In the present invention, these Analysis take place forensically (i.e., after the execution of the application binary on a Sandbox on a Dispatcher node). The Scheduler queues, throttles, allocates, and initiates Analysis upon the completion of a Sandbox simulation based on some criteria such as but not limited to applicable precedence and/or concurrency between Analyses. As stated, each Analysis takes one or more Log Files and produces an analysis report and a feature vector component. This makes possible for the present invention to allow the allocation of different servers to different Analyses, possibly configured with specialized resources and/or software suit to the nature of Analyses to be performed within. For example, in the present embodiment, compute-intensive analyses such as those based on machine learning classification methods are allocated to high performance internal servers.

Figure 13:
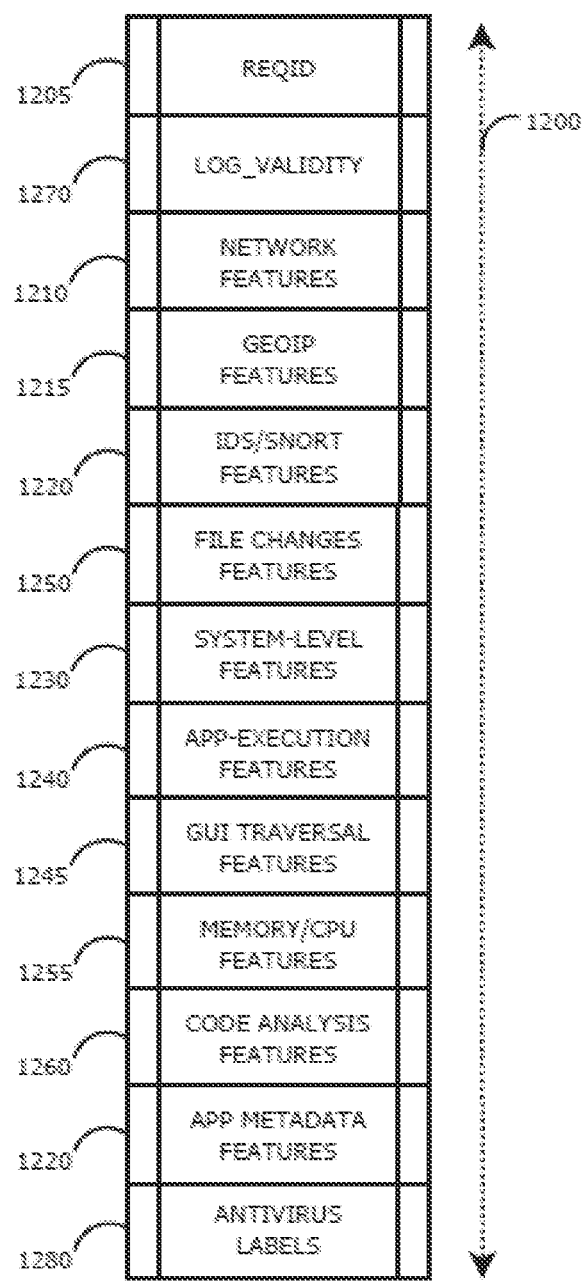
FIG. 13 illustrates exemplary sections of a feature vector according to one embodiment of the present system.

FIG. 13 illustrates exemplary constituting sections of the feature vector (1200) produced for the purposes of machine learning analysis. The feature vector is indexed by the Request Identifier (1205, 250). The constituent sections are such as but not limited to:
  network summary features (1210), such as number of sites reached, number of bytes sent, number of bytes received, number of TCP connections, number of UDP connections, number of distinct IP reached, number of HTTP transactions, traffic load from ad_servers, etc.;
  GeoIP features (1215), such as number of countries reached, number of connections per country, number of subnets reached, etc.;
  network (intrusion detection) alert features (1220), such as number of malicious sites reached, number of network malware signatures observed, number of leaks of planted privacy, identity, and/or file data, number of transactions to ad_servers, number of downloaded network objects;

low-level (i.e., Host OS) behavioral features (1230), such as total counts, average duration, and total duration for all known operating system call types (e.g., memory-writes, disk-writes, file-selection, network-wait, etc.);

high-level (i.e., Guest OS and/or emulation of device) behavioral features (1240), such as total number of different types of Android OS API calls observed, total number of NGRAMS of size 2 observed for Android OS API calls, etc.;

file system changes/integrity features (1250), such as number of modified, deleted, added, duplicated files, etc.;

Guest OS performance features (1255), such as average and standard deviation for various performance indicators (e.g., CPU, Memory, Number of Threads) observed during the execution of the application binary;

static analysis features (1260), such as size of the application binary, number of large string constants, and the results of an inferential risk assessment profile for the application binary (e.g., number of blocks containing reference associated with socket access, number of blocks containing reference associated with cryptographic capabilities, number of blocks containing reference associated with device rooting capabilities, number of blocks containing reference associated with identity retrieval capabilities, number of blocks containing reference associated with file system access, number of blocks containing references associated with sending SMS messages, number of blocks containing references associated with eavesdropping to voice phone calls, number of blocks containing references associated with support for ftp access, number of blocks containing references associated with retrieval of GPS coordinates, number of blocks indicative of unusual levels of code obfuscation, etc);

App metadata features (1222), such as number of downloads, average rating, etc.; and/or the Validity metric (1270, 1167) computed (1167) for the corresponding Log Files associated with said Request Identifier (1205).

The present invention also provide means for feature extraction over features such as but not limited to assessment of the extent and quality of GUI traversals, the extent and density of ad-server traffic in relation to overall network traffic, presence of infections on downloaded files, interaction with malicious server-side scripts, network traffic load placed on non-US countries vs traffic load placed on US, indications of rank anomalies in the ranking of aggregate-based profiles against the collection of overall profiles for any particular feature set (for example, anomalies in the risk assessment profile, system performance profile, file integrity profile, network analysis profile, etc.), etc.

For example, a BOOLEAN can be used to assert whether an App has associated Market Metadata; NGRAMS can be used to construct a low-level behavioral signature, REGEX van be used to identify Internet Protocol (IP) addresses, and TF can be used to construct an application-level behavioral signature.

Figure 12:
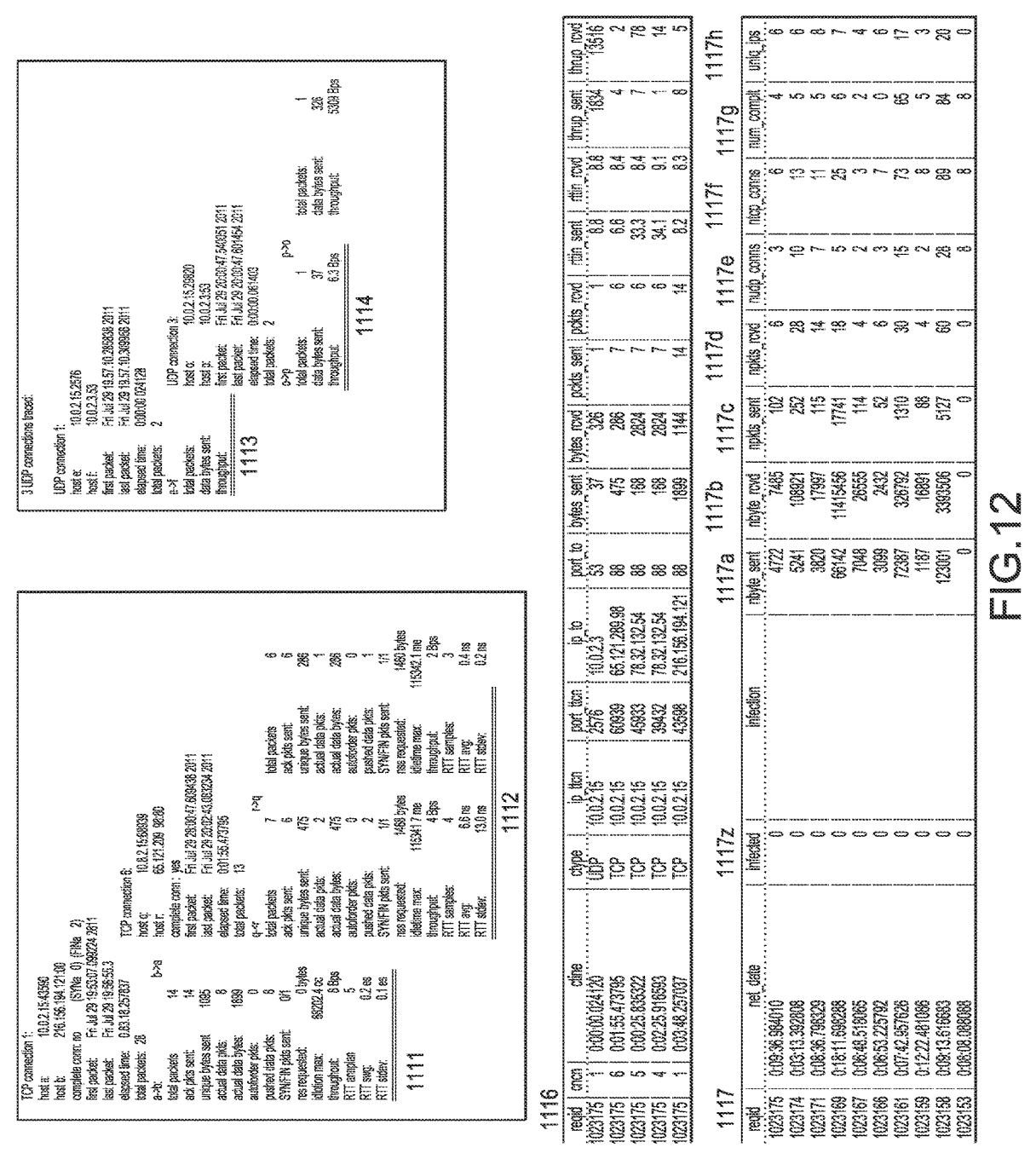

FIG. 12 illustrates an exemplary generation of numerical features as the network Log File (410, 1110) is parsed to extract features (1115) such as but not limited to the network summary statistics (1116) and detailed network statistics (1117). Summary network statistics are collected across all connections (e.g., TCP connections (1111, 1112) and UDP connections (1113, 1114)). For example, examples of considered features are total number of TCP, UDP connections (1117f, 1117e), number of different IP interacted with (1117h), number of completed TCP transactions (1117g), total bytes sent, received (1117a, 1117b), total packets sent, received (1117c, 1117d), and derivative measures such as average transfer rates, average round trip transfer delay, number of subnets interacted with, number of Snort/IDS alerts generated, etc. To this end, detailed network statistics are collected for each connection (1116) and examples are number of packets sent and received, number of bytes sent and received, throughput in each direction, delay in each direction.

Figure 12A:
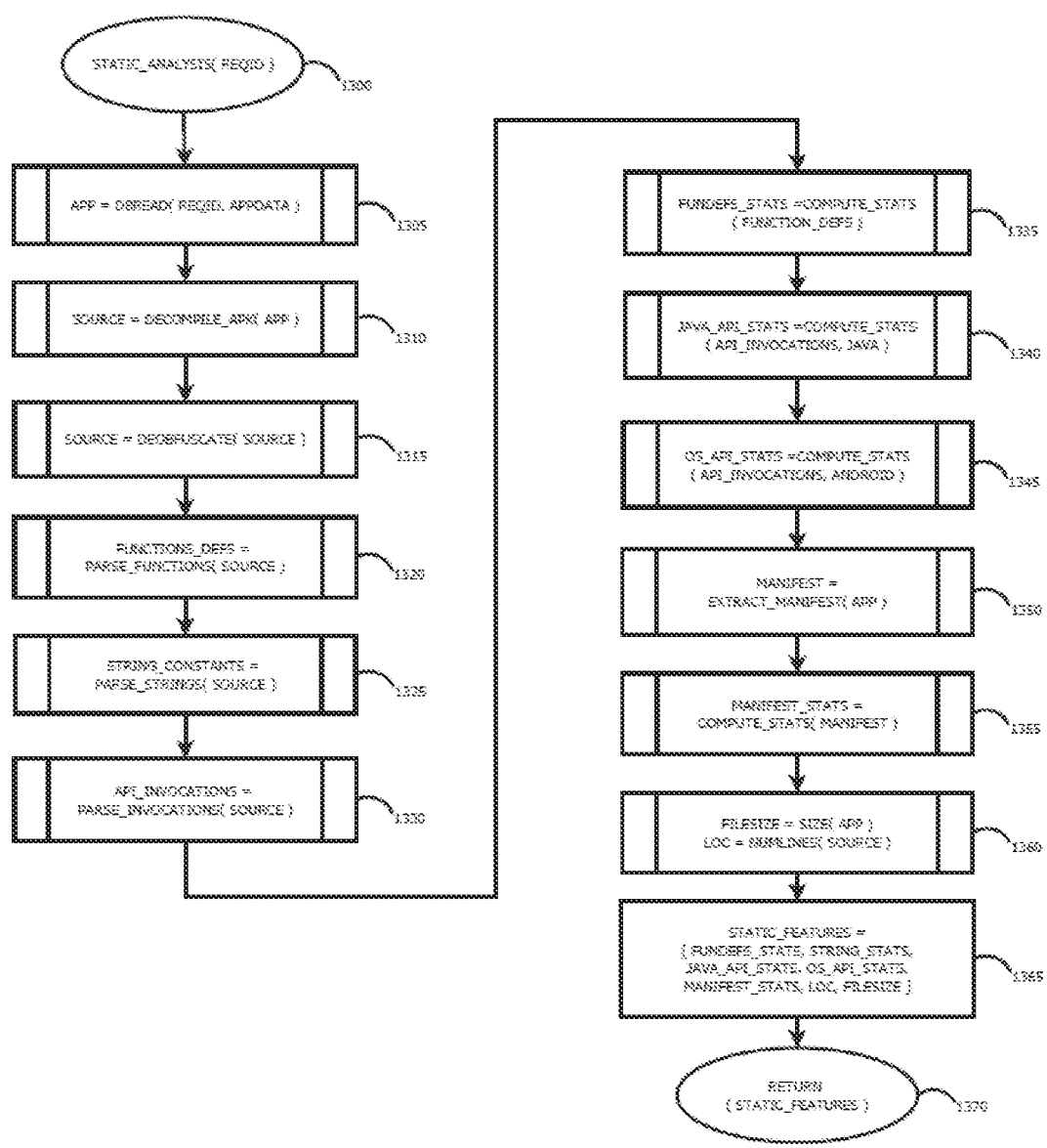
FIG. 12A illustrates an exemplary automated static analysis according to one embodiment of the present system.

For example, conceptually similar parsing is applied over the results of the application of static analysis tools over the binary code of the submitted App (40), as illustrated in FIG. 12A.

FIG. 12A illustrates an exemplary automated static analysis (1300) that is applied by the Cloud Service (20) over any given App (40). First, in (1305), a given a Request Identifier (e.g., 250) is used to retrieve from the Database (130) the corresponding App (40). Then, using a de-compiler, the App is reverse-engineered into Java source code (1310). Then, an optional step (1315) of beautifying this code is applied to de-obfuscate the source code. Next, in steps (1320, 1325, 1330) relevant data mining operations are applied over this code base with respect to function definitions (1320), string constants (1325), and API invocations (1330). Then, in steps (1335, 1340, 1345), the logs produced by these data mining steps are parsed to produce statistical summaries (akin to FIG. 12) for each. The present system also performs analysis of the App manifest (1355) as well as with respect to features related to the size (1360) of the source code base. Finally, the set of features computed in the static analysis are appended (1365) and returned (1370). The resulting feature vector (1370, 1200) consists of an array of numerical features, typically organized in sections with respect to the component/Log File that produced said features, with each numerical features expressed as either a real or an integer value.

According to one embodiment, similar steps are performed to extract numerical features from other logs such as CPU/Memory performance Log File (420, 1120, 1125), emulator/device-level API events Log File (430, 1130, 1135), and Guest Operating System-level API events Log File (440, 1140, 1145).

In the present system, the goal of machine learning classification methods (herein referred to as Classifiers) is to decide whether or not a sample application binary falls into a specified membership set. One of ordinary skill in the art appreciates that once the datasets and training sets are accumulated, that other supervised classification techniques more amenable to larger datasets will be implemented into the Cloud Service. In particular, it is foreseen the use of Support Vector Machines and Decision Trees based on the aforementioned feature vectors and/or subsets of their components.

The present invention provides means for multiple classification method approaches:

Classification by analogy to malware binaries, comprised of (but not limited to) the steps of:

(1) comparing the feature vector of an sample application binary against the feature vectors of a set of known malware binaries;

(2) determining if a suitable close alignment (i.e., a match) exists in accordance to some set criteria such as mini mum Euclidean distance between corresponding feature vectors; and (3) then, if such match exists, retrieving and reporting the properties of the closest match (such as but not limited to the Euclidean distance and associated probabilities, the identity of the matching malware binary, and the nature of its infection, and the number of other similarly close-by matches) and otherwise, reporting the lack of such match.

Classification by analogy to non-infected application binaries, comprised of (but not limited to) the steps of:

(1) selecting a representative subset of application binaries based on some criteria (such as but not limited to a non-filtered and/or non-reduced set, association to an App Store key, popularity by download count (e.g., top downloaded apps), scope of functionality (e.g., mp3, SMS, phone, browsing, gaming app, etc.), and/or statistical properties (e.g., clustering centroids and/or center-of-mass);

(2) comparing the feature vector of an sample application binary against the feature vectors of said subset of application binaries;

(3) determining if a suitable close alignment (i.e., a match) exists in accordance to some set criteria such as minimum Euclidean distance between corresponding feature vectors; and (4) then, if such match exists, retrieving and reporting the properties of the closest match (such as but not limited to the Euclidean distance and associated probabilities, the identity of the matching application binary, and the properties and/or attributes of the application binary such as but not limited to risk assessment, cache Analysis report, etc.) and otherwise, reporting the lack of such match.

Classification by analogy to arbitrary application binaries (whether known to be malware, free of malware, or a combination of such), comprised of (but not limited to) following steps 1, 2, 3, and 4 as described above.

The present invention also provides two classification method scopes:

generalized scope Classifier, consisting of a classification method intended to address a broad population of application binaries (whether these are malware, free of known malware defects, or a combination of both); and specialized scope Classifier, consisting of a classification method intended to address a narrow population of application binaries (whether these are malware, free of known malware defects, or a combination of both).

According to one embodiment, the present system generates an Analysis Vector providing with a representative proxy for the analysis and execution of a Sandbox Request. Note that these numerical indicators represent features extracted from the corresponding Log File and for machine learning purposes, these features are selected and said to be representative summary statistics of underlying data (e.g., Log Files).

To this end, a feature extractor is thus specifically defined for each component (e.g., 1250, 1260, etc.) of a feature vector (1200) and the resulting numerical features from all these components are assembled into a single feature vector (1200) said to be representative of the corresponding App (40).

FIG. 13 illustrates exemplary constituting sections of the feature vector (1200) produced for the purposes of machine learning analysis. The feature vector is indexed by the Request Identifier (1205, 250). The constituent sections are such as but not limited to:

network summary features (1210),
GeoIP features (1215),
network (intrusion) alert features (1220),
low-level (i.e., Guest OS) behavioral features (1230),
high-level (i.e., emulation of device) behavioral features (1240),
file system changes/integrity features (1250),
performance (e.g., CPU, Memory, Number of Threads) features (1255),
static analysis features (1260),
App metadata features (1222), and/or
the Validity metric (1270, 1167) computed (1167) for the corresponding Log Files associated with said Request Identifier (1205).

Machine learning techniques require a training stage with labeled training cases from which to abstract its learned response. For this reason, anti-virus (binary) infection labels are also provided (1280) to be used for training automated classification analysis via machine learning techniques such as, but not limited to, Support Vector Machines (SVM), Decision Trees, Bayesian Networks, and Clustering.

One of ordinary skill in the art appreciates that due to the recent emergence of mobile Applications, the small number of human-dissected malware analysis available, and the novelty of approaches taken by mobile malware (e.g., privacy eavesdropping via SMS, phone, GPS, etc.), the number of infected cases to train with is significantly small yet misleading and that a system to robustly, systematically, and autonomously extract feature vectors from large repositories of Applications is an extremely valuable tool.

According to one embodiment, the present system enables malware analysis for Mobile Devices by providing a cloud service platform that learns from the aggregate behavior of analyzed Applications. The present system uses machine learning clustering techniques applied over feature vectors to help classify Applications, in terms of their corresponding feature vectors (obtained through a combination of behavioral and static analyses), into well-defined behavioral clusters of Applications. Features are extracted from both the observed execution behavior of an App as well as from static analysis of the App, and these features are used to represent or proxy a particular App (e.g., 40) via its corresponding feature vector (e.g., 1200).

In the present system, the goal of machine learning classification methods (herein referred to as Classifiers) is to decide whether or not a sample application binary falls into a specified membership set. One of ordinary skill in the art appreciates that once the datasets and training sets are accumulated, that other supervised classification techniques more amenable to larger datasets will be implemented into the Cloud Service. In particular, it is foreseen the use of Support Vector Machines and Decision Trees based on the aforementioned feature vectors and/or subsets of their components.

The present invention provides means for multiple classification method approaches:

Classification by analogy to malware binaries, comprised of (but not limited to) the steps of:

(1) comparing the feature vector of an sample application binary against the feature vectors of a set of known malware binaries;

(2) determining if a suitable close alignment (i.e., a match) exists in accordance to some set criteria such as mini mum Euclidean distance between corresponding feature vectors; and (3) then, if such match exists, retrieving and reporting the properties of the closest match (such as but not limited to the Euclidean distance and associated probabilities, the identity of the matching malware binary, and the nature of its infection, and the number of other similarly close-by matches) and otherwise, reporting the lack of such match.

Classification by analogy to non-infected application binaries, comprised of (but not limited to) the steps of:

(1) selecting a representative subset of application binaries based on some criteria (such as but not limited to a non-filtered and/or non-reduced set, association to an App Store key, popularity by download count (e.g., top downloaded apps), scope of functionality (e.g., mp3, SMS, phone, browsing, gaming app, etc.), and/or statistical properties (e.g., clustering centroids and/or center-of-mass);

(2) comparing the feature vector of an sample application binary against the feature vectors of said subset of application binaries;

(3) determining if a suitable close alignment (i.e., a match) exists in accordance to some set criteria such as minimum Euclidean distance between corresponding feature vectors; and (4) then, if such match exists, retrieving and reporting the properties of the closest match (such as but not limited to the Euclidean distance and associated probabilities, the identity of the matching application binary, and the properties and/or attributes of the application binary such as but not limited to risk assessment, cache Analysis report, etc.) and otherwise, reporting the lack of such match.

Classification by analogy to arbitrary application binaries (whether known to be malware, free of malware, or a combination of such), comprised of (but not limited to) following steps 1, 2, 3, and 4 as described above.

The present invention also provides two classification method scopes:

generalized scope Classifier, consisting of a classification method intended to address a broad population of application binaries (whether these are malware, free of known malware defects, or a combination of both); and specialized scope Classifier, consisting of a classification method intended to address a narrow population of application binaries (whether these are malware, free of known malware defects, or a combination of both).

The present invention provides means for the implementation of multi-level classification methods, with fast specialized scope Classifiers being successively until a match is identified for the sample application binary and otherwise, followed by the application of one or more compute-bound generalized scope Classifiers.

One of ordinary skill in the art appreciates that such multi-level classification methods are amenable for efficient computation in a cluster-server environment.

One of ordinary skill in the art appreciates that such multi-level classification methods design is amenable for the application of different classification methods (e.g., support vector machines, clustering, decision trees, etc.) - - - possibly simultaneously - - - to the same sample application binary. This way, the present invention allows for different classification methods, whether with different or similar training data, against the same application binary. In the present embodiment, the presence of a match is selected from the results based on some criteria (such as the presence of any match, consensus between one or more classification methods, etc.).

One of ordinary skill in the art appreciates that such multi-level classification methods are also amenable for incremental refinement of classification scoping via the development and incorporation of additional specialized and/or generalized scoping Classifiers. For example, the present invention allows for straightforward development and incorporation of specialized scope Classifiers for relatively newly discovered malware binaries that (1) fail to be properly identified as such, (2) possess similar clustering properties but (3) nevertheless indicate Classifier anomalies with respect to non-malware application binaries by training a new narrow scope Classifier on such samples.

One of ordinary skill in the art appreciates that is possible for malware to be intelligent enough to disguise behavior akin to other Applications and for this reason, the present system relies on extensive and comprehensive feature aspects (e.g., static analysis (1260), performance footprint (1255), OS signature (1230)), to formulate the feature vector for an App in a manner to augment the ways and depth of such on which we simultaneously look into an app. The rationale of this is that a malware application that mimics a non-malware app if watched, must nevertheless invoke certain primitives and special resources to determine that is being monitored and that such events would be captured by some of the above feature aspects. For example, virtualization primitives may now be present, periodical CPU spikes may be noticeable, and a different OS system profile corresponding to such process check up may be present.

One of ordinary skill in the art appreciates that once the datasets and training sets are accumulated, that other unsupervised classification techniques will be implemented into the Cloud Service. In particular, it is foreseen the use of Support Vector Machines and Decision Trees based on the aforementioned feature vectors and/or subsets of their components.

Figure 14:
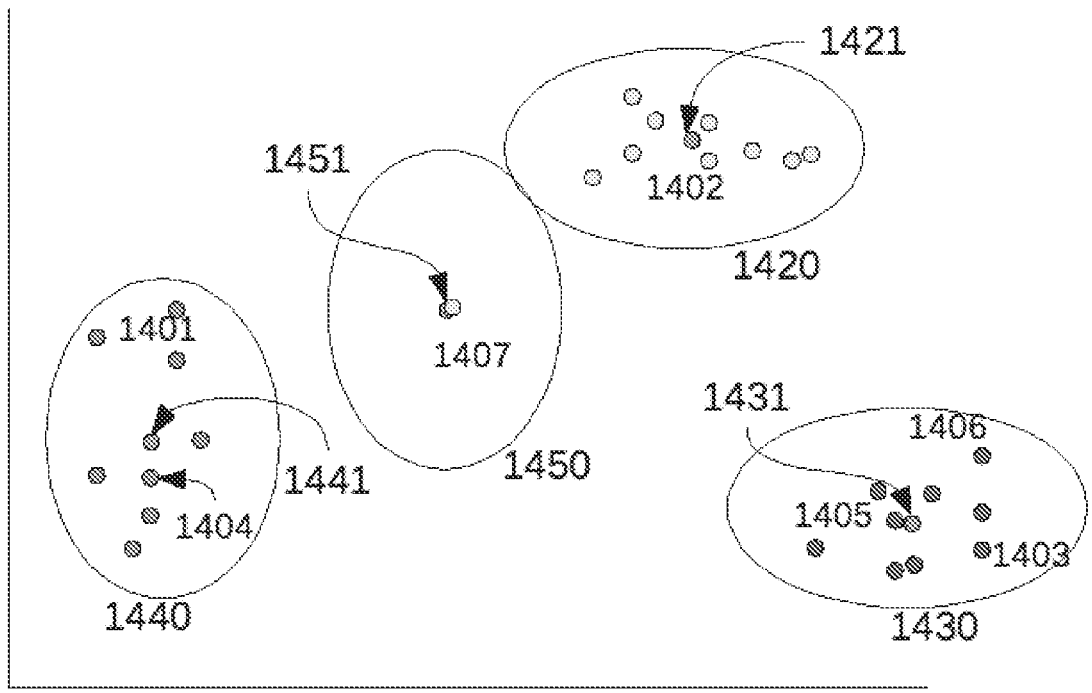
FIG. 14 illustrates exemplary clustering a finite set of feature vectors into a finite set of clusters according to one embodiment of the present system.

FIG. 14 illustrates an exemplary clustering of finite set of feature vectors (1401, 1402, 1403, 1404, 1405, 1406, etc) into a finite set of clusters. This is achieved via clustering algorithms (e.g., hierarchical clustering, k-means) which results in the identification of various clusters (1420, 1430, 1440, 1450) shown as ellipses containing one or more feature vectors (1402; 1403, 1405, 1406; 1401, 1404; 1407). It also shows the corresponding centroids (1421, 1431, 1441, 1451) of these clusters (1420, 1430, 1440, 1450) and that a centroid represents the center of the corresponding ellipsoid spanning the cluster. It also shows that it is possible for a feature vector (e.g., 1401) to be close to more than one ellipsoid (1440, 1450). For this application, each feature vector is allowed to be a member of exactly one cluster. Finally, it illustrates the identification of the most representative feature vector of a cluster as the feature vector in the set of feature vectors of a cluster that has the minimal distance to the centroid of its cluster (e.g., 1405, 1404, 1407); in the case of a tie (1402, 1406), the feature vector with the lowest Request Identifier is chosen (e.g., 1402). This step results is used to search and yield a clustering assignment consisting of the number of clusters used, the centroids of these clusters, and the membership set of a cluster in terms of feature vectors.

The present system implements the above-described compute-bound step away from the main workflow of parallel Sandbox Executions. For example, the present system allows this computation to take place elsewhere on the system as long as access to the network-shared Database (130) is provided. The preferred embodiment of the present system implements this compute-bound step away from the main workflow of parallel Sandbox Executions. It performs this step on a node suited for compute-bound tasks.

Figure 15:
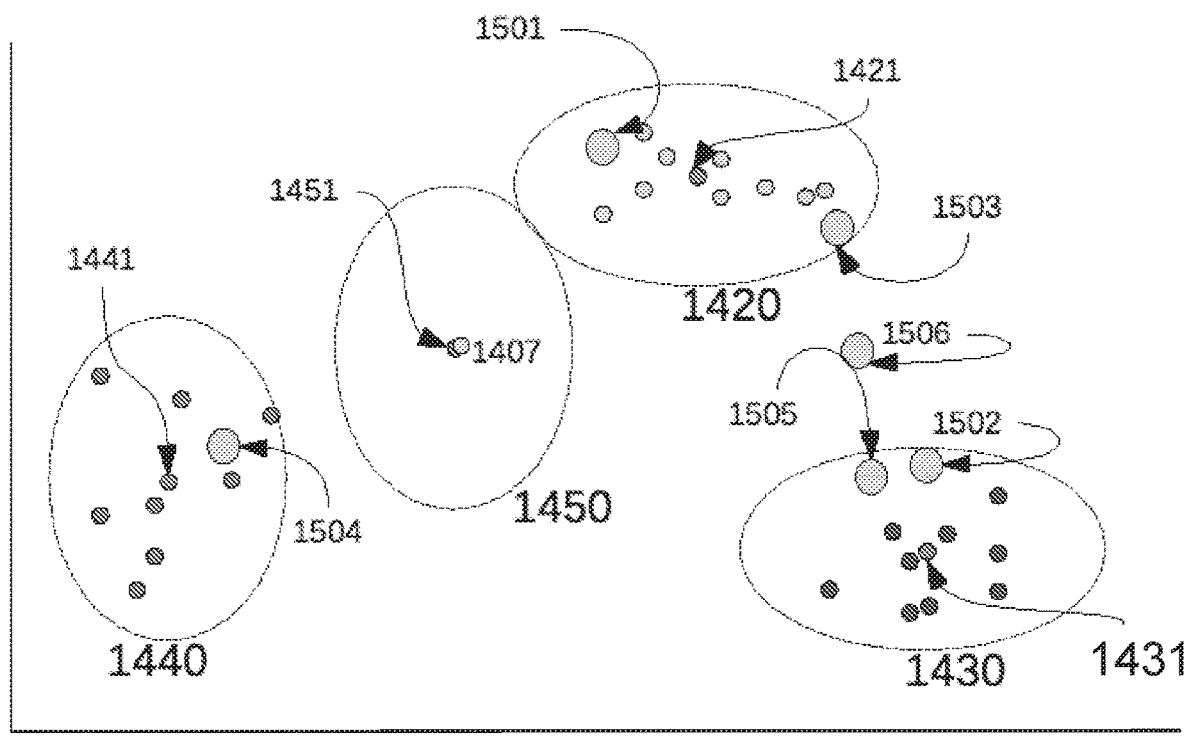
FIG. 15 illustrates an exemplary online clustering of new feature vectors against predefined clusters according to one embodiment of the present system.

FIG. 15 illustrates an exemplary time view conceptualization of the process of online clustering of a stream of new feature vectors (1501, 1502, 1503, 1504, 1505, 1506) against a set of predefined clusters (1420, 1430, 1440) and their corresponding assignments (1420, 1430, 1420, 1440, 1430) and otherwise, anomaly detection (1506). The anomalous feature vector (1506) exhibits a distance to the centroids (1520, 1530, 1540) of the corresponding predefined clusters (1420, 1430, 1440) that does not exhibit statistical significance for membership on those. The resulting feature vector is updated as an anomaly in the Database (130) (as described in FIG. 17 and FIG. 18), again indexed by the corresponding Request Identifier (250).

Figure 16:
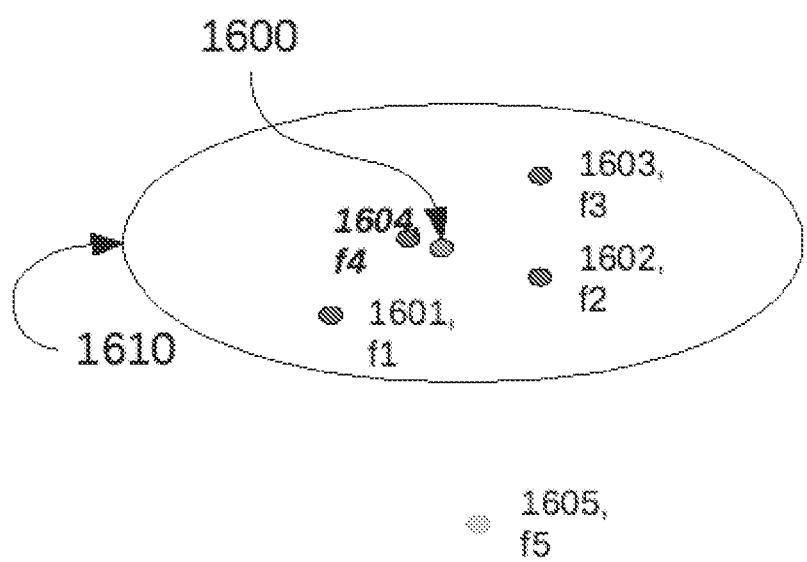
FIG. 16 illustrates an exemplary labeling of a cluster to represent application binaries with similar features according to one embodiment of the present system.

FIG. 16 illustrates an exemplary small cluster of feature vectors in a two-dimensional space (via K-Means clustering). FIG. 16 shows five feature vectors f1 (, f2, f3, f4, f5 (1601, 1602, 1603, 1604, 1605, respectively) and how four of them can be visualized as a cluster (1610) whose centroid (1600) can be visualized as the center of the cluster's ellipse (1610). It shows that the feature vector f5 (1605) does not lie close-by enough to the ellipse to confidently claim it to be part of the cluster (1610).

Figure 16A:
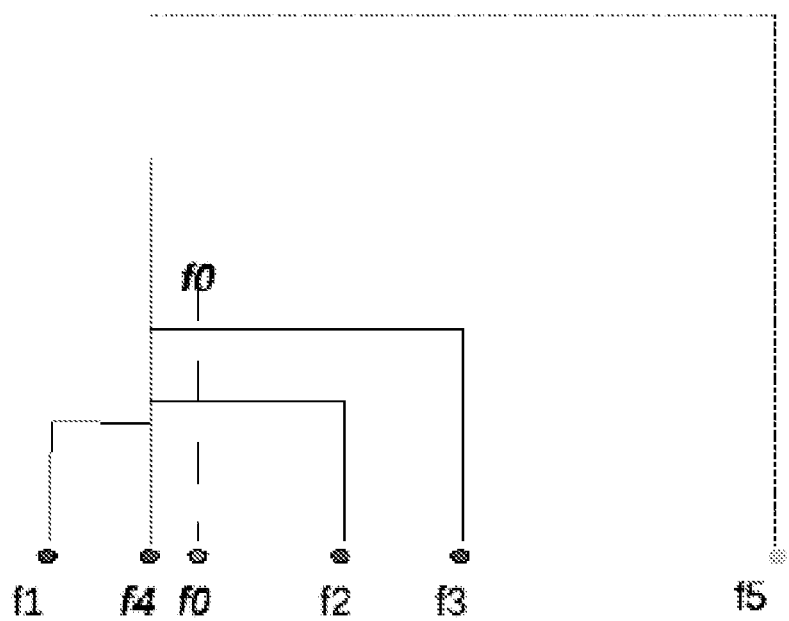
FIG. 16A illustrates, for comparison purposes, an exemplary alternative representation (via hierarchical clustering) of a cluster in two dimensions.

FIG. 16A illustrates an exemplary alternative representation (via hierarchical clustering) of a cluster in two dimensions. The same cluster (1610*b*) was shown with the same constituent feature vectors (f1, f2, f3, f4) on FIG. 16 as the cluster pointed to by (1610).

Figure 16B:
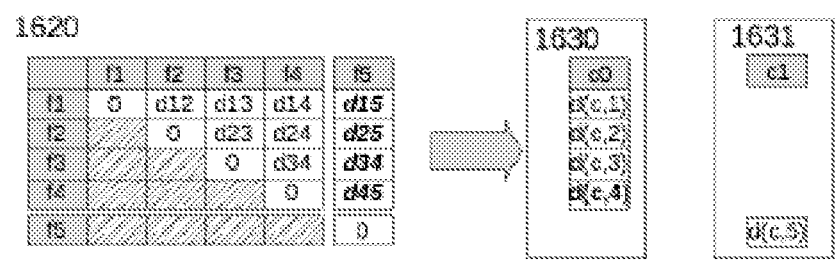
FIG. 16B illustrates an exemplary the corresponding distance matrix between pairs of feature vectors and how it provides the basis for generating clusters according to one embodiment of the present system.

FIG. 16B illustrates an exemplary corresponding distance matrix (1620) and how it provides the basis for generating clusters. The distance matrix (1620) is composed of the computed distance metric (e.g., Euclidean distance) between any two pairs of feature vectors in the data set. In this illustration, the set consists of five feature vectors (f1, f2, f3, f5, f5) and the resulting clustering arrangement (1630, 1631) indicates that four of them have low pairwise distances between each other (f1, f2, f3, f4) and that the remaining feature vector f5 can not be said to be nearby anything else in the set and in this case, is made to be a cluster by itself. Consequently, two clusters are created c0 (1630) and c1 (1631).

According to one embodiment, a cluster is labeled in accordance to criteria related to the constituent feature vectors of the cluster. For example, a cluster gets labeled to express a representation to a set of Apps with sufficiently similar behavioral and static analysis features. For each cluster (e.g., 1610), the centroid (e.g., 1600) is computed by the application of a clustering algorithm over the set of all feature vectors. Then, for each cluster (e.g., 1610), a distance vector (1630) is generated by computing the Euclidean (or similar) distance of each member of the cluster (f1, f2, f3, f4) (1601, 1602, 1603, 1604, respectively) to its centroid (1600). The closest member (1604) (i.e., the feature vector (1604) yielding the lowest Euclidean distance, d04) to the centroid (1600) is chosen to be the representative feature vector for said cluster (1610), and using the Request Identifier (250), the Filename (1640, 835) of the corresponding App (e.g., 40) is retrieved from the Database (130). This way, each cluster (e.g., 1610) is named after its (most representative) App and thus multiple Apps in the same cluster are said to be behaviorally similar to this, the most representative App of the cluster (1610). For example, a cluster can be spawned by Apps whose App Developers shared code such as API/server interfaces, followed design patterns/templates such as GUI interface elements, and/or introduced the use of similar peripheral mechanisms such as streaming-ad-servers from the same tier level. Finally, if more than one App exhibits the minimal distance to the centroid, then the App with the lowest Request Identifier is chosen.

FIG. 17 illustrates an exemplary table used to store feature vectors (1200) into the Database (130). A Feature Vectors Table (1700) is used to store each generated feature vector (1200), again indexed by its corresponding Request Identifier (250). In addition, a clustering label (1710), and a clustering anomaly flag (1720) are provided.

Figure 18:
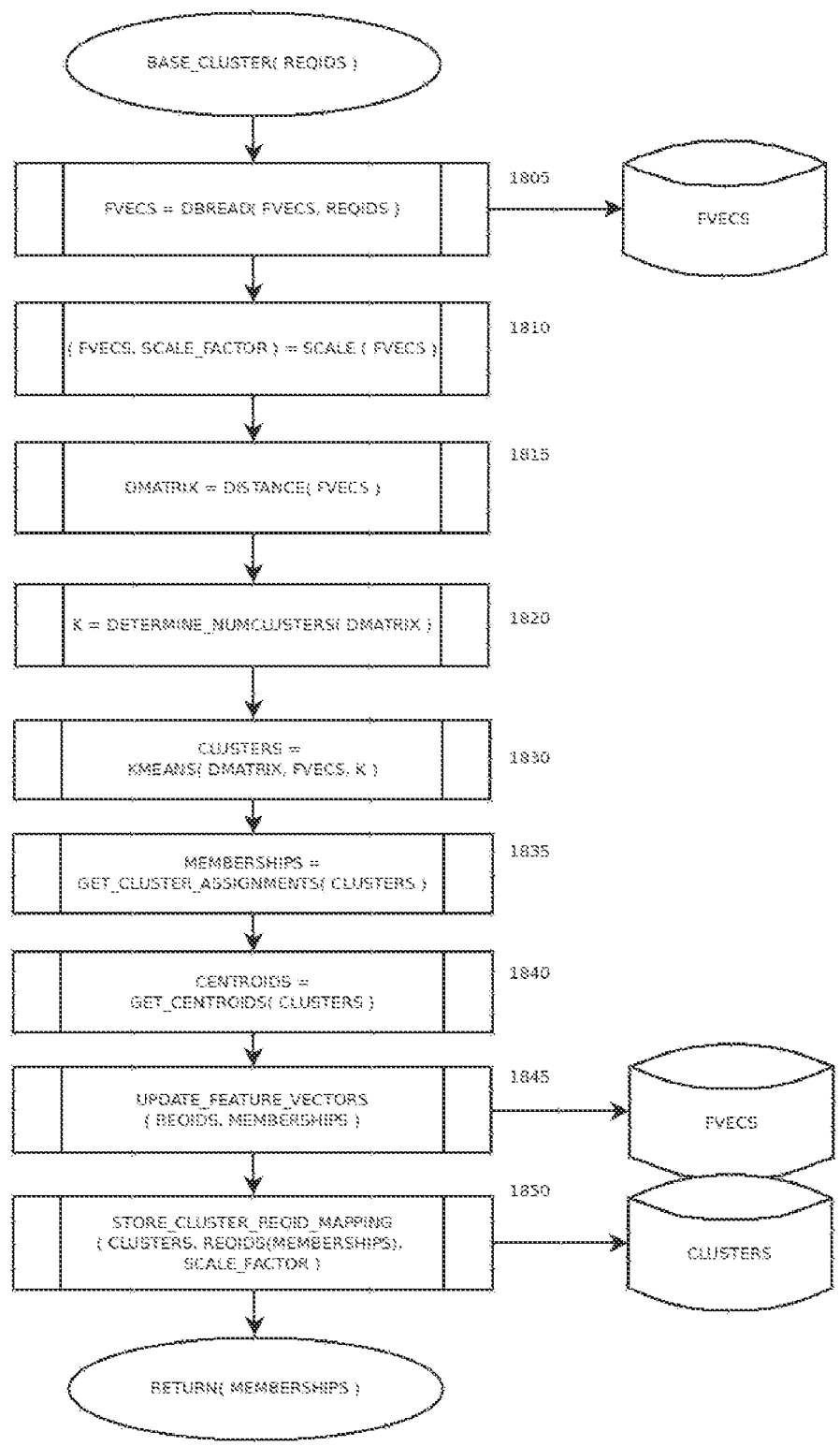
FIG. 18 illustrates an exemplary computing of an initial cluster assignment for a set of feature vectors according to one embodiment of the present system.

FIG. 18 illustrates an exemplary computing of an initial cluster assignment for a set of feature vectors (1805); here duplicate feature vectors are removed and data cleaning steps are taken. The feature vectors are scaled (1810) to numerical stable ranges; later, the scaling transformation will be stored. The pairwise distance matrix between all pairs of feature vectors is computed (1815), using some multidimensional distance metrics such as the Euclidean distance. Next, a target number of clusters is determined (1820). This number is chosen according to various criteria, such as optimal clustering degree or determined via some heuristics with respect to the size of the dataset. Then, a clustering technique, such as hierarchical clustering (1830), is used to find the membership of feature vectors (1805) into clusters. Next, using said clustering results, the centroids of the clusters are retrieved (1835) and the membership of feature vectors into clusters is also retrieved (1840). The membership of feature vectors into clusters obtained in (1840) is recorded into the Feature Vectors Table (1700) of the Database (130), again indexed by the Request Identifier (250) of each feature vector. Finally, the clusters, their memberships, and the current scaling factor are stored (1850) into Database (130).

FIG. 18A illustrates an exemplary Clusters Table (1860) which is used to store each cluster indexed by cluster name (i.e., its most representative App) (1861), its current size (1862), the timestamp of its creation (1863), a serialized membership vector (1864), its current centroid (1865), and the time of the last modification (1867).

Figure 19:
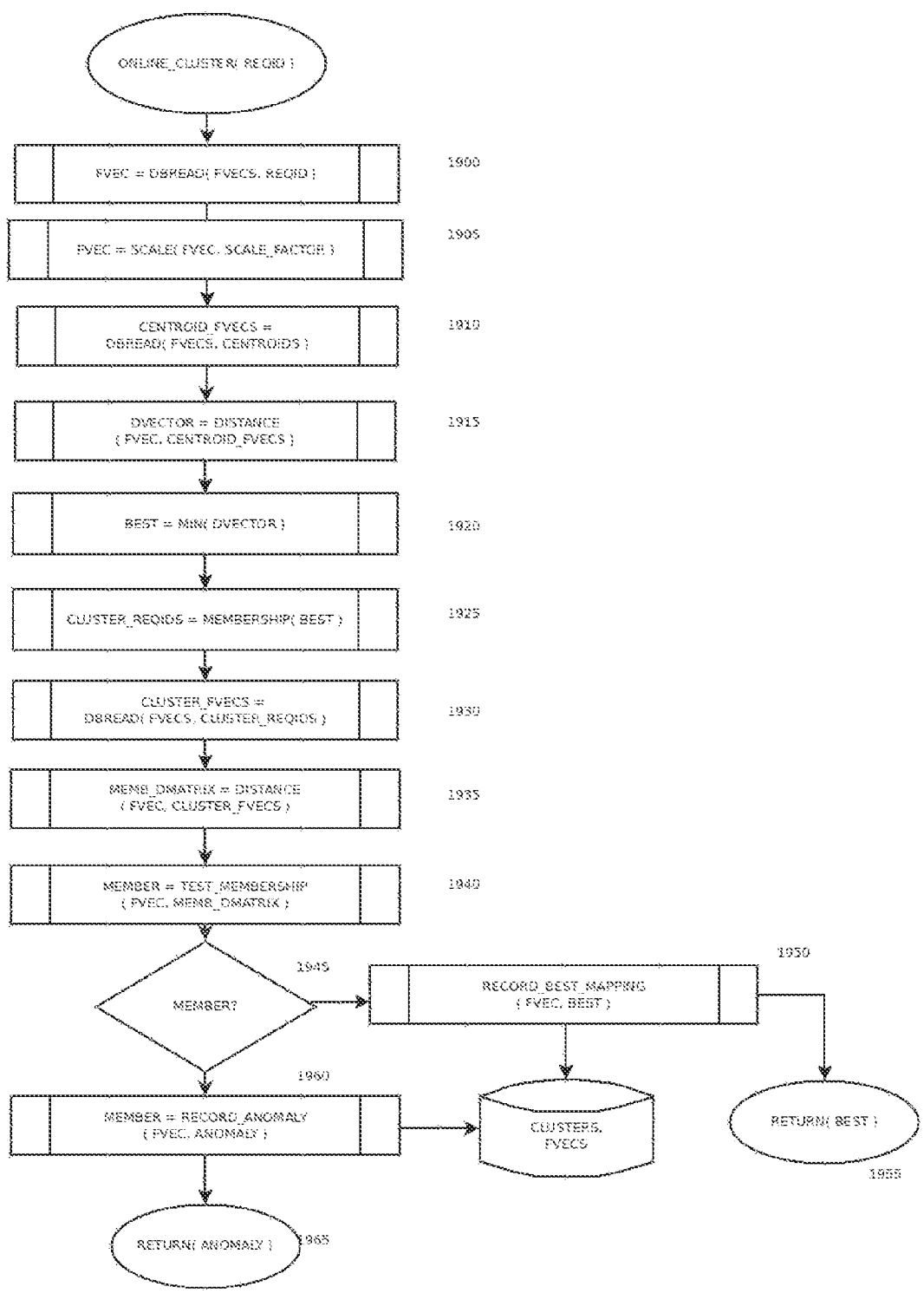
FIG. 19 illustrates an exemplary mapping of a new feature vector into a pre-computed set of clusters according to one embodiment of the present system.

FIG. 19 illustrates an exemplary online mapping of a new feature vector into a pre-computed set of clusters (represented in terms of their centroids) as described in FIG. 18. First, given the provided Request Identifier, the feature vector is retrieved (1900) from the Database (130). The feature vector is then scaled (1905) using the scaling transformation currently in use ((1810). Then, the centroids are retrieved (1910) and the pairwise distance of the feature vector against each current centroids is computed (1915). The centroid with the minimal distance to the new feature vector is identified (1920). Then, the set of feature vectors currently associated with this cluster are retrieved (1925, 1930) and the distance matrix for all pairwise distances between this new feature vector the cluster membership is computed (1935). Then, using this distance matrix, an approximate or fuzzy test for membership is applied (1940, 1945). If this new feature vector has a strong membership to the existing set, the new feature vector is assigned to the chosen best centroid and the Database is updated. Otherwise, the feature vector is labeled an Clustering Anomaly (1960). The Feature Vectors Table (1700) in the Database (130) is then updated with this mapping (1970), again indexed by the corresponding Request Identifier (250). This even can occur when the new feature vector causes the cluster membership statistics to be significantly different then the hypothesis that the new feature vector can be assigned to this centroid is rejected.

One of ordinary skill in the art appreciates that the testing of membership is fuzzy in nature and approximate and over time, incoming feature vectors will be assigned to centroids in a manner that could degenerate the clustering assignments. For this reason, the present system associates a trigger for a re-clustering event, which essentially invokes the steps in FIG. 18 with a set of the available feature vectors to be chosen by criteria such as all, a subset of the most active ones, the above plus the set of the most active centroids, a weighted sampling of the cluster memberships, a randomized sampling of cluster membership, all (or a subset of) the available data.

Re-computing a new cluster assignment (1830) accounting for feature vectors (1910) not present in the original set of feature vectors (1810) is achieved as follows. As new feature vectors are added, the set of predefined clusters (1420, 1430, 1440) may require updating to account for shift in memberships between previous feature vectors, emergence of new clusters, computation of new cluster centroids and cluster names, and mapping of new feature vectors into predefined clusters. The set of predefined clusters (1840) and their centroids (1845) is retrieved (2020) to then retrieve all constituent feature vectors (2030) from the Feature Vectors Table (1700) from the Database (130) as well as the membership of their constituent feature vectors (1810). The new feature vectors (2010) are merged with the constituent feature vectors (2030) to generate the current set of feature vectors (2040). The current set of feature vectors is scaled (2050) and the scaling transformation is stored (2060). Then, the steps of the flowchart of FIG. 18 are invoked, resulting in the generation of a new set of clusters (2070), their centroids (2075), the names of the clusters (2080), and the membership mapping (2085) of the current sent of feature vectors (2040) into the new clusters (2070).

According to one embodiment, the generation of a new set of predefined clusters is based on criteria such as the number of anomalies observed so far, the number of known malware samples not accounted by the present set of predefined clusters, a validation metric based on the statistical significance of the membership of feature vectors into clusters, and/or the time since the last clustering event for generating predefined clusters took place.

According to one embodiment, a re-clustering event may re-assign a feature vector previously mapped to a different cluster into a new cluster based on the availability of subsequent analyses. An end-user report is generated dynamically, upon demand by the user, containing the most up-to-date findings about any Request Identifier.

The present invention provides automated means for identifying potential zero-day candidates (or otherwise, false positives) representing behaviorally analogous forms of known malware families by means of sufficient similarity based on some criteria such as Euclidian distance between the feature vector of an application binary to a cluster of a known malware family.

Figure 20:
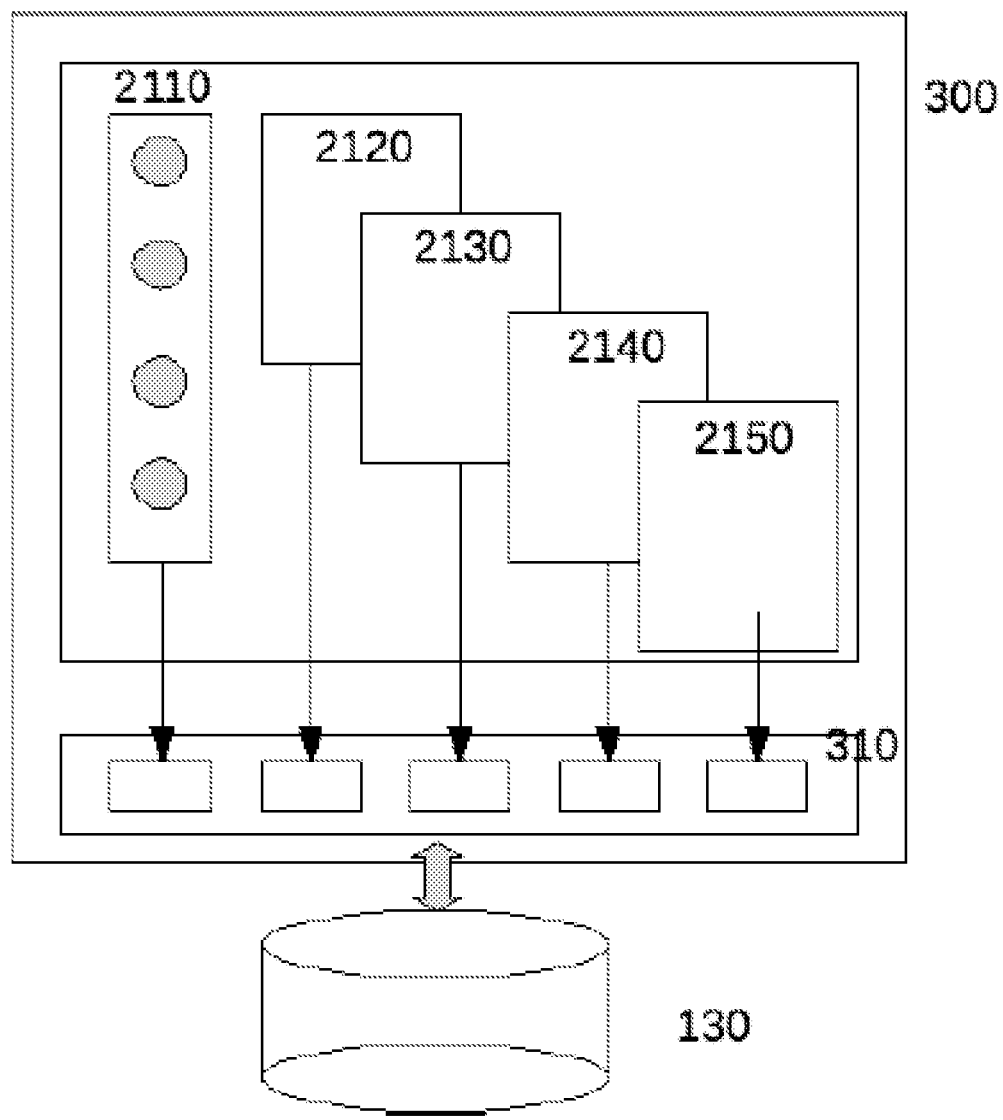
FIG. 20 illustrates an exemplary dashboard according to one embodiment of the present system.

FIG. 20 illustrates an exemplary model of the Dashboard component (2100) for use with the present system, according to one embodiment. Users log into the Dashboard to interact via one of several pre-constructed views performing analytics projections over analyses stored on the database (130). The Dashboard is composed of the following views: a Controller View (2130), a Webserver View (2120), a Database View (2160), an AV Server View (2140) and a Dispatcher View (2150). Users select a view by clicking an icon corresponding to each above-described view on a System View Selection Sidebar (2110). Views operate over selections of analyses based on criteria such as app store key, submission source, time range, etc. The Dashboard comprises a Web Server (300) which provides secure user access over the internet, retrieves inputs and parameters (such as app store key, time range, infection status, request identifier, etc.) from said user, and executes corresponding Scripts (310) associated with said pre-constructed analytics views of the Database contents based on said inputs and parameters. The scripts retrieve summary, detail, and analytics results from the Database and prepare them for presentation on the corresponding Dashboard view.

The Database view provides comprehensive analytics derived from aggregation-based analysis applied over various facets of the analysis-suite results for said Request Identifiers in areas such as but not limited to Submission Sources, Redflag Analysis, Intrusion Detection, Network Reach, Confusion Tables for AV Source as well as Machine Learning Classifier Performance, etc. FIGS. 21A, 21B, and 21C illustrate complementary screenshots of an exemplary Database View. The Database View provides aggregate-based analytics for an arbitrary subset of analyses selected based on some criteria such as but not limited to membership to App Store key, time range, regular expression applied over package or application name, and/or combinations of the above. The present system allows a dashboard user to retrieve analytics only for submissions associated to the user's app store key(s). The present system also provides means for selecting a set of analyses over which to perform the Database view. For example, a time range control (2155) allows specifying a time range (Jan. 1, 2011:11:20 AM to Jan. 10, 2011:1030 AM) using calendar views (2156). Similarly, a text field allows retrieving Analyses matching the specified text-based constraint over one of several preselected Analysis field (e.g., Internet address, package name). Both constraints can be applied to subset analyses results, but the time range constraint is applied first.

Figure 20A:
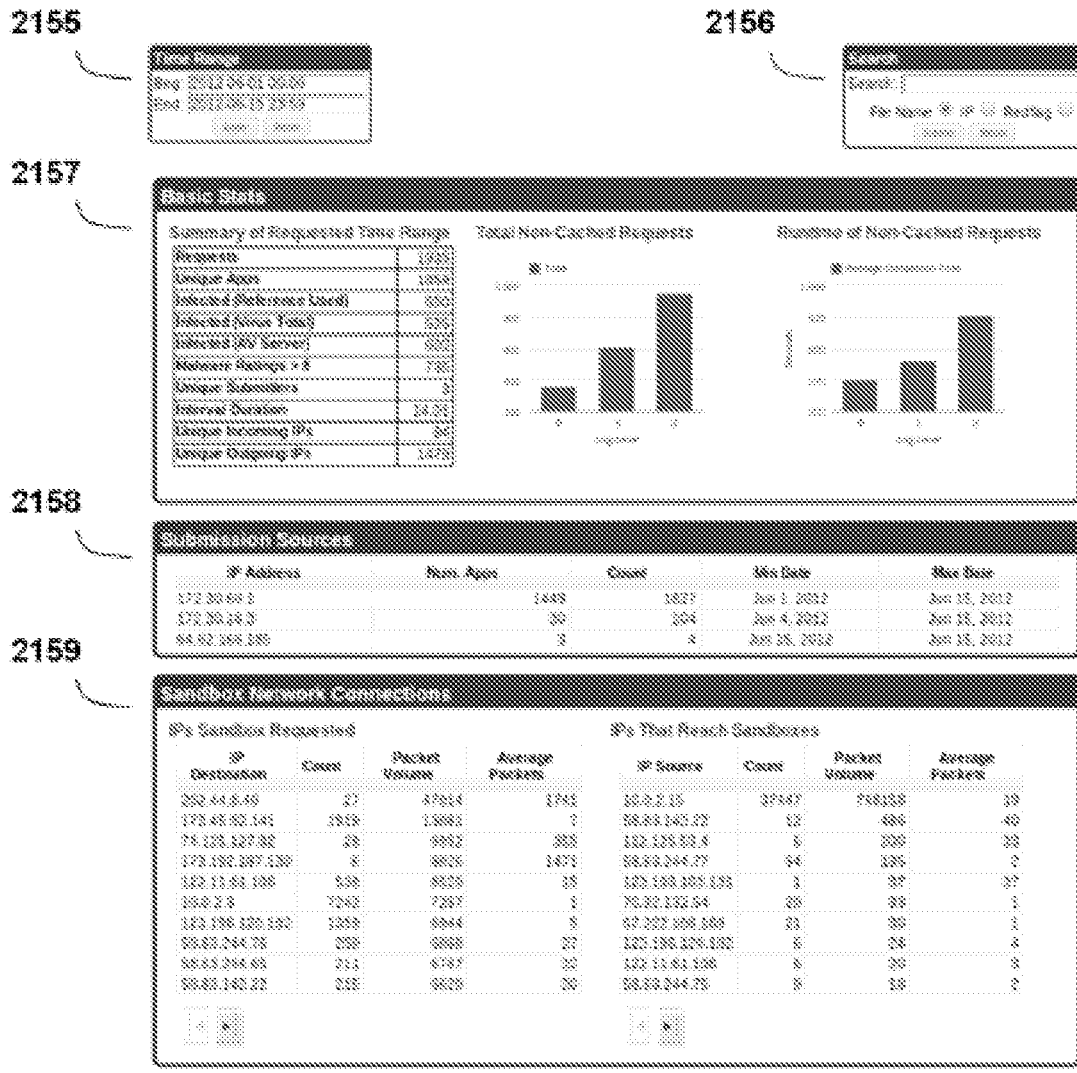
FIG. 20A illustrates an exemplary basic statistics view of the database analytics page of the system dashboard according to one embodiment of the present system.

FIG. 20A illustrates an exemplary partial view of the Database Page containing analytics contents of sections related to
- Time Range Selection Box (2155);
- Additional Constraint Box (2156) to be imposed to selected entries such as regular expressions over the presence of a matching filename, internet protocol address, and/or activated redflag (risk assessment) rule;
- Basic Stats section (2157) containing summary comprised of number of analyses, number of different application binaries submitted, number of infected application binaries according to a reference/benchmark oracle, an external AV source, an internal AV source, and the system's machine learning clustering classifier, number of different submission sources, number of days spanning these submissions, total number of unique outbound IP addresses, total number of unique inbound IP addresses, and statistics about average completion time and cached vs. non-cached analysis load;
- summary and detail of Submission Sources (2158) such as number of application binaries submitted and time range for observed submission sources represented in terms of internet addresses, and
- summary and detail of inbound and outbound Network Reach (2159) (such as packet volume and average package per internet address) as observed for all Analyses found within a specified time range.

Figure 20B:
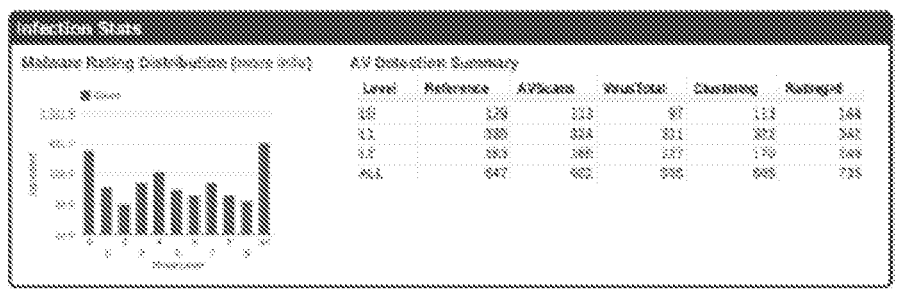
FIG. 20B illustrates network and clustering analytics presented in an exemplary view of the database analytics page according to one embodiment of the present system.
Figure 20B:
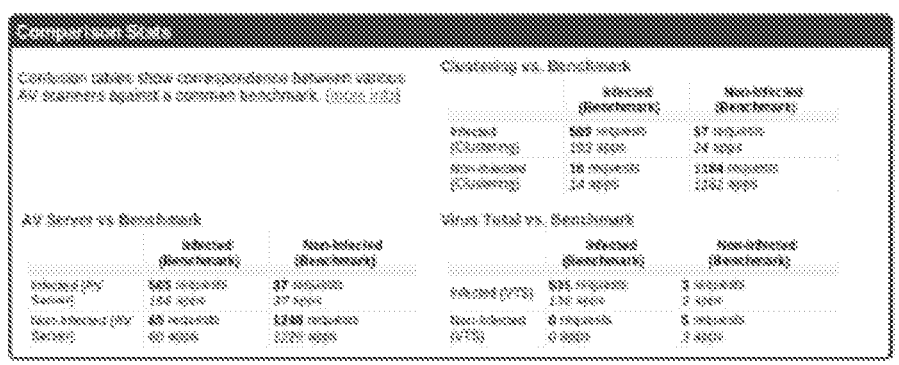
Figure 20B:
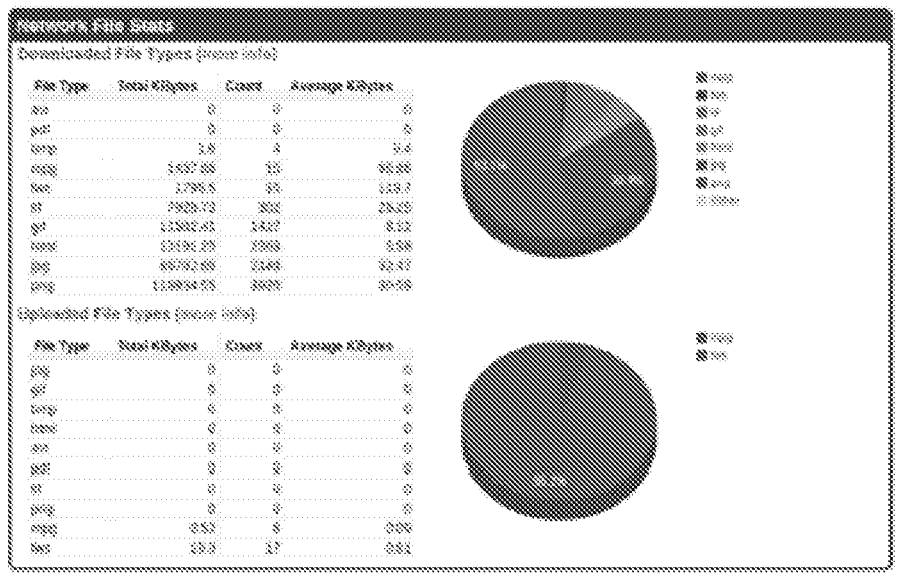
Figure 20C:
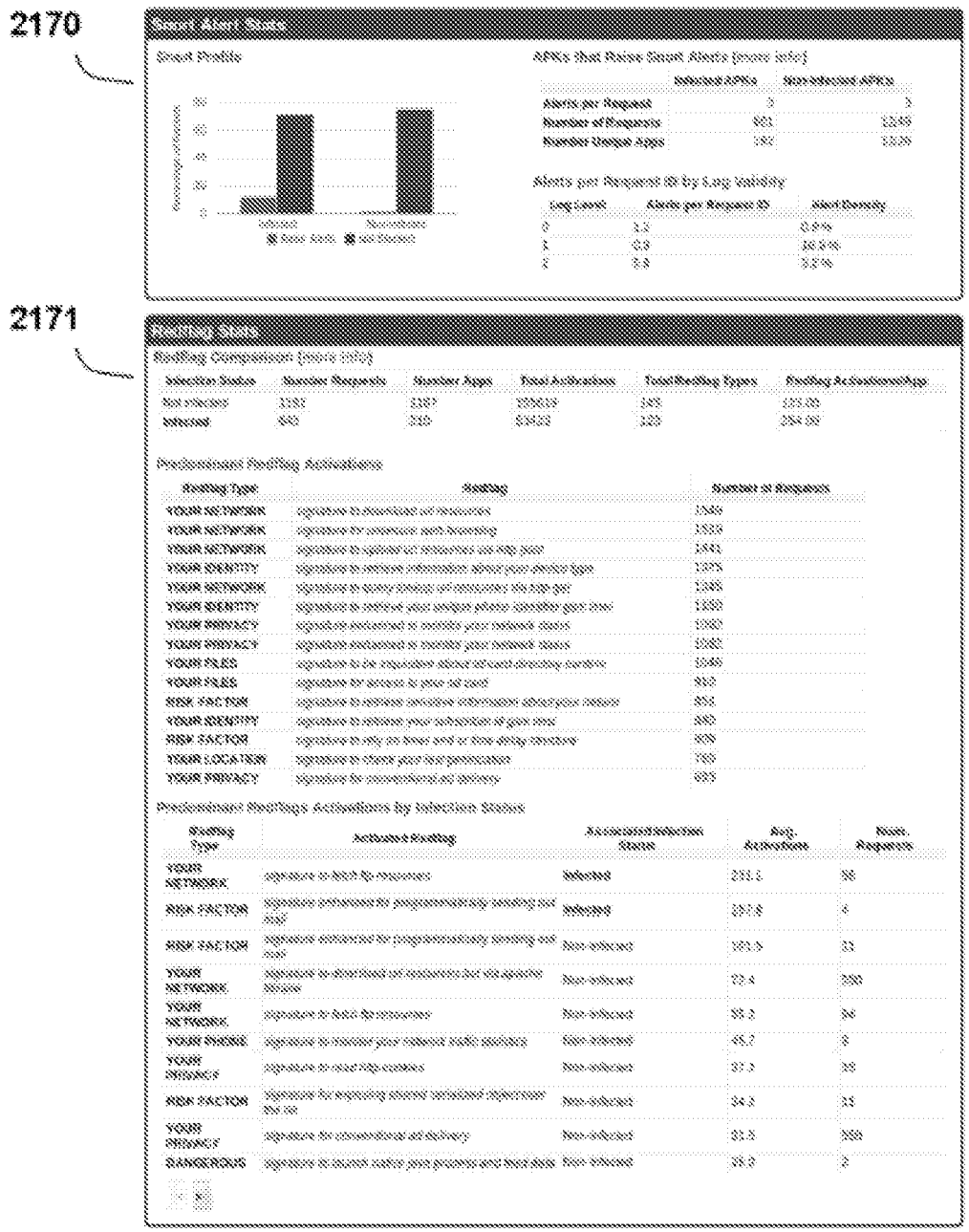
FIG. 20C illustrates download object and risk assessment analytics in an exemplary view of the database analytics page according to one embodiment of the present system.

FIG. 20B illustrates an exemplary partial view of the Database Page containing analytics contents of sections related to
- Comparative Detail of Infection Stats (2160) (between Internal AV Scanner, External AV Scanner, and Machine Learning Clustering Classifier),
- Comparative Confusion Tables (2161) for these documenting true positives, true negatives, false positives, and false negatives in terms of both applications and feature vectors for these (Internal AV Scanner, External AV Scanner, and Machine Learning Clustering Classifier) when each such is compared against the same reference/benchmark oracle, and
- Network Stats and File Type Itemizations for Downloaded/Uploaded objects (2162) as observed for all Analyses found within a specified time range FIG. 20C illustrates an exemplary partial view of the Database Page containing analytics contents of sections related to
- Summary and detail (2170) for Intrusion Detection Alerts, and
- Summary and detail for Activated Redflag Risk Assessment Rules (2171) comprising summary and detailed comparisons for activated risk assessment rules between analyses for infected vs. analyses for non-infected application binaries as observed for all Analyses found within a specified time range.

Figure 21:
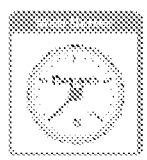
FIG. 21 illustrates an exemplary system view interface of the system dashboard according to one embodiment of the present system.
Figure 21:
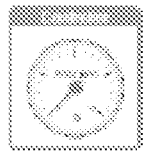
Figure 21:
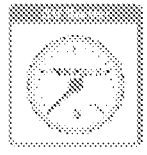
Figure 21:
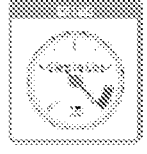
Figure 21:
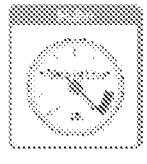

FIG. 21 illustrates an exemplary System View sidebar (2110) providing the principal means of navigation among pre-constructed Dashboard views in the system, according to one embodiment of the present system. Clicking on a Component Gauge (e.g., 2240) opens the corresponding Component View (e.g., 2140) of the dashboard. It illustrates gauges showing short-term performance metrics related to each of the views enumerated in FIG. 20. The Webserver Gauge (2220) displays a metric related to the rate of requests submitted per hour. The Controller Gauge (2230) displays a metric related to the number of requests completed per hour. The AV Server Gauge (2240) displays a metric related to the number of completed scans per hour. The Dispatcher Gauge (2250) displays a metric related to the number of Sandboxes currently in use.

Figure 22:
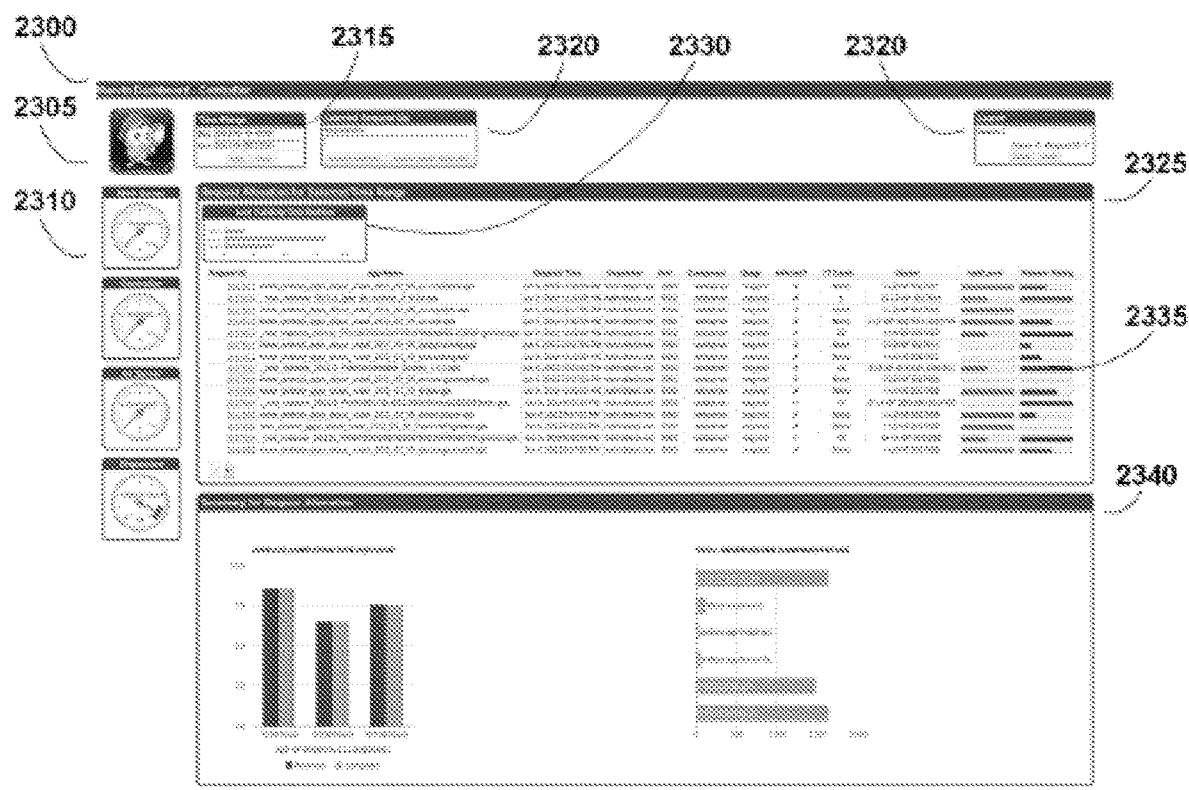
FIG. 22 illustrates an exemplary controller view interface of the system dashboard according to one embodiment of the present system.

FIG. 22 illustrates an exemplary Controller View (2300), according to one embodiment of the present system. It provides real-time view to the current status (2325) of selected analysis processed by the Cloud Service. For any Sandbox Request (200, e.g., 2335), it displays supplied request data (reqdata) such as Request Identifier, Appname, Scheduling Date, and the State of the Request within the Cloud Service workflow with such expressed in terms of a Component and a Stage within said Component. A Time Range panel (2315), expressed in terms of a start date/time and an end date/time controls the time range of queries over analyses selected from the Database (130) contents. The time range values expressed in terms of a start date/time and an end date/time are shared across all Dashboard views and controls the time range of all underlying queries from within the Dashboard to the Database (130). A Search panel (2320) allows further constrain of the selection of analyses based on criteria such as matching package names, Internet addresses, and activated risk assessment rules within an analysis. A Log-Validity Panel (2330) identifies the distribution of the quality of the log-files extracted for an analysis and it is computed again for the selected time range. As in all Dashboard views, the System View (2310, 2110) shows the current state for the other components and provides access to the other Component Views via the corresponding Component Gauge. A Request Allocation panel (2325) identifies all selected analyses found in the specified interval and/or subject to a specified constraint. Individual rows (e.g., 2335) within this view (2325) allow the user to view the corresponding Request Identifier Report Card View (see FIG. 28), providing access to the a summary Quick Card (see FIG. 29) and a detailed (End User Report, see FIG. 10) end-user oriented analysis reports for the given Request Identifier in said row (e.g., 2335). A Summary for Request Allocation Panel (2340) provides a summary statistic view of the performance of the Cloud Service (20). The average of the per-hour average is estimate for several time intervals into the selected time range is shown for the number of Sandbox Requests (e.g., 200). Similarly, a graph shows total count observed at each of several progress stages of the sandbox evaluation workflow. Examples of said sandbox evaluation workflow stages at the Cloud Service are: "received at webserver," "scheduled at controller," "received at dispatcher," "launched at sandbox," "completed at sandbox," and "evaluated by analysis-suite." These statistics are shown for three intervals, currently ⅓, ⅔, and ⅗ of the selected time (2315).

Figure 23:
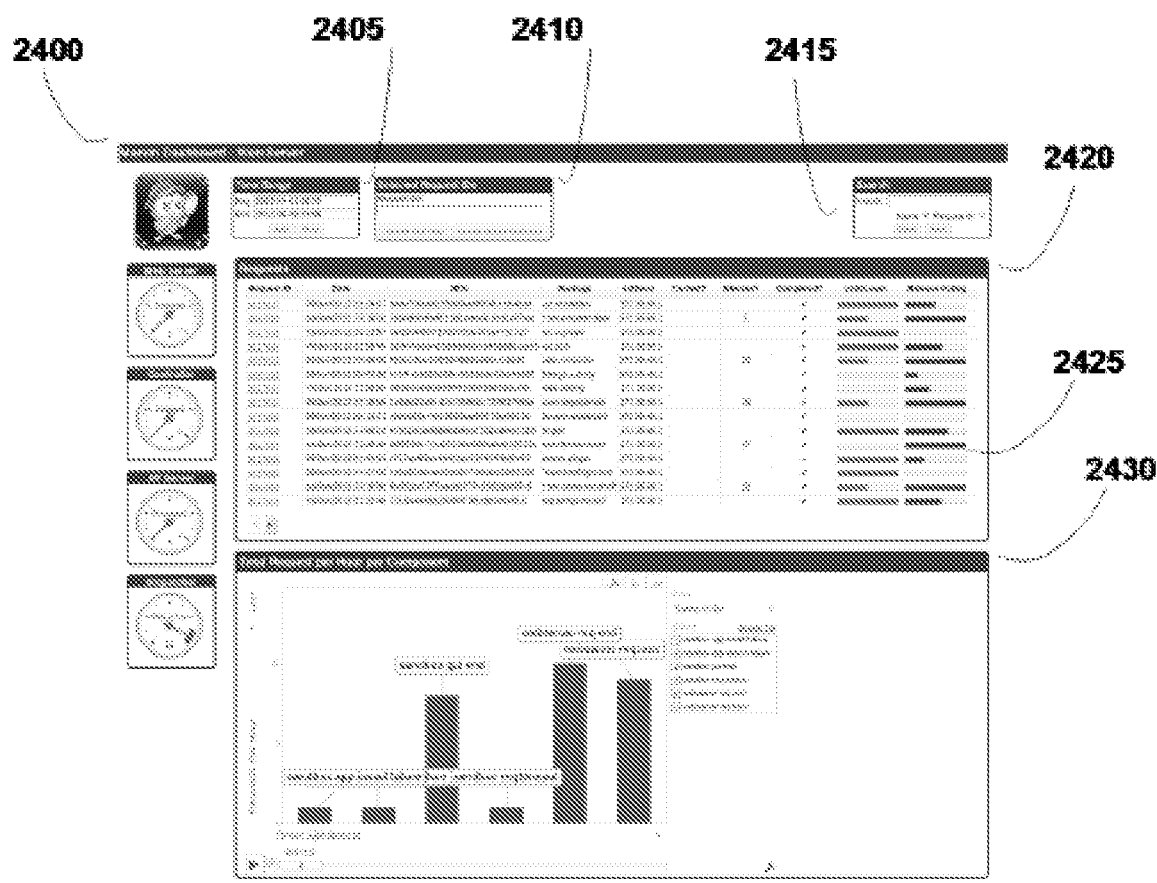
FIG. 23 illustrates an exemplary web server view interface of the system dashboard according to one embodiment of the present system.

FIG. 23 illustrates an exemplary Webserver View (2120), according to one embodiment of the present system. The webserver view includes three panels: the Control Header (2401), the Requests Table (2402), and the Overview Graphs (2403). The Requests Table (2420) provides real-time view to the current status of selected submission requests (e.g., 2425) presented to the Cloud Service that are found to have taken place within the user-specified time range (2405) and/or search condition (2420). The Requests Table (2420) displays rows for each submission, whether pending or completed, matching the selected criteria. Each row displays Sandbox Request identifying data such as Request Identifier, Appname, Submission Date, and the Request's Completion State and Findings (e.g., completed, some incomplete logs, but high malware rating as in (2425)) for all requests matching the specified criteria. As also found in the Controller view (2300), individual rows (e.g., 2335) within the Requests Table (2325) allow access to the corresponding Request Identifier Report Card View (see FIG. 28). Said Report Card provides workflow accounting information as well as access via links to the Quick Card (see FIG. 29) and End User Report (see FIG. 10) for the given Request Identifier.

Both the Webserver view (2300) as well as the Controller view (2400) also provide an Aggregate Analysis View (2310, 2410) that allows performing network visualization analyses over an arbitrary selection of rows from the corresponding Request Table ((2325, 2420). Selection is done by selecting rows within the corresponding Requests Table. Standard web user interface techniques (specifically, click-shift-highlight) of discontinuous table selection are used to allow the user to specify any arbitrary set of Request Identifiers from the corresponding Requests Table (2402). The Dashboard provides support for manual Network Visualization Analysis (2408, see FIG. 25) and/or GeoIP Mapping Analysis (2409, see FIG. 24) of the selected analyses.

Figure 23A:
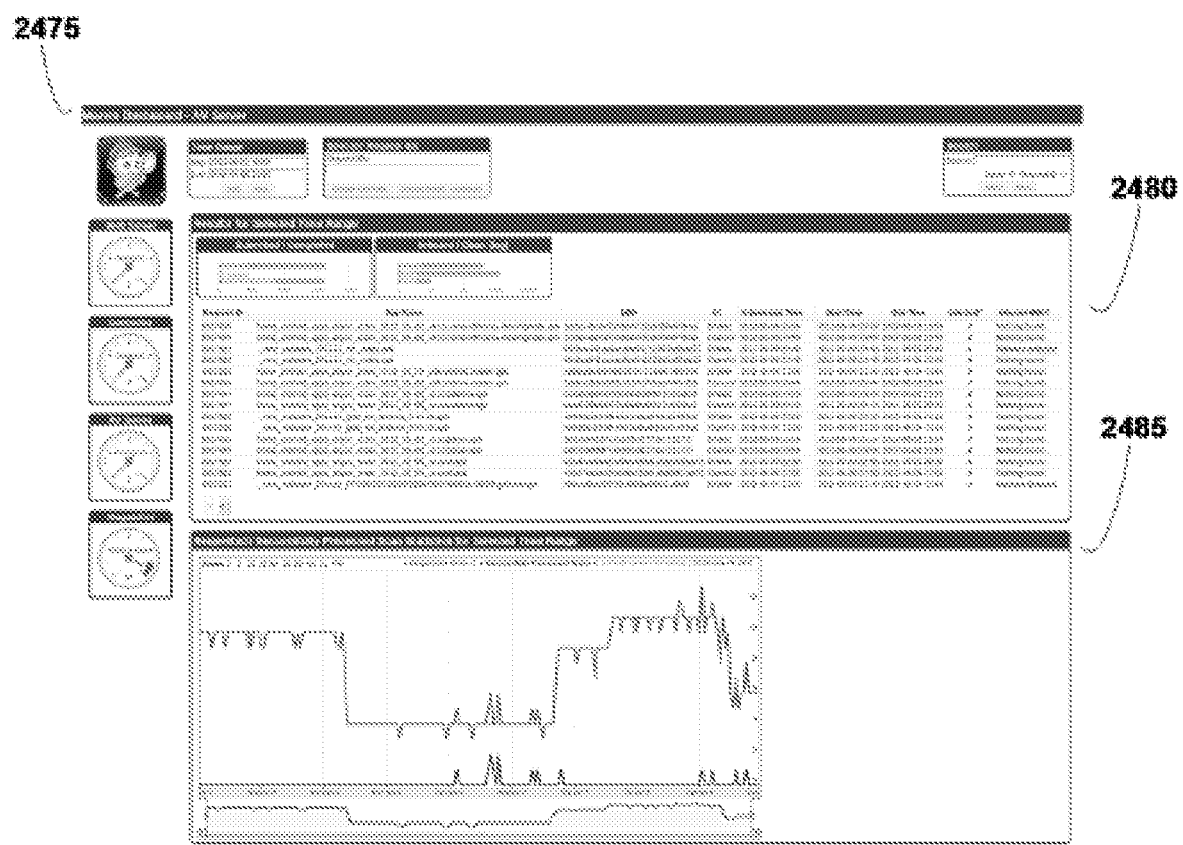
FIG. 23A illustrates an exemplary view of the antivirus server view of the system dashboard according to one embodiment of the present system.

FIG. 23A illustrates an exemplary view of the AV Server view (2475), according to one embodiment of the present system. It comprises a Requests Table (2480) constructed in a similar fashion as described above but tracking status of individual analysis requests to plug-in antivirus scanners, if any, made available to the system. Each row provides request identification data and status and/or findings of the antivirus scan. An exemplary itemization of request identifying data includes as appname, MD5 signature, scanner type, start and end times, infection status, and infection type. The AV server view (2475) also provides a time line of the request load presented to the internal plug-in antivirus scanners that allows identifying deficiencies in the request processing by said scanners as well as providing means for engineering computational capacity for said scanners.

Figure 24:
FIG. 24 illustrates an exemplary view of GeoIP (geolocation of internet protocol (IP) address) according to one embodiment of the present system.

FIG. 24 illustrates an exemplary GeoIP Mapping Analysis (2600) (illustrated for over some exemplary selection of analyses), according to one embodiment. The GeoIP Mapping Analysis provides geographical mapping of the internet activity (see FIG. 12) observed during the execution of the corresponding application binaries associated with the selected analyses. This analyses provides means for providing itemization break downs for network traffic (in terms of transferred byte and/or packet) on a per connection, sandbox, subnet, and/or country (2609) basis. Summary and detail from these itemizations are used to specify nodes (2610) and edges (2620) between said nodes for subsequent use in generating the corresponding network graph visualization of the selected aggregate network traffic.

GeoIP mapping is obtained by querying GeoIP Databases for a mapping of a given IP/DNS into a geographical coordinate and plotting the resulting coordinate into the map. According to one embodiment, GeoIP mapping is not to limited to Country-based granularity but also to State, City, and street based on the granularity of available geographical databases. GeoIP mapping also allows to identify further label GeoIP mapping with infection labels associated with the corresponding Request Identifier. In an embodiment, GeoIP Mapping can also optionally be presented in a timeline view, allowing the display of time-based GeoIP Mapping updates in the current map, where such updates are displayed with respect to the time-ordering of the selected Request Identifiers.

Figure 25:
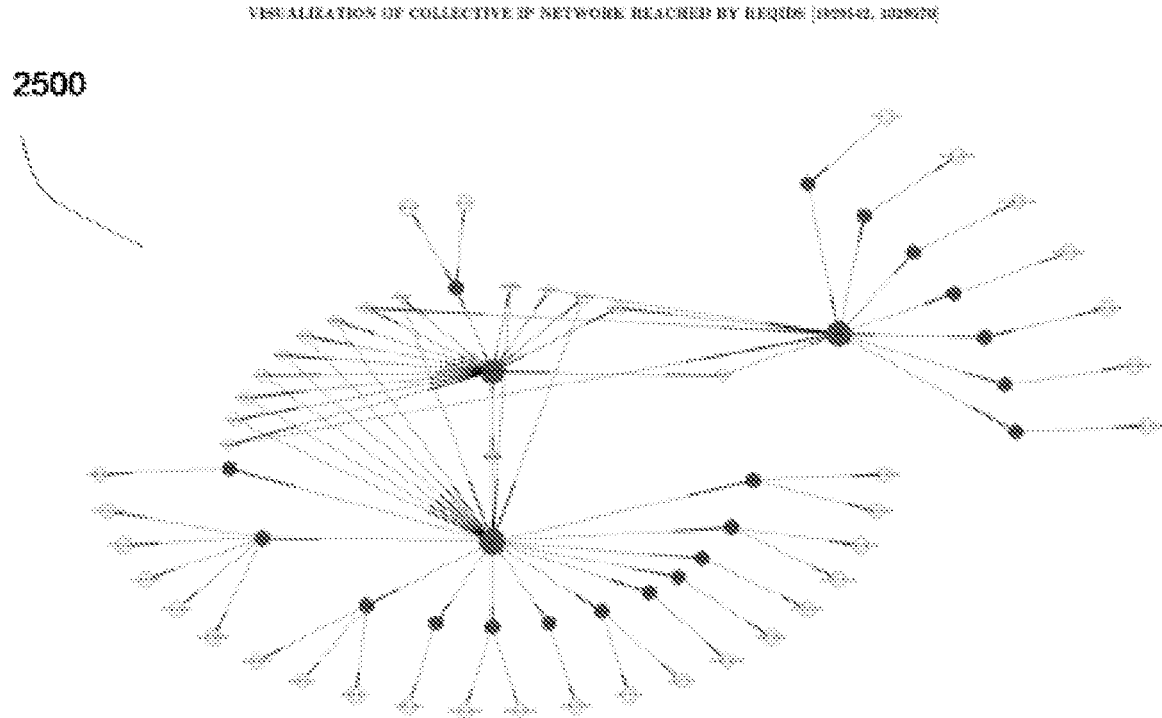
FIG. 25 illustrates an exemplary static network visualization analysis interface according to one embodiment of the present system.

FIG. 25 illustrates an exemplary Network Visualization Analysis (2500) which displays a social network graph visualization of the selected aggregate network traffic derived from network analysis (see FIG. 12) observed during the execution of the selected Request Identifiers. Social network analysis is used to illustrate the relationship between TCP/UDP traffic between connections itemizing IPs, common subnets between these IPs, an countries for these.

The present system, according to one embodiment, allows the Network Visualization (2408) to identify further label nodal data with infection labels extracted for the corresponding Request Identifier. In an embodiment, Network Visualization can also optionally be presented in a timeline view, allowing the display of time-based Network Visualization (2408) updates to the current display, where such updates are displayed with respect to the time-ordering of the selected Request Identifiers. According to one embodiment, the Network Visualization (2408) can be used to monitor the evolution and propagation of infections and clustering anomalies.

Figure 26:
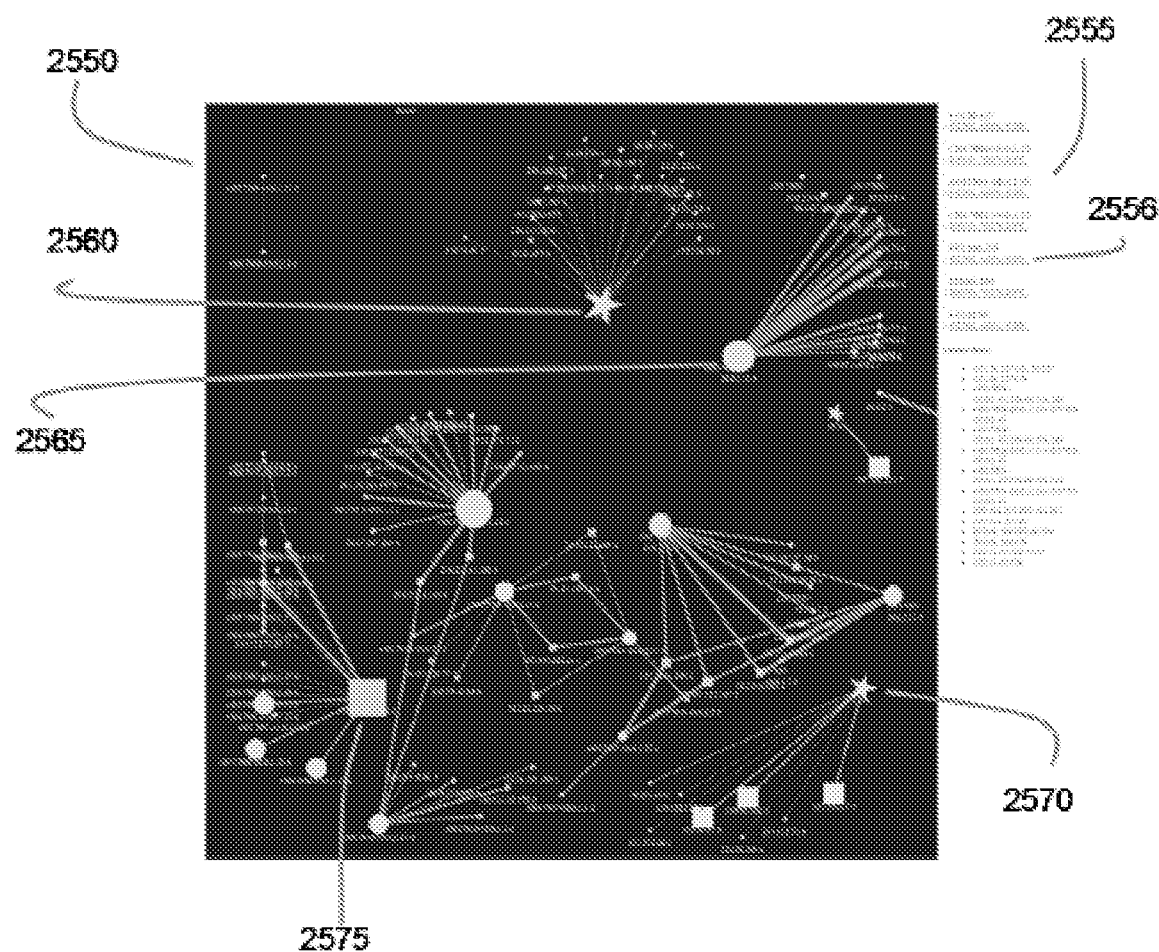
FIG. 26 illustrates an exemplary interactive network visualization analysis interface according to one embodiment of the present invention.

FIG. 26 illustrates an exemplary interactive network visualization analysis interface (2550) according to one embodiment of the present invention, and suited for user interaction by a dashboard user. The elements on the interface can be moved as well as selected by clicking on each. Countries (e.g., US (2560), China (2570) associated with Internet addresses found in the selected analyses to be reached by sandboxes (e.g., 2565) are identified and scaled by a measure proportional to their aggregate traffic load. Relevant Internet protocol (IP) addresses (e.g., 2575) are also identified. Each user-selected node in the graph is itemized on the side panel (2555). Each such listing (e.g., 2556) comprises the name of the node, function, and links to various provenance discovery tools such as but not limited to reverse domain name resolution, Internet registration records. In a foreseen embodiment, a link is also provided to the relevant quick cards of analyses associated with said node. In the present system, request nodes (representing by means of the request identifier) determined to be infected are visually differentiated by color. Similarly, malicious IP addresses are also differentiated by color when present. The present system supports identifying Internet addresses having high centrality measures. The dashboard user can interactively retrieve the infection status of communicating sandboxes to them as well as the network provenance records associated with the corresponding Internet addresses to help assess network trends associated with infected analyses selected on some criteria such as known infected analysis, zero-day and/or false positive analyses.

Figure 27:
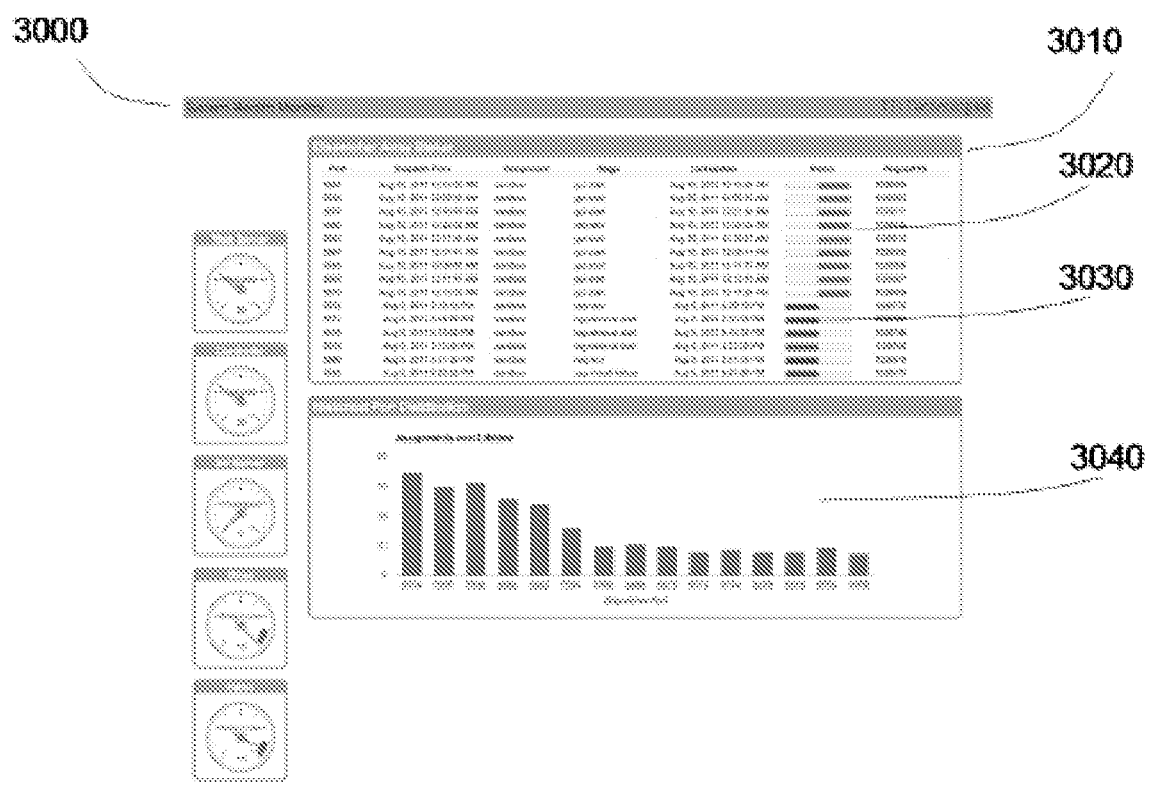
FIG. 27 illustrates an exemplary dispatcher view of the system dashboard according to one embodiment of the present system.

FIG. 27 illustrates an exemplary Dispatcher View (2150) interface for use with the present system, according to one embodiment. The Dispatcher View allows monitoring (3010) in real time the allocation of Sandbox Requests executing (e.g., 3020) within a Dispatcher Node. It also allows the identification of Sandbox executions exceeding time bounds, as for example in the case of a deadlocked Emulator and/or not recently being in use (3030). One or more (worst-case) time limits are placed over the execution of any Sandbox and that upon exceeding any of these time limits, the Sandbox execution is forcefully terminated by the Cloud Service.

Figure 28:
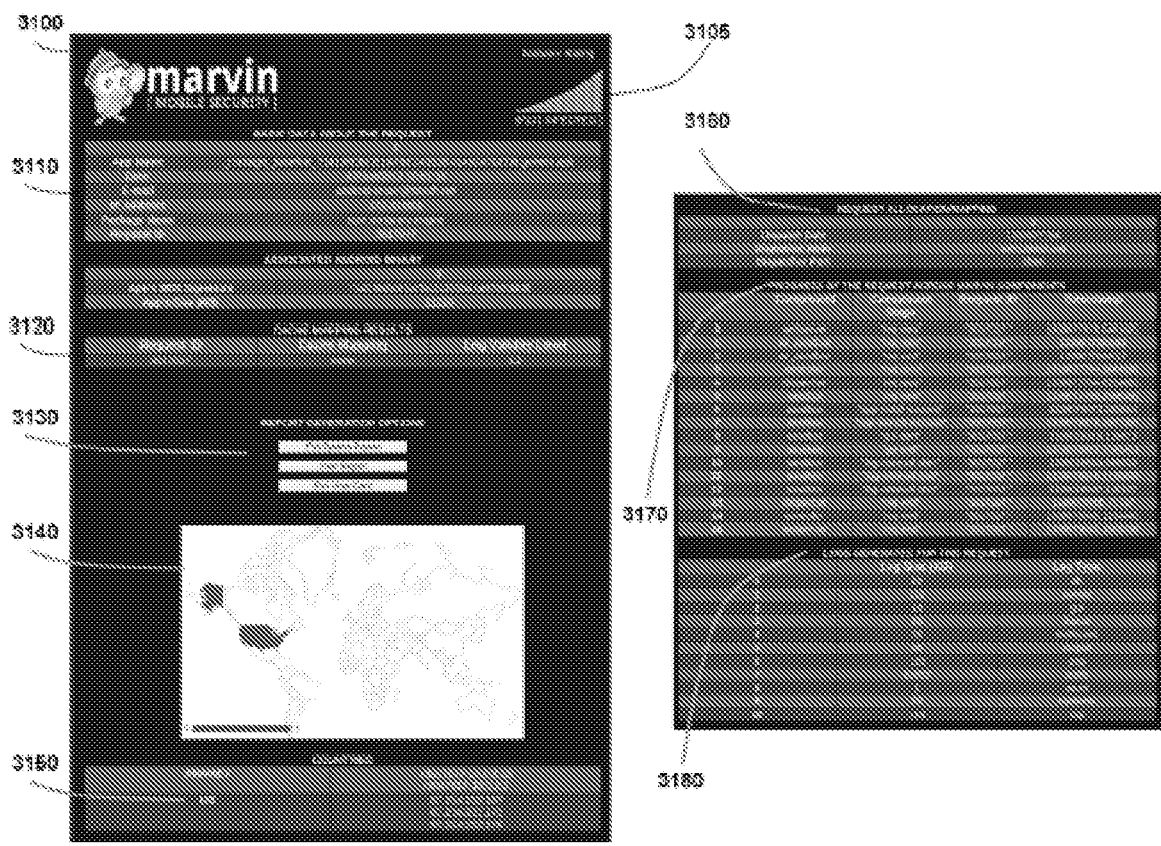
FIG. 28 illustrates an exemplary Request Identifier Report Card view interface according to one embodiment of the present system.

FIG. 28 illustrates an exemplary Request Identifier Card View (3100) for use with the present system according to one embodiment. The view 3100 summarizes key internal data extracted from the Database about the progress of a particular request within the Cloud Service workflow and malware components comprised such as but not limited to at least one of:

a banner section providing report brand image and visual malware rating indicator image (3105);
a basic report statistics section (3110) providing identifying parameters of the submission;
a cache mapping section (3120) providing information about the use and identity of a cached analysis results;
an analysis report access section (3130) providing links to the various end-user and developer reports provided by the system;
a GeoIP map section (3140) and a network access per country summary and detail section (3150);
a dispatcher allocation section (3160) providing summary of allocation of the sandbox request to a sandbox within a dispatcher;
a workflow progress section (3335) providing summary of the progress of the sandbox request within components; and
a log itemization section (3340) providing summary of logs extracted for the sandbox request.

It is a feature of the present system that a reload of the Request Identifier Card View will retrieve the most current values for each of these sections, allowing an operator to monitor incremental progress of a sandbox request through this system view.

It provides also provides access to the Sandbox Report (see FIG. 9) as well as displays a GeoIP map (3105) for the network activity (see FIG. 12) observed during the execution of the given Request Identifier (3110). Selected data fields for the corresponding Requests Table, Apps Table, Logs Table, Progress Table, and AV Scans Table are shown.

Figure 29:
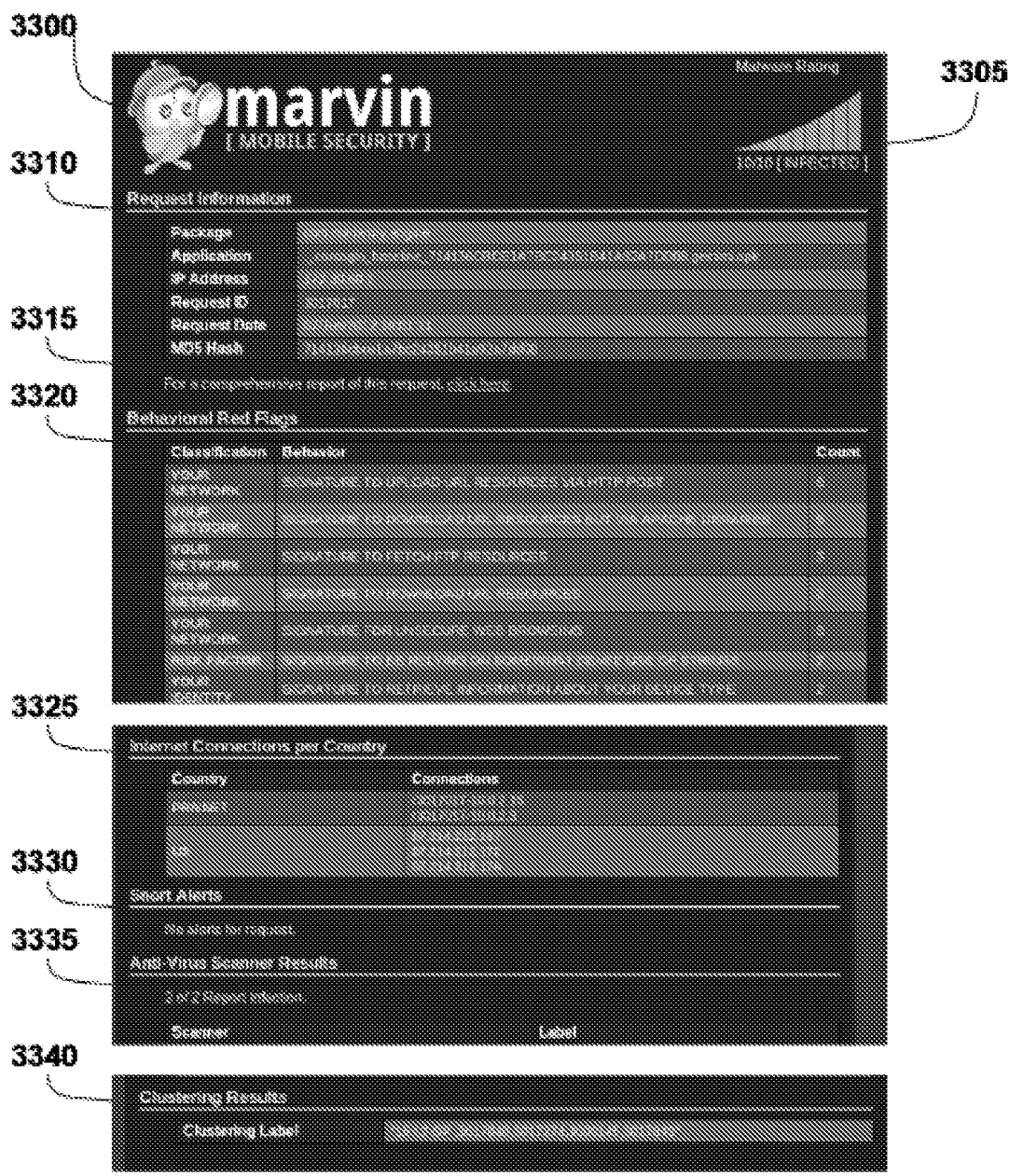
FIG. 29 illustrates an exemplary Quick Card view interface according to one embodiment of the present system.

FIG. 29 illustrates an exemplary Quick Card report for use with the present system, according to one embodiment. The Quick Card report provides a highlight summary of the key findings about the risk assessment of a mobile application. The Quick Card report comprises such as but not limited to at least one of:
- a banner section providing report brand image (3300) and visual malware rating indicator image (3305);
- a basic report statistics section (3310) providing identifying parameters of the submission such as submission source, submission date, etc. as well as providing a link (3315) to the comprehensive analysis report (see FIG. 10) for the submission;
- a risk assessment section (3320) providing summary and detail for activated risk assessment rules, itemizing for each such rule, assessment data such as but not limited to at least one of risk category, risk description, risk rating, risk score, and risk strength;
- a network reach section (3325) providing summary and detail for network connections, itemizing for each such, assessment data such as but not limited to at least one of internet address, country, traffic load, whether or not such internet address is known to be malicious;
- a network intrusion detection section (3330) providing summary and detail for intrusion alerts itemizing for each such assessment data such as but not limited to at least one of alert priority, alert classification, alert description, count, internet address(es) associated with alert;
- a static antivirus scanner results section (3335) providing summary and detail for antivirus analysis results itemizing for each such assessment data such as but not limited to at least one of infection status, infection type, scanner name, scanner version; and
- a clustering results section (3340) providing summary and detail for machine learning classification method results itemizing for each such assessment data such as but not limited to at least one of classification method, classification result, classification alignment/class, probability, confidence, or consensus count.

The present invention provides means for computing without user intervention a malware rating for an application binary comprised of numerical contributions of at least one or more of but not limited to:
- a clustering consensus score and/or level indicating confidence on the clustering assignment;
- the probability for a classification result associated with a machine learning classification method;
- the risk assessment profile associated with static analysis of the application binary;
- the intrusion network detection profile obtained from network analysis of the application binary on the instrumented sandbox environment;
- measurements profile related to assessment of code obfuscation within the code of the application binary;
- black list of known infected application binaries;
- white list of known false positive application binaries;
- download of infected network transferred objects; and
- access to known malicious sites and/or interne addresses.

The present invention provides automated means for identifying potential zero-day malware candidates (and otherwise, false positives) from classification analyses (and their corresponding mobile applications) based on the presence of a high malware rating not widely accepted and/or known to be regarded as malware.

The present invention supports performing autonomous risk assessment inferences over a mobile application binary code (herein referred to as application binary) via static analysis over said application binary by applying one or more risk assessment rules and generating a risk assessment such as but not limited to a numerical score, statistical profile, text warning, and/or graphical warning.

FIG. 30 provides exemplary illustration of the specification of a risk assessment rule (3400). Each said risk assessment rule comprises the specification of at least one or more of:
- one or more independent search terms (e.g., 3405, 3410, 3415) used to activate the rule based on criteria specified within;
- a risk assessment category (3341) used to assess risk exposure level to areas of end-user concern and/or attack vector concern;
- a risk explanation and/or description (3342) used to provide a short explanation suitable for display on mobile devices and/or online reports;
- a risk source reference (3430) used to provide a reference that further documents the associated risk;
- a risk score (3450) used to update the total risk score associated with the application binary; and
- a risk context generation (3460) used to determine whether the context that activated said rule is to be provided into the analysis report and in such case, the format of said context. In the preferred embodiment, the selection of the set of risk assessment rules of interest to be evaluated and their associated risk scores can be independently be specified based on criteria set by, but not limited to, individual preferences of end-users and/or enterprise administrators.

The present invention provides means for evaluating one or more of said risk assessment rules against said application binary comprised of:
- generating a comprehensive document model partition list (herein referred to as basic blocks) of the bytecode of an application binary by partitioning the bytecode by means of some criteria such as but not limited to approximate spatial locality, functions, methods, constants, strings, manifests, permissions, attachment files, headers, etc.;
- retrieving a risk assessment rule comprising a variable number N of independent search terms;
- for each such search term in a rule, performing a search against the partition list to determine the set of code basic blocks on which the search term is asserted;
- retrieving the results of up to N (independent) search results if needed;
- retrieving the intersection of the resulting sets;
- claiming a risk assessment rule to be activated based on a resulting non-null intersection;
- accumulating and accruing overall risk score per risk category based on the contribution to the score of each activated risk assessment rule;
- grouping risk assessment rules into risk categories; and
- generating a category-based accrued risk assessment vector for said application binary.

The present invention provides autonomous risk assessment where updates to said risk assessment rules are enforced by the system on all subsequent analysis-suites evaluations. Moreover, it is an aspect of the present invention that previous analyses can be re-evaluated with respect to updated risk assessment rules and/or accumulation of analyses. In the system, risk assessment analysis is performed within the Cloud Service accumulating analysis results from the evaluation of incoming analysis from one or more submission sources. The present invention provides means for autonomously aggregating and comparing said category-based accrued risk assessment vector for a given application binary against previously computed vectors of some set of application binaries identifying anomalies and similarities on category-based accrued risk vectors and generating findings to be reported on the analysis of said application binary. In one embodiment, the comparison of category-based accrued risk assessment vectors is performed using comparison methods such as but not limited to similarity techniques such as clustering and anomaly detection techniques such as z-scores (i.e.) normalized standard variables based ranking.

In one embodiment, the selection of risk-assessment vectors to be used in the above-described aggregate-based comparison may be based further limited by criteria such as end-user-derived, app store key, malware-infected representative set of risk assessment vectors, enterprise-derived or mobile carrier-derived risk policy profile.

A reader versed in the arts would appreciate that said risk assessment scoring analysis could also be performed within a mobile device by means of rudimentary Java decompilation techniques and relying on a database of previously computed category-based accrued risk assessment vectors.

The present invention provides automated means for identifying potential zero-day candidates (or otherwise, false positives) representing polymorphic forms of known risk assessment rules by means such as anomalous evaluation of accrued risk assessment vectors and/or similarity of such to that of known malware instances.

In the description above, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description above. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

It is understood that the embodiments described herein are for the purpose of elucidation and should not be considered limiting the subject matter of the disclosure. Various modifications, uses, substitutions, combinations, improvements, methods of productions without departing from the scope or spirit of the present system would be evident to a person skilled in the art.

What is claimed is:

1. A system comprising:
   a processor;
   a machine-readable medium having instructions stored thereon, the instructions executable by the processor to cause the system to,
      based on receipt of a request to analyze at least a first mobile application, schedule the request for a first sandbox;
      perform analysis of the first mobile application based on the request, wherein the instructions to perform the analysis of the first mobile application comprise instructions to perform behavioral analysis of the first mobile application within the first sandbox and perform static analysis of the first mobile application;
      generate a first feature vector based on data resulting from the behavioral analysis and the static analysis of the first mobile application; and
      determine whether the first mobile application comprises malware based, at least in part, on comparison of the first feature vector with at least a second feature vector, wherein the second feature vector was previously generated based on a static analysis and a behavioral analysis of known malware.

2. The system of claim 1, further comprising instructions executable by the processor to cause the system to collect log files generated during the analysis of the first mobile application based on the request, wherein the instructions to generate the first feature vector comprise instructions to generate the first feature vector based on extraction of features from the log files.

3. The system of claim 1, wherein the instructions executable by the processor to cause the system to determine whether the first mobile application comprises malware comprise instructions executable by the processor to cause the system to indicate at least a first predicted behavior of the first mobile application based on the determination.

4. The system of claim 1, wherein the instructions executable by the processor to cause the system to perform the analysis of the first mobile application based on the request comprise instructions executable by the processor to cause the system to apply one or more risk assessment rules to binary code of the first mobile application during the analysis of the first mobile application based on the request.

5. The system of claim 1, wherein the first feature vector comprises a behavioral feature and a static feature.

6. The system of claim 1, wherein the instructions executable by the processor to cause the system to determine whether the first mobile application comprises malware comprise instructions to:
determine if the first feature vector and the second feature vector are sufficiently aligned; and
based on a determination that the first feature vector and the second feature vector are sufficiently aligned, determine that the first mobile application comprises malware.

7. The system of claim 6, wherein the instructions executable by the processor to cause the system to determine if the first feature vector and the second feature vector are sufficiently aligned comprise instructions executable by the processor to cause the system to determine if a Euclidean distance between the first feature vector and the second feature vector does not exceed a threshold Euclidean distance.

8. The system of claim 1, wherein the instructions executable by the processor to cause the system to determine whether the first mobile application comprises malware comprise instructions to:
cluster a plurality of feature vectors into at least a first cluster, wherein the plurality of feature vectors was generated based on analysis of a plurality of mobile applications;
based on a determination that a distance between the second feature vector and a centroid of the first cluster satisfies a membership criterion, assign the second feature vector to the first cluster;
determine a distance between the first feature vector and the centroid of the first cluster; and
based on a determination that the distance between the first feature vector and the centroid of the first cluster satisfies a membership criterion, map the first feature vector to the first cluster.

9. A method comprising:
based on receiving a request to analyze a first mobile application, scheduling the request for a first sandbox;
performing an analysis of the first mobile application based on the request, wherein performing the analysis of the first mobile application comprises performing a behavioral analysis of the first mobile application within the first sandbox and performing a static analysis of the first mobile application;
generating a first feature vector based on data resulting from the behavioral analysis and the static analysis of the first mobile application; and
determining that the first mobile application comprises malware based, at least in part, on comparing the first feature vector with at least a second feature vector, wherein the second feature vector was previously generated based on a static analysis and a behavioral analysis of known malware.

10. The method of claim 9, further comprising collecting log files generated during the analysis of the first mobile application based on the request, wherein generating the first feature vector comprises generating the first feature vector based on extraction of features from the log files.

11. The method of claim 9, wherein determining that the first mobile application comprises malware comprises indicating at least a first predicted behavior of the first mobile application based on the determining.

12. The method of claim 9, wherein performing the analysis of the first mobile application based on the request comprises applying one or more risk assessment rules to binary code of the first mobile application during the analysis of the first mobile application.

13. The method of claim 9, wherein determining that the first mobile application comprises malware comprises:
determining if the first feature vector and the second feature vector are sufficiently aligned; and
based on determining that the first feature vector and the second feature vector are sufficiently aligned, determining that the first mobile application comprises malware.

14. The method of claim 13, wherein determining if the first feature vector and the second feature vector are sufficiently aligned comprises determining if a Euclidean distance between the first feature vector and the second feature vector does not exceed a threshold Euclidean distance.

15. The method of claim 9, wherein determining that the first mobile application comprises malware comprises:
clustering a plurality of feature vectors into at least a first cluster, wherein the plurality of feature vectors was generated based on analysis of a plurality of mobile applications;
based on determining that a distance between the second feature vector and a centroid of the first cluster satisfies a membership criterion, assigning the second feature vector to the first cluster;
determining a distance between the first feature vector and the centroid of the first cluster; and
based on determining that the distance between the first feature vector and the centroid of the first cluster satisfies a membership criterion, mapping the first feature vector to the first cluster.

16. The method of claim 9, wherein the first feature vector comprises a behavioral feature and a static feature.

17. A non-transitory, computer-readable medium having instructions stored thereon that are executable by a computing device to perform operations comprising:
based on receiving a request to analyze a first mobile application, scheduling the request for a first sandbox;
performing an analysis of the first mobile application based on the request, wherein performing the analysis of the first mobile application comprises performing a behavioral analysis of the first mobile application within the first sandbox and performing a static analysis of the first mobile application;

generating a first feature vector based on data resulting from the behavioral analysis and the static analysis of the first mobile application; and determining whether the first mobile application comprises malware based, at least in part, on comparing the first feature vector with at least a second feature vector, wherein the second feature vector was previously generated based on a static analysis and a behavioral analysis of known malware.

18. The non-transitory, computer-readable medium of claim 17, wherein the operations further comprise collecting log files generated during the behavioral analysis and the static analysis of the first mobile application, wherein generating the first feature vector comprises generating the first feature vector based on extraction of features from the log files.

19. The non-transitory, computer-readable medium of claim 17, wherein determining whether the first mobile application comprises malware comprises:

determining if the first feature vector and the second feature vector are sufficiently aligned; and based on determining that the first feature vector and the second feature vector are sufficiently aligned, determining that the first mobile application comprises malware.

20. The non-transitory, computer-readable medium of claim 19, wherein determining if the first feature vector and the second feature vector are sufficiently aligned comprises determining if a Euclidean distance between the first feature vector and the second feature vector does not exceed a threshold Euclidean distance.

\* \* \* \* \*